US006035291A

United States Patent [19]

Thiel

[11] Patent Number: 6,035,291

[45] Date of Patent: Mar. 7, 2000

[54] METHOD AND ARRANGEMENT FOR DATA PROCESSING IN A SHIPPING SYSTEM WITH A POSTAGE METER MACHINE, INCLUDING AUTOMATIC SELECTION OF THE MOST BENEFICIAL CARRIER

[76] Inventor: Wolfgang Thiel, Bohnsackersteig 8, 13503 Berlin, Germany

[21] Appl. No.: 08/850,051

[22] Filed: May 2, 1997

[30] Foreign Application Priority Data

May 2, 1996 [DE] Germany .......................... 196 17 557

[51] Int. Cl.[7] ........................................ G06F 17/00

[52] U.S. Cl. ........................................ 705/408; 177/25.15

[58] Field of Search .................................... 705/407, 408, 705/409, 410, 403; 177/25.15

[56] References Cited

U.S. PATENT DOCUMENTS 4,122,532 10/1978 Dlugos et al. .......................... 705/409
4,511,793 4/1985 Racanelli ................................ 705/404
4,797,832 1/1989 Axelrod et al. ......................... 705/403
4,800,505 1/1989 Axelrod et al. ......................... 705/404
4,800,506 1/1989 Axelrod et al. ......................... 235/375
5,111,030 5/1992 Brasington et al. .................... 235/375
5,117,364 5/1992 Barns-Slavin et al. ................. 705/402
5,233,657 8/1993 Gunther ................................. 705/403
5,257,197 10/1993 Günther et al. ......................... 705/406
5,305,893 4/1994 Hereford ................................ 209/577
5,325,303 6/1994 Walz et al. ............................. 705/404
5,362,947 11/1994 Dietrich et al. ......................... 705/405
5,490,077 2/1996 Freytag .................................. 705/405
5,493,106 2/1996 Hunter ................................... 705/408
5,602,743 2/1997 Freytag .................................. 705/408

FOREIGN PATENT DOCUMENTS 0 493 948 7/1992 European Pat. Off. .
44 19 430 12/1995 Germany .
44 22 263 1/1996 Germany .
2 215 670 2/1989 United Kingdom .

*Primary Examiner*—Emanuel Todd Voeltz
*Assistant Examiner*—Thomas A. Dixon
*Attorney, Agent, or Firm*—Hill & Simpson

[57] ABSTRACT

In a method for data processing in a mail processing system, the most beneficial carrier, among a number of available carriers, for shipping a particular item is determined by initializing the franking system with pre-selection of a group of carriers from which the desired carrier can be subsequently selected, processing inputs with respect to service demands made of the carrier and automatic selection of those carriers from the aforementioned group of carriers that meet the service demands that have been made, calculating the postage fee on the basis of current fee schedules for selected services, comparing the postage fee for cost optimization in the narrower automatic selection of the most beneficial carrier and debiting the calculated postage fee in a fee memory for the selected carrier.

53 Claims, 21 Drawing Sheets

CARRIER

| | 1 | 2 | 3 | 4 | 5 |
|---|---|---|---|---|---|
| DELIVERY ZONE | A | B | A+B | A | A+B+C |
| BASE FEE | .80 | .85 | .90 | .95 | 1.20 |
| EXPREESS DELIVERY | - | - | + | + | + |
| SURCHARGE FOR EXP. | - | - | .50 | .40 | 0.00 |
| DEPENDABILITY | - | - | + | + | + |
| SURCHARGE FOR TRACKING | - | - | 3.00 | 4.00 | 10.00 |
| RETURN RECEIPT | - | + | + | - | + |
| RETURN RECEIPT SURCHARGE | - | 3.00 | 2.80 | - | 3.50 |
| DISCOUNTS FOR<br>> 100 LETTERS<br>> 1000 LETTERS<br>>10000 LETTERS | <br>.10<br>.20<br>.30 | <br>-<br>.25<br>.30 | <br>-<br>.15<br>.30 | <br>-<br>-<br>.50 | <br>-<br>.15<br>.40 |

CARRIER

| | 1 | 2 | 3 | 4 | 5 |
|---|---|---|---|---|---|
| DELIVERY ZONE | A | B | A+B | A | A+B+C |
| BASE FEE | .80 | .85 | .90 | .95 | 1.20 |
| EXPREESS DELIVERY | - | - | + | + | + |
| SURCHARGE FOR EXP. | - | - | .50 | .40 | 0.00 |
| DEPENDABILITY | - | - | + | + | + |
| SURCHARGE FOR TRACKING | - | - | 3.00 | 4.00 | 10.00 |
| RETURN RECEIPT | - | + | + | - | + |
| RETURN RECEIPT SURCHARGE | - | 3.00 | 2.80 | - | 3.50 |
| DISCOUNTS FOR<br>> 100 LETTERS<br>> 1000 LETTERS<br>>10000 LETTERS | <br>.10<br>.20<br>.30 | <br>-<br>.25<br>.30 | <br>-<br>.15<br>.30 | <br>-<br>-<br>.50 | <br>-<br>.15<br>.40 |

POSTAL REGISTER VALUES Ri:

| priv.Carrier-Number m→ | 1 | 2 | 3 | 4 | ... | 7 | ... | l | $\sum_{m=1}^{l} R_{i,m}$ |
|---|---|---|---|---|---|---|---|---|---|
| Register $R_1$ | 200 | - | 78 | - | ... | 150 | ... | 34 | |
| $R_2$ | 100 | 50 | 43 | - | ... | 240 | ... | 57 | |
| ↓ i ↓ | ... | ... | ... | ... | ... | ... | ... | ... | |
| $R_{80}$ | 500 | 80 | 40 | - | ... | 360 | ... | 200 | |
| $R_{81}$ | 300 | 160 | 22 | - | ... | 100 | ... | 140 | |
| | ... | ... | ... | ... | ... | ... | ... | ... | |
| $R_h$ | 700 | 320 | 28 | - | ... | 121 | ... | 10 | |

Legend:

Register R1 := remaining value (descending),
Register R2 := accum.used amount (ascending),
Register R3 := total reset amount (total reset.)
Register R4 := no. of valid imprints (piece count $\Sigma$ printing with value $\neq$ zero),
Register R8 := no. of all imprints (R4 + piece count $\Sigma$ printing with value = zero),
Register Ri
for further Register with i = 1 to h priv.Carrier-No.1 := Deutsche Post AG, CIN = 100.000.000.000
priv.Carrier-No.2 := DPD, CIN = 200.000.000.000
priv.Carrier-No.3 := UPS, CIN = 300.000.000.000
priv.Carrier-No.m
for further Carrier with m = 1 to l KST-No. 1 := ALPHA_100,
KST-No. 2 := BETHA_200,
KST-No. n
for further Cost Center with n = 1 to k

Fig. 7c

USED POSTAGE p:

| priv.Carrier-Number m→ | 1 | 2 | 3 | 4 | ... | 7 | ... | 1 | $\sum_{m=1}^{l} p_{n,m}$ |
|---|---|---|---|---|---|---|---|---|---|
| KST-No.1 | 200 | - | 78 | - | ... | 150 | ... | 34 | |
| KST-No.2 | 100 | 50 | 43 | - | ... | 240 | ... | 57 | |
| ↓ n ↓ | ... | ... | ... | ... | ... | ... | ... | ... | |
| KST-No.7 | 500 | 80 | 40 | - | ... | 360 | ... | - | |
| KST-No.8 | 300 | 160 | 22 | - | ... | 100 | ... | - | |
| | ... | ... | ... | ... | ... | ... | ... | ... | |
| KST-No.k | 700 | 320 | 28 | - | ... | 121 | ... | 10 | |
| $\sum_{n=1}^{k} p_{n,m}$ | | | | | ... | | ... | | $\sum\sum_{mn} p_{n,m}$ |

USED PIECE COUNT z:

| priv.Carrier-Number m→ | 1 | 2 | 3 | 4 | ... | 7 | ... | 1 | $\sum_{m=1}^{l} z_{n,m}$ |
|---|---|---|---|---|---|---|---|---|---|
| KST-Nr.1 | 1 | - | 2 | - | ... | 10 | ... | 2 | |
| KST-Nr.2 | 1 | 1 | 1 | - | ... | 16 | ... | 3 | |
| | ... | ... | ... | ... | ... | ... | ... | ... | |
| KST-Nr.7 | 1 | 1 | 1 | - | ... | 24 | ... | - | |
| KST-Nr.8 | 2 | 4 | 1 | - | ... | 5 | ... | - | |
| | ... | ... | ... | ... | ... | ... | ... | ... | |
| KST-Nr.k | 7 | 4 | 1 | - | ... | 7 | ... | 1 | |
| $\sum_{n=1}^{k} z_{n,m}$ | | | | | ... | | ... | | $\sum\sum_{mn} z_{n,m}$ |

Fig. 7d

METHOD AND ARRANGEMENT FOR DATA PROCESSING IN A SHIPPING SYSTEM WITH A POSTAGE METER MACHINE, INCLUDING AUTOMATIC SELECTION OF THE MOST BENEFICIAL CARRIER

BACKGROUND OF THE INVENTION

1. Field of the Invention

The present invention is directed to a method for data processing in a mail-shipping system with a postage meter machine as well as to an arrangement for implementing the method.

2. Description of the Prior Art

In modern offices, producing documents such as letters ensues at the personal computer. The printed documents are manually placed in envelopes or are automatically stuffed in envelopes in a mail station with an envelope-stuffing system. Such mail stations also have postage meter machines available for use.

For systems which process a high volume of mail, the use of computer support is known to assist in franking the mail.

One of the improvements still needed for postage meter machines is to provide in creating flexibility with respect to the debiting vis-a-vis different carriers. Given the elimination of the governmental mail monopoly for sending letters in many countries, an increase in mail delivery by regional, national or international private carriers can be expected. It is known only for package shipping systems to prepare accounting statements for various carriers. This, however, does not involve an automatic postage calculation and acknowledgment with a franking imprint. A mail processing system is needed which allows for an economic service to be selected from different fee schedule structures of various carriers with the goal of a substantially automatic processing of the letter.

The problem of assuring the current nature of the carrier-related data must be solved if such a mail processing system is to be achieved. As is known, the automatic calculation of postage value can ensue on the basis of a stored postage fee table in a postage meter machine dependent on the weight of each letter among a series of letters that, before being placed in respective envelopes, are each produced with a text processing system on a personal computer in the office. The weight is measured by a postage scale which generates an electronic weight signal that is supplied to a connected postage meter machine. The postage meter machine is equipped with a control unit, memory means, input means, a modem or other data reception means, input/output control means, display means and a printer. A pre-paid credit balance value is stored non-volatilely in the memory means. After subtraction of the calculated postage value from the aforementioned credit balance value, a stationary printhead prints the franking imprint given simultaneous conveying of the letter. A printing width of approximately 1" is thereby achieved. So-called PC frankers are also known wherein the credit balance memories are implemented in specifically protected, additional hardware of the PC, with the franking imprint being carried out by a connected office printer. For assuring the accounting security, the franking imprint contains cryptographically encoded characters.

The postage fee tables are updated from time to time. Generally, the fees for specific carrier services are thereby raised, however, fundamentally new structures of the fees can also be defined. This applies to national postal services as well as to private carriers.

As long as franking systems are provided only for accounting with one carrier (previously, the national postal service), the invalidity of the old postage fee tables and the necessity of reloading a new table were sufficiently simple and infrequent so that they could be overseen by the meter manufacturer and user. A remote data center can then initiate the communication of a current table (as disclosed in German OS 28 03 982). When, however, the franking system is set up for accounting via-a-vis various carriers, a specific solution must be created so that the postage fee table that is valid for the selected carrier is always available.

In the simplest case, this could be accomplished by, after selection of the carrier, setting up a long-distance telephone connection to a remote data center that is operated by the manufacturer of the franking system or by the respective carrier, with the current postage fee table being transmitted into the franking system and stored therein. If a postage fee table of this carrier was already stored, an inquiry can be limited to whether a new one has become valid in the interim. A disadvantage of this system is comprised therein that costs that can reach the order of magnitude of the postage fees under certain circumstances are incurred for setting up the telephone connection.

An improved method requires this connection setup to be implemented only at certain times, for example the first time the franking system is turned on for the day, as disclosed in German OS 42 13 278. If, however, the franking system is not turned off on a daily basis and is instead operated in standby mode when franking is not being carried out, the connection setup for updating cannot be implemented.

Another solution is to have the respective carrier define the provisional validity duration of its postage fee table in advance, and this information is transmitted into the postage meter machine together with the table itself. The expiration date set by the respective carrier is then stored therein for that carrier, and a connection for transferring a new postage fee table is automatically initiated when this date arrives, as was disclosed in German application P 195 49 305.2-53, corresponding to co-pending U.S. Pat. No. 5,852,813. Given unscheduled, short-term changes in the fees, however, a readjustment of every machine in use would then have to be carried out by a service technician.

European Application 493 948 discloses a coupling to a personal computer in order to use this as an input means. The postage fees are stored in various registers that are allocated to various authorities, however, this publication does not describe whether and how these authorities are selected by the customer or how an allocation ensues. This specific solution for a postage meter machine stores the debiting data for various services. A disadvantage of this known system is the outlay arising due to the need for a separate interface between the postage meter machine and a work station used as the input means. A separate printer is connected to the separate interface in order to print out debiting (accounting) reports.

German OS 39 03 718 also discloses a coupling to a personal computer in order to print out department-related accounting data via a separate printer. A disadvantage is that a control unit must be connected as a separate device between the individual devices such as the scale, the postage meter machine and the personal computer. The employment of manually plugged chip cards in order to enter accounting reports into the personal computer, moreover, represents an impediment for automation of the production of accounting reports.

European Application 600 749 discloses a mail processing machine with a bar code user interface. Commands for controlling the mail processing machine are entered via a bar code reader pen (wand). This, however, requires a catalog having a list of bar code commands, and manual sampling thereof. A manual positioning of a reader pen and sampling for entering commands reduces the input dependability as well as an assumption of responsibility on the part of the user, i.e., one must assume that the user would not undertake any manipulation with fraudulent intent. As a guard against misuse, no commands that could be misused with fraudulent intent can be found in the list. An entry of unlisted commands effecting a falsification, i.e., a correspondingly generated bar code, however, cannot be prevented. Most steps have been taken to insure that the sequence of the bar code inputs can only ensue according to the sequence of pieces of mail supplied.

European Patent 498 955 discloses a method and an arrangement for sending electronically stored letter contents, whereby the scale can be eliminated because the postal matter contains only one insert that always has the same weight. The pieces of mail contain chip cards that are placed in addressed envelopes. A franking tape is printed in the postage meter machine or the addressed envelope is franked before the envelope stuffing. This known arrangement, however, does not afford the possibility of supplying the mailings to the postage mater machine unordered with several, or different, inserts without again having to utilize a scale for determining the weight. A personal computer serves as an input means for entering the shipping data into the postage meter machine, which undertakes the accounting.

U.S. Pat. No. 4,800,506 discloses a mail processing system with a number of devices that operate in a PC-supported manner and already have connected postage meter machines available. The individual devices carry out functions for recompilation of the letters, namely in the sequence of the postal area codes of their addresses. The aforementioned functions includes opening letters, sensing specific locations, possibly reprinting the letter or comments, folding, envelope-stuffing, postage calculation and sorted deposit or, bundling. Some public mail carriers offer discounts for postal matter pre-sorted in this way. This method is complicated insofar as it may require another printout of the letter. Installation of a high-performance computer is required in the mail station, which must be operated by appropriately trained personnel.

German OS 38 08 178 discloses a mail processing system with a first computer that produces the documents on fan-fold paper and that is in communication with a second computer that controls devices in the mail station. The communication is achieved by markings printed on the document and, by a communication element. The envelope stuffing, addressing and franking of the mail can be indirectly controlled by a printed coding identifying the respective piece of mail. Parameter values that are employed for controlling the envelope stuffing, addressing and franking of the mail are allocated to these identification codings in a data bank. The data bank is connected to the second computer to which the respective identification coding of the piece of mail is communicated via a connected sensor means. The address printing in the mail station is emphasized in this document as an advantage in view of the easy, subsequent modification of, among other things, the addressing of stuffed envelopes, and thus avoiding a bill-like appearance of the envelopes that is associated with window envelopes.

Such window envelopes are allegedly not opened by some recipients because they may contain bills. Apart from the fact that it would be senseless not to open window envelopes because they may contain bills, since cost-increasing reminders would be delivered anyway to such companies or persons, window envelopes nonetheless are not favored by many mailers. This disfavor against printing an address when preparing the letter at a location which will be visible through an envelope window, and against employing window envelops per se, leads to the aforementioned equipping of the mail station with complicated technology. When settings must be undertaken in the mail station in order to utilize beneficial services of a different private carrier, however, even the aforementioned equipping of the mail station with complicated technology still proves inadequate because correspondingly more highly qualified employees are then required. The weight and the postage amount are identified before resending postal matter. In conjunction with the increasing proliferation of private carriers competing with one another, beneficial special fee schedules for transport services and service performances related thereto are also being increasingly offered. A reduction of the weight by reducing the number of inserts for the envelope often suffices for meeting the prerequisites for making use of such special fee schedules. A great deal of redundancy and design latitude in the informational offering exists in direct marketing. For example, the format, the number of lines, letter height, etc., could be optimized for cost reasons. The number of pages could also be reduced when preparing the letter. The employees in the mail station, however, are not in a position to undertake such entries or modifications in the data bank. The employees of the mail station would then have to instruct the other employees whose produce the letter contents, or these mail station employees would have to make such changes themselves. Such a procedure, however, would only lead to unnecessary delays in the mail processing.

SUMMARY OF THE INVENTION

An object of the present invention is to provide a mail processing method and arrangement which eliminate the disadvantages of the prior art and to provide such a method mail processing system with the capability of determining the most beneficial carrier for a given piece of mail. A further object is to provide a more flexible mail shipping system that can be expanded to future services of various private mail carriers and that calculates the postage value according to currently valid fee schedules.

The occurrence of manual errors given input of data determining the postage into the franking system should also be reduced.

An automatic unit for setting the most beneficial carrier and other critical data and for the accounting of postage fees should be created for data processing in the franking system.

Despite a multitude of mail carriers, an easily surveyable and duplicatable accounting should be made available the customer. An additional object is to in enable the presentation of accounting statements according to cost centers according to public and private mail carriers on the basis of displays and printouts.

With the increasing liberalization of mail delivery, there is customer interest in having a mail processing system with which it is possible to select the optimum carrier for a given piece of mail from the offerings of various competing carriers. This presumes that such a mail processing system makes information for this selection available to the customer and also handles the calculation of the fees for the desired shipping service. For accounting, the franking system must be equipped with the postage fee schedules of the respective carriers.

In accordance with the inventive method and arrangement, a pre-selection of a group of carriers from which the desired carrier can be subsequently selected ensues in the initialization of the postage meter machine in the mail processing system. An inventive routine in the personal computer automatically insures coincidence with current carrier-related data stored in the postage module.

An automatic carrier selection according to the customer's criteria set for shipping a particular item inventively ensues in a personal computer of the customer remote from the mail system where the postage meter machine is located.

This ensues with the steps of processing inputs with respect to service requirements imposed by the customer with regard to the carrier, and automatic selection of those carriers from a group of carriers that meet the service demands that have been made, calculating the postage fee on the basis of the weight of the piece of mail, letter or other item and on the basis of current fee schedules for selected services, and implementation of comparisons of the postage fee for cost optimization in the more specific, automatic selection of the most beneficial carrier.

An optimization program inventively is executed on the personal computer that suggests proposals for low letter carrier costs. This has the advantage that changes in the letter content, in the number of pages or in the addressing can be undertaken and are monitored directly by the editor of the document.

The automatic carrier selection corresponding to the criteria set for shipping has the advantage, compared to a manual selection, that the most beneficial carrier is also selected mistake-free based on objective criteria. Manual selection of the most beneficial carrier for the shipping of an item would, under certain circumstances, require a time-consuming comparison of the transport and fee schedule conditions of the carriers applicable to the user of the franking system. Since the system relieves the customer of this manual comparison, significant time and cost advantages are obtained by each customer.

Using a personal computer for this purpose affords comfortable dat input and simulation capability by displaying a number of parameters on the screen for mailings that are yet to be produced, which can be advantageously utilized in the entry of further shipping data.

A mail carrier selected with the keyboard/display unit (user interface) of the personal computer or automatically, the postage value of the letter produced and further shipping information such as the shipping class, as well as the cost center are, at least, displayed and stored. For storing, datafiles respectively allocated to every piece of mail or letter are created in the personal computer.

In a first embodiment of the invention, shipping and/or cost center data are printed alphanumerically in the address field or are printed in addition to the letter content.

The invention can also avoid limitations in the implementation of the mail processing. Window envelopes, standard envelopes as well as other envelope shapes as are preferred by some private carriers can be employed, whereby envelope stuffing can be implemented in the office in which the letter is produced. Moreover, addressing of the mailings is already implemented in the office.

The franking ensues as is standard in the mail station with a postage meter machine, but the possibility has now been created of undertaking automatic inputs on the basis of scanning the mark or address and to generate arbitrary imprints in the franking in the desired way as is required by some private carriers.

This embodiment proceeds on the basis of the standard, spatial separation of the mail station from the remainder of a modern office, in which the letter contents and mailing information are produced in the office and the fee for shipping the item is changed to the specific department or office (cost center) which produced it. This is particularly advantageous when a number of small companies work in one office, sharing one mail station but having to be debited separately according to services of the carriers and independently of the other small companies. A separate cost center number is then allocated to each small company (or department of one company). A debiting related to the cost center or a department-related debiting, ensues in the postage meter machine in the mail station. The inventive method and arrangement allow the production of correspondingly separate accounting reports for the small companies or departments, and for the public or private mail carriers.

Additional, specific hardware, known as a security module, is required in order also to achieve a reliable accounting of the monetary imprint with a personal computer. Proceeding on the basis of the idea of combining the advantages of both a postage meter machine and a personal computer, the letter weight can also be determined in the personal computer, which should assumes sub-functions in order to replace the scale function. To that end, an average page weight is stored, referred to the respective cost center and the number of pages supplied from the personal computer at that cost center are multiplied by this average weight in order to determine the weight of the letter. The postage value is then subsequently calculated (adding the container weight (envelope weight) which is constant).

The operations implemented in the personal computer in the office further include the text production and processing, entry of the address and allocation of a cost center number for a debiting related to the cost center, as well as menu-guided entry of other shipping information for selection of the most beneficial carriers.

A mail carrier is selected and at least the selected carrier is using the display unit and keyboard of the personal computer. The selected mail carrier information is stored in a specific sub-area of the letter datafile, and is not to be printed out with the letter content.

A letter produced at a personal computer has a specific format with an area for a specific, imprinted address. The aforementioned shipping data are referred (allocated) to the respective recipient address, so that this data can be retrieved by conducting a search based on the recipient address.

Versions of the first embodiment of the invention proceed from the capability of modern office printers of printing a letter recipient address as well as at least the postage value, the cost center and/or carrier information on an envelope. The printing can also advantageously ensue as a machine-readable mark, for example in the form of a bar code.

This embodiment of the invention is also based on the scanning this data from the letter or envelope in the remote mail station with a commercially obtainable scanner and automatically entering the scanned data into the postage meter machine. At least one scanner is arranged in the mail delivery stream so that different formats can also be scanned.

The operations implemented in the mail station include at least the scanning of the address field or of a mark with the cost center and/or carrier information. After scanning the aforementioned information from the letter or from the envelope, further processing of this information ensues fully automatically in the postage meter machine up to the franking of the mailing.

A postage meter machine with automatic data processing according to a second embodiment of the invention scans only the address and then establishes communication for the allocated datafile in the personal computers. The datafiles are referred to below as letter files. These letter files with the stored letter contents, addresses and shipping data are stored ordered according to the current production data. The memory means, for example hard disks, of all personal computers connected to the postage meter machine via a communication means thus form a component of a distributed data bank. The advantage of this embodiment that no separate (dedicated) data bank is required from which data must be communicated to the postage meter machine.

In a third embodiment of the invention the letter-producing personal computer is also used for determining the most beneficial carrier, for making the postage calculation, as well as for driving an office printer for producing a carrier-specific franking imprint. In a version of this third embodiment, the letters are produced on different personal computers, of which, however, only a sub-set are programmed and are provided with the necessary security measures to function as a franking system. In this case, the personal computers are networked with one another in order to exchange relevant data for this purpose.

DESCRIPTION OF THE DRAWINGS

FIG. 7*c* illustrates a format for carrier-related accounting data in the postal registers in accordance with the invention.

FIG. 7*d* illustrates a format for a two-dimensional cost center/carrier matrix in accordance with the invention.

DESCRIPTION OF THE PREFERRED EMBODIMENTS

Figure 1A:
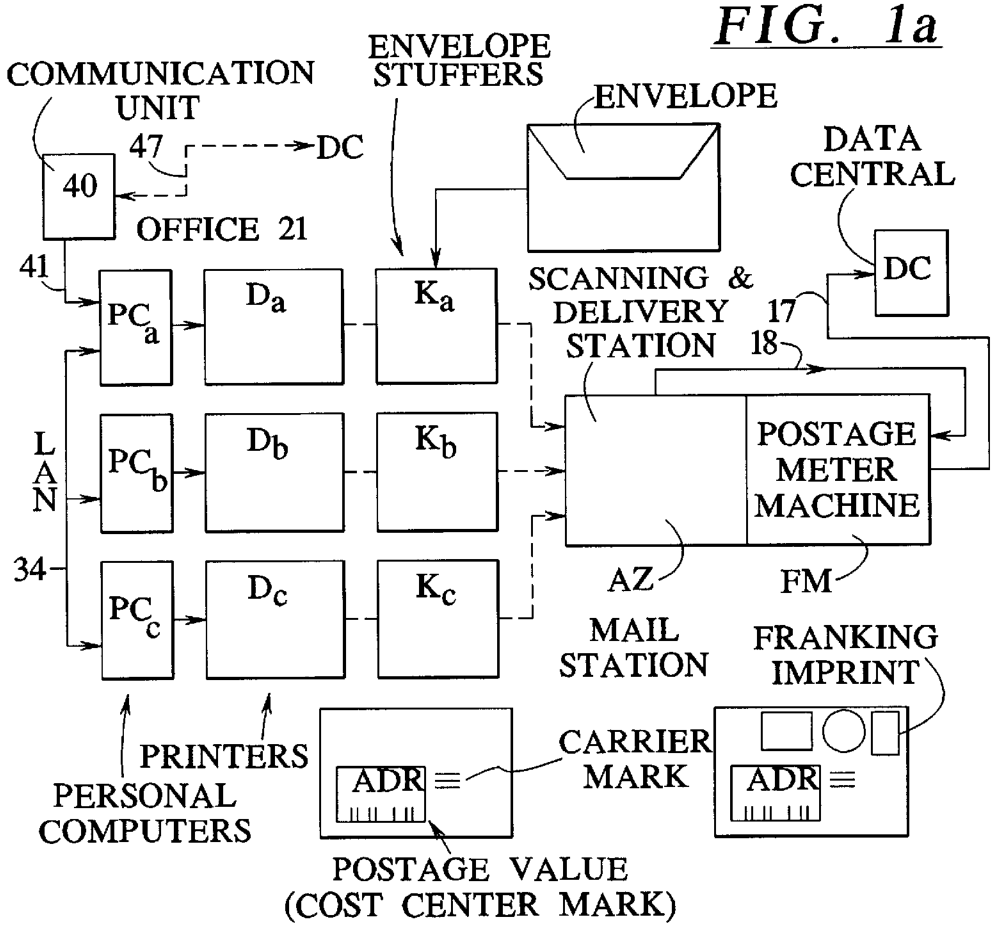
FIG. 1*a* is a block circuit diagram of a mail processing system with a postage meter machine, according to a first embodiment of the invention.

The block circuit diagram shown in FIG. 1*a* for a mail processing system with a postage meter machine shows the transport flow of mail from a modern office 21 to a mail center. In at least one such office 21, letters or inserts are produced on a number of personal computers $PC_a$, $PC_b$, $PC_c$, . . . , with associated printers $D_a$, $D_b$, $D_c$, . . . , and possibly other connected periphery devices. An envelope 30 (which can be a printed or otherwise differently identified) or a pre-printed envelope can be employed for stuffing which takes place at respective automated or manual stuffing locations $K_a$, $K_b$, $K_c$ . . . .

Figure 2A:
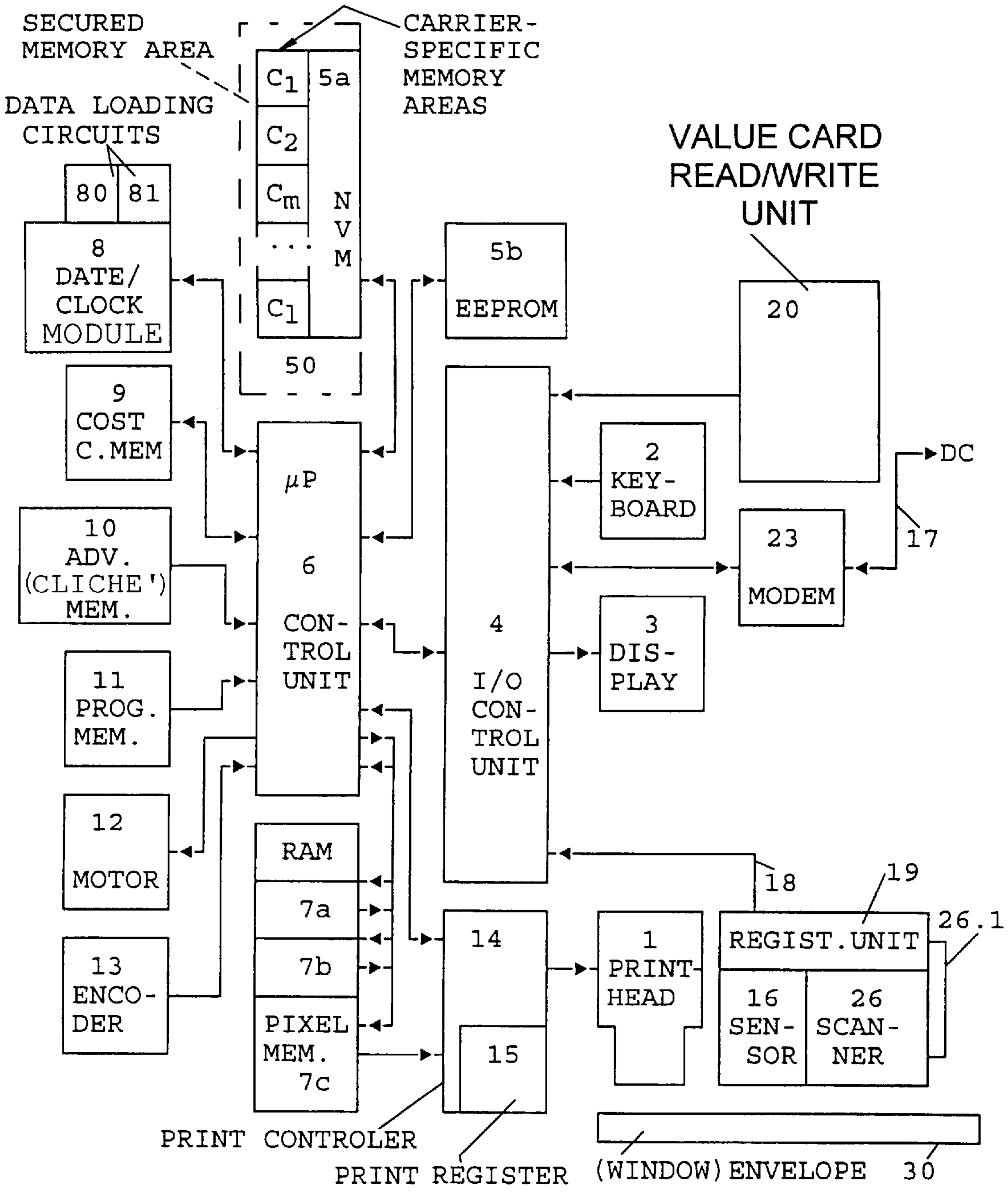
FIG. 2*a* is a block circuit diagram of a postage meter machine with automatic data input, according to a first embodiment of the invention.

In the mail station, at least one of the scanners scans the information with respect to page count and carrier or cost center that is printed on in the address field, or that can be scanned through a window of a window envelope, or is applied to the envelope on a self-adhesive label. At least one letter sensor 16 and a scanner 26 are electrically connected to the postage meter machine via a register unit 19 and a data line 18, as shown in FIG. 2*a*, and are preferably arranged in a scanning and delivery station AZ preceding the postage meter machine FM. A line 17 provides a communication connection as needed with a remote data central DZ.

The mail processing system is composed of a personal computer that is equipped with routines for pre-handling, printing out a document together with address field and mark, a printer and a postage meter machine that is equipped with routines for scanning the address field or mark in a mail station and for processing the data. The personal computer executes routines pre-handling including a routine for processing mailings and producing a document thereabout or for producing a letter, as well as a routine for determining the most beneficial carrier. The postage meter machine is equipped with a programmable processor system that is programmed for detecting a piece of mail in the transport path to the postage meter machine, and scanning a mark or the recipient address in the address field of supplied pieces of mail. As a result, information with respect to postage value as well as carrier and/or cost center information is automatically entered into the postage meter machine, and at least one call (retrieval) of non-volatilely stored setting data ensues for an automatic print data input into the postage meter machine. The postage meter machine also executes a routine for automatic modification of the non-volatilely stored setting data, for automatic print data input and checking, as well as for display in the aforementioned automatic input. Lastly, the postage meter machine processes the data in a franking mode with an accounting related to the carrier and/or cost center, before the franking.

The programmable processor system in the postage meter machine is programmed: to call further non-volatilely stored setting data in a sub-step 2040 of the first step 201 for an automatic print data entry into the postage meter machine and automatic entry of shipping information in the first step 201, which includes a mail carrier number (CIN) for the selected carrier, as well as for calling a routine for generating carrier-specific print formats given selection of a predetermined mail carrier number (CIN) and for the automatic print data input in the second step 209.

The routine for the automatic modification of non-volatile stored setting data includes a formation of request data for the reloading of current carrier data and/or carrier fee schedules. After the communication of the cost center and/or carrier information from the personal computer to the postage meter machine, the latter automatically checks whether the selected carrier is available in its memories, or whether the fee schedule table data of the selected carrier are current. If not, a communication to the remote data central is undertaken. Specific request data are thereby sent and the required data are received from the data central; this data then is loaded into the memories of the postage meter machine. Before processing the data in the franking mode, a communication with the remote data central ensues whereby, on the basis of the communicated, aforementioned request data, carrier-specific datafiles containing at least carrier-identifying image and current fee schedule datafiles are transmitted from the data central to the postage meter machine.

The postage meter machine thus automatically checks whether the selected services are current and available and otherwise enters into communication with a remote data central, whereby specific request data are sent and the required data are received from the data center, and loads the required data into its memories.

Subsequently, other personal computers can also be supplied with the updating data when a corresponding, suitable communication connection 47 is made from the data center DC to the personal computers $PC_a$. At least one of the personal computer PC*a*, $PC_b$, and $PC_c$, for example the personal computer $PC_a$, is equipped with a communication unit 40 or is connected to such a communication unit via a data line 41. The personal computers $PC_a$, $PC_b$ and $PC_c$ are networked with one another on the basis of a local network (LAN) 34 and are equipped with an updating routine that automatically insures a coincidence with current, carrier-related data that are stored in the postage meter machine. When the request for updating is communicated to the data center DC from a postage meter machine FM, the data center DC first sends updating data sets to the postage meter machine FM and then to the aforementioned communication unit 40. For example, a different telephone connection with its own telephone number is provided for the communication unit 40. The updating routine in the personal computer $PC_a$ monitors the communication unit 40 with respect to calls on the part of the data center DC.

Inventively, a check routine assures that the postage values are calculated according to the current fee schedules. These current fee schedules are offered in nonvolatile memories of the franking system for all carriers of the group. The PC of the franking system can call the aforementioned fee schedules via communication means in order to carry out corresponding calculations for determining the most beneficial carrier.

The postage fee tables non-volatilely stored in the franking system are updated when a connection setup to a data center DC ensues after the expiration of certain deadlines. A typical time span for the validity of a postage fee table is one year. The typical validity durations of the postage fee tables of the individual carriers are stored in non-volatile memories of the franking system, as is the date of the most recent fee change. The probable point in time for the expiration of a postage fee table of a specific carrier can then be determined therefrom. This point in time is monitored for each of the carriers pre-selected after the first day of a month, being monitored with the assistance of the internal clock of the franking system. When the point in time arrives, a connection is set up to the corresponding data center DC and the new postage fee table is loaded.

In another version, at every reloading of the franking system with a credit balance for the set carrier, the validity of his carrier-specific data—including the postage fee table—is checked in order to undertake the updating of the carrier-specific data as needed.

Some carriers have only one carrier-specific print image but do not communicate a credit balance pre-paid by the user into the franking system. In order to assure the current nature of such data, including the carrier-specific logo, the validity of the carrier-specific data in another version is checked dependent on the piece count of processed mailings.

The combination of the aforementioned versions yields a time-oriented, count-based and event-oriented monitoring of the current nature of the carrier-specific data for the correspondingly selected carrier from a group that was pre-selected from a number of public and private carriers.

Alternatively, the communication unit 40 of the personal computer $PC_a$ can communicate with a communication unit 23 of the postage meter machine in the two embodiments. The postage meter machine then preferably sets up communication to the personal computer $PC_a$ in order to communicate sets of updating data. The communication unit 23 can be a modem, other communication means, for example a chip card write/read unit or a mobile radio telephone receiver/transmitter unit.

Advantageously, a solution is created in order to be able to load at least the fee schedule tables of the respective carrier which is valid for the location of the system as needed, and to call them for a mail carrier. (USPS, UPS, DEUTSCHE POST AG or others).

The printer, in particular, can be a commercially available printer equipped for printing envelopes that is connected to the personal computer. Further, address printing can ensue onto self-adhesive labels that are stuck onto the envelope.

A window envelope or a pre-addressed envelope is employed for stuffing. Given the employment of window envelopes, the mail can also be possibly placed into envelopes in the mail station when the required information can be taken from the window field by scanning.

Figure 1B:
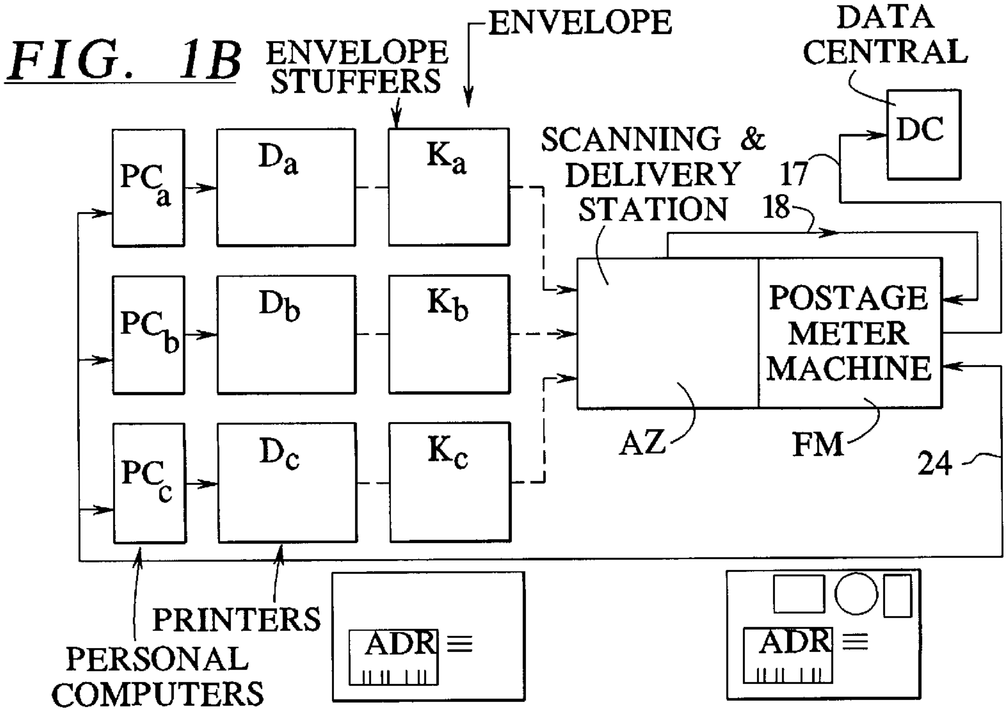
FIG. 1*b* is a block circuit diagram of a mail processing system with a postage meter machine, according to a second embodiment of the invention.

The block circuit diagram for a mail-processing system with a postage meter machine shown in FIG. 1b in a second embodiment additionally has a communication connection 24 between the postage meter machine FM and at least one personal computer in the office 21.

In the mail station, at least one of the scanners scans the letter recipient address that is printed on in the address field, or that can be scanned through a window of a window envelope or is applied to the envelope as a self-adhesive label. The scanner is electrically connected to the postage meter machine FM via a data line 18. The printed-on information may include the page count, that is communicated to the postage meter machine FM in order to at least determine the weight data of the letter in the postage meter machine FM. The postage meter machine FM can engage in communication as needed with a data center DC via a suitable communication link 17.

The postage meter machine can form request data from the address data of the letter recipient scanned with scanners in the mail center in order to request additional data in the office 21 that are communicated directly to the postage meter machine from the respective personal computer $PC_a$, $PC_b$, $PC_c$, via the data line 24. The scanner 26 (and other scanners) can be components of an automatic scanning and delivery station arranged in the mail station at the mail station at the start of the transport path to the postage meter machine FM.

Figure 2B:
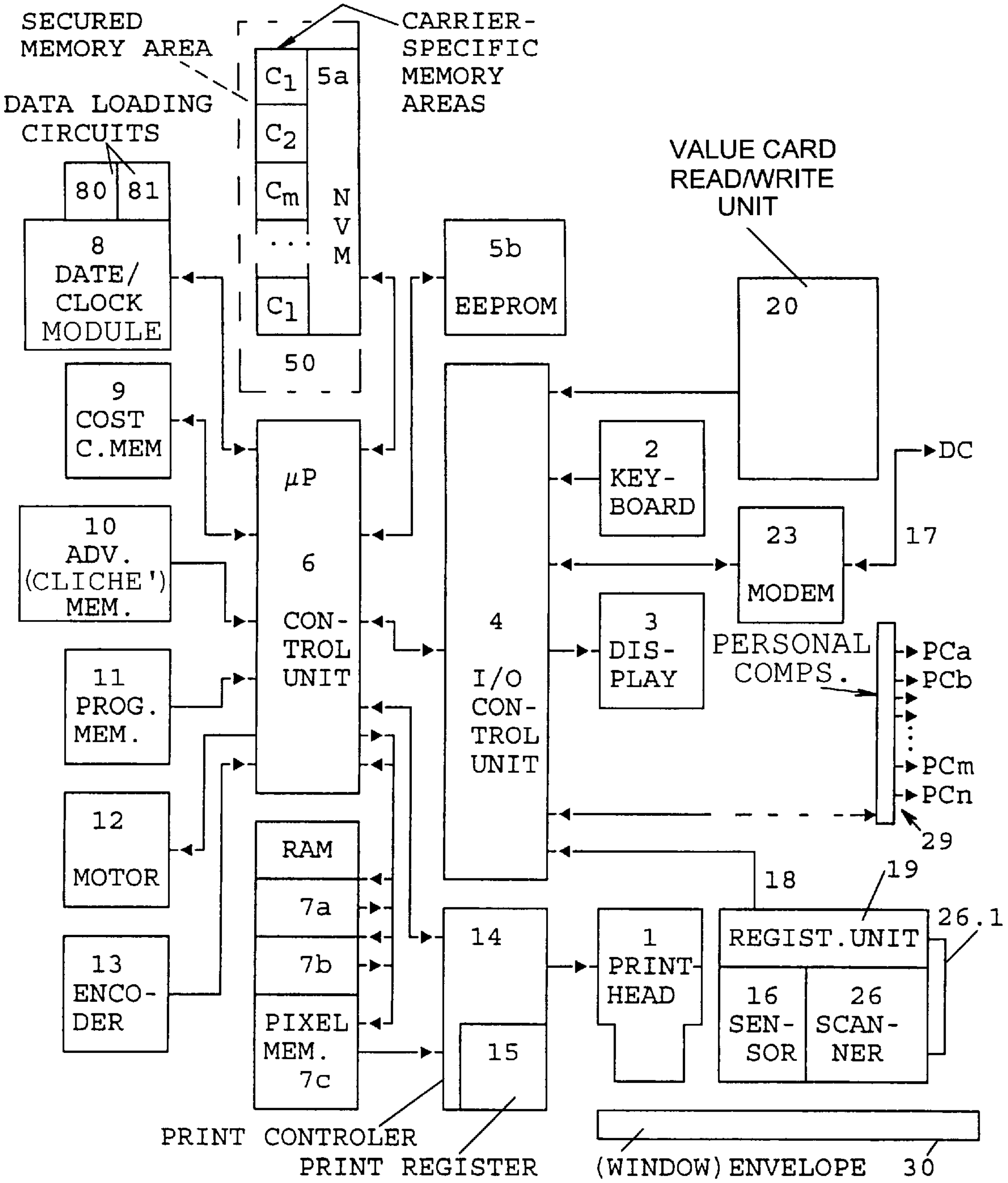
FIG. 2*b* is a block circuit diagram of a postage meter machine with automatic data input, according to a second embodiment of the invention.

The scanner 26 (and other scanners, if present) is positioned at a suitable location in the mail path preceding the postage meter machine. This position is derived as a result of uniform mail regulations for the position of the address. Corresponding programs for the position of the addresses exist in memories of the respective personal computers $PC_a$, $PC_b$ or $PC_c$ in the office 21 that drive a printer in common or use separate printers according to the aforementioned areas to be printed. A bar code can additionally be printed on the envelope, i.e., in the address field of the envelope. A differently positioned further scanner 26.1 can be provided for a different format of the envelope. The scanners 26 and 26.1 are connected, together with a first mail sensor 16, to with a register unit 19 that intermediately stores data and implements a parallelto-serial conversion. For serial data transmission, the register unit 19 is electronically connected via the data line 18 to an input/output control unit 4 of the postage meter machine, as shown in FIG. 2b.

The inventive method and apparatus are based on an intentionally produced relationship between the address of the letter printed out and allocated information in the letter files in one of a number of personal computers, whereby, after scanning the address, formation and communication of search request data and a search in the memories of the personal computer, additional information for the aforementioned address required for the automatic data entry is electronically transmitted to the postage meter machine via a data line. The allocation of the information to the address is fetchably stored in the personal computer, for example ordered according to time data, in order to enable access to the most current datafile with the same address as the scanned address. The allocation of the information ensues in the personal computer upon the storage of the addresses that are printed out with the letter contents. After a first preparatory step for creating a letter file within the framework of a letter production program, further preparatory steps are executed, and an allocation of the printed-out letter to the aforementioned address and the allocation of aforementioned, transmittable, additional information to the address is fetchably stored in the personal computer according to time data. This additional information inventively includes the page count of the produced letter.

Upon a scanning of the return address, the corresponding cost center or department can be identified in a manner analogous to that for the carrier information. The personal computers in the office are searched by the postage meter machine in the mail station for a cost center number that is allocated to the return address. Such a method for data processing in a mail shipping system includes known steps for printing out a document together with an address field and mark, scanning the mark in a mail center, and processing the data as well as franking with a postage meter machine. As a result of the scanning of the return address and/or of the mark for the return address and searching of the personal computer for a stored allocation to the aforementioned return address, the cost center number is inventively automatically entered into the postage meter machine, with an automatic entry of the imprint number on the basis of the entered cost center number, for automatic print data input and for cost center-related accounting before the franking.

In a version of this embodiment, scanning of the return address as well as of the letter recipient address and/or of the corresponding mark on the piece of mail takes place in the transport path to the printhead of the postage meter machine FM. Subsequently, the postage meter machine FM searches a personal computer for allocated, stored information. The determination of the personal computer responsible for the storage of the letter file on the basis of the return address is advantageous in this version. The search process for the relevant letter file is thereby shortened significantly in the case of a large number of personal computers in the office 21.

If the addresses are scanned through a window envelope with the scanner 26, the allocated information with respect to the cost center and the number of pages as well as further shipping data, including the carrier identification number (CIN), that are stored in the personal computer in the office 21 can electronically called by the postage meter machine FM in the mail station via the data line 24. The aforementioned, allocated information stored in the office 21 serve for the automatic setting of the postage meter machine FM, which makes a manual operation virtually superfluous.

Of course, such a pre-set carrier can nonetheless be manually changed in the mail station when, for example, the input was not actuated in the office 21 or when some other carrier is more favorable. When shipping a number of letters produced on the same day to the same postal zip code, it is generally assumed that it is more economic not to use a number of different private carriers, but instead to ship all such letters using the same carrier. A complete automation can be achieved when the best carrier is determined in the office 21, as explained below with reference to FIGS. 1c and 1d.

A postage meter machine with automatic data processing according to the second embodiment of the invention scans only the address and then searches for the allocated datafiles in the personal computers. The datafiles with the stored letter contents, addresses and shipping data are stored ordered according to the current production data. The memory means, for example hard disks, of all personal computers connected to the postage meter machine via a communication means are a component part of a distributed data bank.

Inventively, at least the recipient address that is printed out together with the letter content and that is visible in the window of a window envelope is scanned in the mail station. The clear text recognition, such as using an optical character reader (OCR), ensues in the scanner itself or in the postage meter machine FM, which then electronically communicates the recipient address thus converted into electronic data to a personal computer via a communication means as search request data. The personal computer searches all datafiles (letter files) to which a letter content is allocated according to recipient address, and electronically communicates the allocated cost center and shipping information to the postage meter machine FM via the communication means.

A mail carrier selected with the user interface of the personal computer is stored as mail carrier information allocated to the letter recipient address in the letter file every time a letter is produced, but is not printed out together with a contents of the letter. For a subsequent franking, the allocated carrier information can thus be determined again later via the recipient address as a search request. According to the second embodiment, this information is electronically transmitted from the personal computer to the postage meter machine FM via the communication means. In the third embodiment of the invention, this information is transmitted to the corresponding security module. This implements the postage calculation and generates the print format pertaining to the selected carrier and the selected carrier service and sends this to the connected printer.

A further version of the second embodiment of the invention proceeds from the capability of modern office printers of printing a letter recipient address as well as a return address on an envelope. A letter produced at the personal computer has a format with respective areas for a specific, imprinted return address and recipient address when, alternatively, a window envelope is employed. The appertaining data for an automatic data input into the postage meter machine FM can then be derived from the return address and from the recipient address in this version.

Some mail carriers require that a bar code be printed in addition to the clear text address in order to achieve a machine-readability of the addresses in a simpler way. With the invention, there is then a possibility of franking such envelopes. This requires scanning the addresses from the letter or envelope in the remote mail station with a commercially obtainable scanner and automatically entering them into the postage meter machine FM. At least one scanner is arranged in the mail delivery stream so that different formats can also be scanned. After the clear text recognition (OCR) or bar code recognition, a formation of search request data ensues in the postage meter machine, the search request being electronically communicated to the personal computer via a communication means. The allocated carrier information can thus be determined again later using the recipient address as a search request and can be electronically transmitted from the personal computer to the postage meter machine via the communication means.

Compared to the first embodiment, the second embodiment has the advantage that no additional information have to be printed in the address field of the letter. It is possible, however, to further shorten the search in the distributed data bank by printing a single auxiliary information identifier. This is especially advantageously utilized given a large number of personal computers in the offices 21 that all send mailings or letters to a postage meter machine FM.

The auxiliary information is preferably the date and time of day when the letter was stored. The required shipping information are stored according to data and time of day on a hard disk of that personal computer on which the letter text was written. Another auxiliary information identifier can be a code for the identification of the personal computer.

If the personal computers were individually interrogated for a letter file currently stored under the address, this could lead to confusion if different letters to the same addresses were produced at different personal computers on the same day. Such confusion is made less likely by incorporation of time data in addition to the date that is already printed on the letter. Confusion that could still occur if different letters to the same addressee are produced at the same personal computer on the same day can be precluded by an identification code in another version. Such an identification code contains at least one character, for example a letter, for the identification of the personal computer or text files with identical addressees. This code can be automatically produced by an expanded text program in the personal computer.

An advantage of the first and second embodiments, including the aforementioned versions, is that a mail-processing system is provided in which the sequence of the supplied letters in envelopes can be interchanged in the further processing between personal computer and postage meter machine. The chronologically and locally unordered deliveries of the letters that have been printed and placed in envelopes to this mail station do not allow a prescribed sequence in the processing of the letters. Insuring manipulation-proof functioning even when interchanging the sequence of the mailings is of decisive significance when letter texts are produced on a number of personal computers but are franked in only one mail station. In the third embodiment, the problem is avoided by initially implementing the franking with the PC franker immediately after the creation of the letter and a corresponding franking imprint ensues on the empty envelope. Only then is the letter placed in the envelope, this being generally manually done given a low mail volume.

A further advantage of the second embodiment is that the shipping class could be redefined between the time the letter text is produced and the franking thereof in the mail station. For example, an originally standard letter can be made into an express mailing or, given a registered letter, the return receipt subsequently can also be determined to be required. The postage meter machine reports the completion of the franking to the corresponding personal computer and initiates an "o.k." mark in the corresponding text file. The letter writer thus always has the possibility of checking at the personal computer to determine whether the in-house processing of his letter has already ensued.

The debited postage fee can also be transmitted from the postage meter machine to the appertaining personal computer and can be cumulatively stored in the personal computer. It is thus possible at any time to check how much postage was incurred by letter mail that was produced on this personal computer. This is meaningful especially when the personal computer represents a personal computer cost center, i.e. when exactly one cost center is allocated to each personal computer.

The invention also makes it possible to produce a correlation of the departmentrelated accounting in the personal computer to the department-related accounting of postage fees according to cost centers in the postage meter machine, with little outlay.

Another version is based o a number of personal computers in the office belonging to a common cost center and sending mail to the same postage meter machine. When non-volatilely stored setting data for entering the print data into the postage matter machine are called, then the same cost center number is called and, consequently, the same advertising slogan (cliché) is also printed out during franking. The letter recipient addresses and the letter files created at different points in time, however, are different. Selected, different carriers can then be allocated to these, stored as carrier identification number (CIN). The interrogation of the letter files by the postage meter machine on the basis of the sensed address enables the changes of a carrier selected for shipping the postal matter to be automatically taken into consideration. A variable, carrier-related logo can therefore be printed out during franking.

In another version the personal computers in the office do not belong to a common cost center, but always select the same carrier. When non-volatilely stored setting data for the input of the print data into the postage meter machine are called, then the same carrier number or CIN is called. The interrogation of the letter files created at different points in time by the postage meter machine on the basis of the scanned address enables the different cost centers to be automatically taken into account. The routine for automatic modification of non-volatilely stored setting data contains a sub-routine for allocating a cost center number to a slogan number for the automatic entry of the slogan number given input of the associated cost center number. It is thus possible that, via the slogan number allocated in this way, the variable, specific advertising slogan for each cost center (department or, respectively, small company) is automatically set and printed out during franking.

On the basis of the address scanned by the postage meter machine, the combination of the aforementioned versions enables the different cost center and carrier selection to be automatically taken into consideration in conjunction with the postage value communicated to the postage meter machine. Simultaneously with the carrier selection, the postage meter machine can also interrogates other selective print types (for example, air mail, return receipt, etc.) or other settings.

The communication of the required setting information to the remote postage meter machine is initiated via a data line on demand by the postage meter machine, whereupon the postage meter machine is supplied with data from the aforementioned personal computer.

The operations performed in the personal computer in the office 21 include the text production and processing, including a determination of the number of pages, entry of the address and allocation of a cost center number for a cost-center-related accounting, the menu-prompted selection of the shipping types, shipping forms, or determining further or other information about the most beneficial carrier, the formation of carrier information and the allocation of all information to the aforementioned address as well as storage of the allocation. As needed or periodically, accounting reports that are correlated with the cost-center-related accounting in the postage meter machine are printed out via an ordinary, connected printer, these being correlated with the cost-center-related accounting in the connected postage meter machine according to the first and second embodiments.

The inventive improvements of the franking system achieve a largely automatic processing of the letter while making use of different fee schedule structures of various carriers, while still allowing flexibility with respect to the debiting vis-a-vis different carriers. Given the elimination of the governmental mail monopoly for sending letters, an increase in mail delivery by regionally, nationally or internationally acting private carriers can be expected. It is in fact already known from package shipping systems to prepare accounting statements for various carriers. The accounting statements for various carriers given utilization of package shipping systems generally ensues with a debit note method. Such an accounting, however, does not make any automatic processing, postage calculation and security monitoring available to the customer as is prescribed, for example, by postal authorities for the letter processing, whereby a credit balance is administered in the franking system. A protected accounting vis-a-vis various private carriers is also established in a franking system for letter processing that is equipped with the inventive features.

If a carrier or service was newly selected and the postage table for the selected service or carrier is not available or does not belong to the permanently stored postage tables due to limited memory capacity, the franking system automatically dials a data central operated, for example, by the franking system manufacturer and the required updating data are loaded into the memories of the franking system. Each postage table can have a date allocated to it for when it takes effect and/or for the minimum validity duration. The franking system contains a real-time clock to whose date the minimum validity duration of the corresponding postage table is compared in order, if necessary to request a new table via the data center. A corresponding identifier can be printed in the franking field for identifying the postage table employed.

The postage calculating module of each personal computer requires the same stored postage table belonging to the carrier. The coincidence is produced with an updating routine in the personal computer. The specific postage is calculated on the basis of data that already exist, such as format, type of shipping, as well as on the basis of a page count and of the average page weight.

The charge to the user with the specific postage amount is debited on the postage account of the carrier that is likewise automatically set. This is possible both in a debit note method as well as in a pre-paid method. In the debit note method, a debit account is read, whereby the stored value is incremented by the postage value to be franked. In the pre-paid method, a pre-paid amount is maintained in the credit account of the postage meter machine as an electronic credit. Another accounting version is to undertake the accounting on a specific chip card (similar to a telephone card or value card) brought into contact with the franking system, that is edited by a number of carriers. As the result of the selection of the carrier that has already been undertaken, however, a universal carrier card can be employed instead of a value card, with a memory area for each carrier in which the accounting data are stored being reserved therein.

By using a modem, an electronic communication of accounting data to the remote data center can ensue at time intervals, the remote data center implementing the accounting with the carrier on commission from the customer. Alternatively, the data central, after an inquiry at the customer's bank directed to the solvency (credit check), can grant the customer a credit and communicate a credit balance. Information about the appertaining type of accounting and the respective logo that identifies the employment of a current carrier fee schedule are allocated to the selected carrier. The aforementioned information and the allocation are stored in the franking system for each selectable carrier. As needed, a document about the successful recrediting can be printed out with the printhead of the postage meter machine for each mail carrier respectively after a completed recrediting. For the first and second embodiments, this requires a switching of the postage meter machine to an internal printing mode. It is also provided that a listing regarding individual financial recrediting data within a time span and other register or service data are printed out as document by the printhead of the postage meter machine when this is desired.

Figures 1C, 1D:
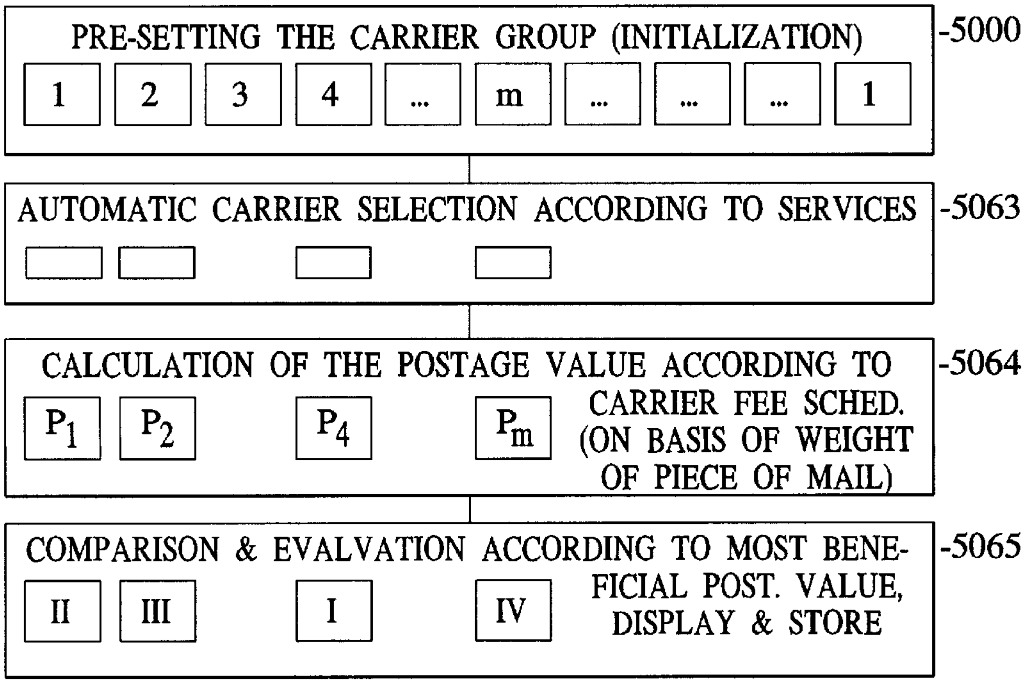
FIG. 1*c* illustrates a table of comparable carrier services for use in the inventive method and apparatus.
FIG. 1*d* illustrates method steps for determining the most beneficial carrier in accordance with the invention.

FIG. 1*c* shows a table of comparable carrier services as an example of a possible embodiment of the stored data.

The user of the mail shipping system first determines what service requests are to be made of the carrier. To that end, the user enters the data about the delivery zone and the desired special services such as express delivery or return receipt with the keyboard of his personal computer. Given stacked post, the user likewise must entry the scope of individual mailings the stack will comprise. In a first selection step, a determination is made with the assistance of a mask as to what carriers offer the requested service profile at all. When, for example, a shipping into the delivery zone B ensues and when a return receipt is requested, only carriers 3 and 5 according to the above table in FIG. 1*c* proceed into the further selection. In a second selection step, a cost optimization is implemented taking the basic fee schedules B, the special services such as return receipt S and the disk count scale R into consideration:

B3+S3−R3=P3

B5+S5−R5=P5

The summed individual fees yield the postage fees P3 and P5 for both of the carriers 3 and 5 who have proceeded into the further selection.

In a third step, the postage fees P3 and P5 are compared and the most costbeneficial carrier is suggested to the customer of the postage meter machine as optimum carrier P(min). Given a letter quantity of 200 letters, the above example yields:

P3=3.70 DM

P5=4.55 DM, as a result

P3=P(min)

derives as the optimum carrier.

In an especially user friendly version, the user of the mail shipping system is also presented with the second-best carrier or others. The user of the mail shipping system can then agree with the optimization proposal for non-quantifiable reasons (for example, familiarity with a specific carrier).

An exemplary embodiment that is shown in FIG. 1*d* is directed to the method for determining the most beneficial carrier.

When the franking system is commissioned, this must be initialized in view of its location and a selected number from a series of mail carriers. A comparable initialization step 500 for every personal computer connected to the mail processing system is likewise provided, corresponding sub-steps being allocated thereto. Each of the personal computers can thus be initialized for a group of carriers in a sub-step 5000, whereby an identical group is also pre-selected in the correspondingly initialized franking system.

According to the customer's wishes, a selection of the carriers provided for the mail shipping is already undertaken in the initialization by the dealer. This can ensue based on criteria like local presence speed of delivery, dependability or favorable fee schedules.

For this purpose, the data of the standard commercial carriers can already be stored in the franking system by the manufacturer and can be confirmed by the user or dealer. Additional carriers that, for example, are only locally active can be re-loaded via the keyboard on the basis of a corresponding interrogation routine. As a result of the pre-selection, carrier-related data of a group of carriers exist in the memories of the franking system. The data in the non-volatile memories of the franking system are constantly monitored for carrier-specific criteria.

The pre-selection of a group of carriers for the franking system and the storing of the carrier-related fee schedules of the services offered ensues, for example, with diskettes via the diskette drive, or via CD-ROM or via other transmission means. The desired carrier is then selected from the aforementioned group of carriers by the customer or automatically according to the criteria input by the customer. The current nature of the stored data is assured by an appropriate routine that is likewise loaded with one of the aforementioned transmission means. In a sub-step 5000 for presetting the group of carriers, the pre-selection leads to 10 locally active carriers. A sub-step 5063 within a program run for personal computers allows an automatic carrier selection according to the selected services and/or other criteria. In the example shown in FIG. 1*d*, the carriers are identified with the numbers 1, 2, 4 and m, these carriers offering the desired service or, respectively, meeting the desired criteria. In a following sub-step 5064, the respective postage value P1, P2, P4 and Pm is calculated for the aforementioned, selected carriers, this postage value being derived according to the current fee schedule. A comparison and evaluation in terms of the most beneficial postage value subsequently ensues. For example, the postage value P4 was identified as most beneficial postage value, for which reason rank I is allocated to the fourth carrier. The first, second and an $m^{th}$ carriers lie on the following places II–IV. The result is displayed and stored.

The second embodiment employs a data line 24 between the postage meter machine and a personal computer as component part of a communication means.

It is inventively assured by a check routine of the franking system that the postage values are calculated according to the current fee schedules. After the manufacturer's offering in the memories of the franking system or after a data transmission from a data central and subsequent storing in the memories of the franking system, these current fee schedules are non-volatilely stored for all carriers of the group. Based on time data and/or piece number data or event-dependent, a monitoring of the current nature of the carrier specific data is undertaken corresponding to the carriers of a group that was pre-selected from a multitude of public and private carriers.

The franking system thus automatically checks whether the selected services are available and otherwise enters into communication with a remote data central, whereby specific request data are sent and the required data are received from the data central, and loads the required data into its memories.

After the pre-setting in sub-step 5000, an automatic carrier selection inventively is executed in the franking system in a sub-step 5063 given every letter production with a processing of inputs with respect to making service demands of the carriers. As a result, a series of those carriers is selected from the aforementioned group of carriers which can fundamentally meet the service demands that have been made.

In a further sub-step 5064, the calculation according to the carrier fee schedule ensues again in the routine of the franking system for the aforementioned series of selected carriers.

The franking system additionally assumes sub-functions in order to replace the scale function. The calculation of the weight of the postal matter or letter is preceded by a calculation of the postage fee on the basis of current fee schedules for selected services. To that end, the average page weight or insert weight, stored respectively related to the respective cost center and the page count or insert count are multiplied in order to determine the letter weight or the postal matter weight.

In addition to the services, the fee schedules of the carriers are also stored in the franking system in a comparable form. The postage values according to the current fee schedules are calculated using the fee schedules in the franking system and based on the calculated weight.

The calculation of the postage fee Pm for the $m^{th}$ carrier from a group of carriers $1 \leqq m \leqq I$ ensues in the sub-step 5064 on the basis of current fee schedules for selected service demands according to the general equation:

$$(D_{1m}^* \ldots D_{rm})(B_m + C_{hm} + \ldots C_{hm}) + E_{1m} + \ldots E_{gm} = P_m \qquad (1)$$

with the basic fee schedule $B_m$ for a service of the $m^{th}$ carrier, fee schedules $C_1$ through $C_h$ in the range from $-\infty$ through 0 for I through k services of the carrier (for example, with respect to shipping form and shipping class) or in the range from $-\infty$ through 0 for 1 through h services of the mail dispatcher (for example, pre-sorting, bundling), rebates for services $D_1$ through $D_r$ in the range from 0 through $\infty$ for specific quantities of mail, as well as with fee schedules $E_1$ through $E_g$ in the range from 0 through $\infty$ for 1 through n special services of the carrier such as insurance and the like or in the range from $-\infty$ through 0 for 1 through n special services of the mail dispatcher (for example, with respect to shipping form and shipping class) or one-time price reductions by the carrier.

When another carrier meets the service demands that have been raised, a calculation of the postage fee Pq for the $q_{th}$ carrier from a group of carriers $1 \leqq q \leqq I$ is likewise implemented on the basis of current fee schedules for selected service demands according to the aforementioned general equation (1). An implementation of comparisons of the postage fees $Pq \leqq P_m?$, $P_m < P_q?$ subsequently ensues for cost optimization in the limited, automatic selection of the most beneficial carrier, or for producing a list sorted according to the costs of the postage fee.

A carrier identification number (CIN) is allocated to each carrier. A calculation of postage value in the sub-step 5064 according to the entered shipping information in the second selection step 5063 precedes the determination of the most cost-beneficial carrier in the sub-step 5065. As a result of the postage value determination in the sub-step 5064, the postage value is stored and the carrier identification number is then incremented. A determination of the postage value then follows in turn for the following carrier according to the entered shipping information, whereby the postage value is stored and the carrier identification number is then again incremented. This procedure is only terminated when the determination for the last carrier coming into consideration from the group has been implemented and when a comparison of the calculated postage values among all carriers of the group of the carriers coming into consideration has been carried out.

The disclosed method for calculating the most beneficial carrier is implemented on the personal computer in a version of the invention. In a further version of the invention the method is conducted in the processor system of the postage meter machine. In this case, the keyboard of the postage meter machine is utilized for the inputs of the postage-defining data, whereas the display of the calculated, most beneficial carrier ensues on the display of the postage meter machine.

The block circuit diagram of a postage meter machine shown in FIG. 2*a* has a programmable processor system that is connected to at least one scanner 26 and a modem 23, a chip card write/read unit 20 and/or other, corresponding reception means or input means. The scanner 26 for the address is positioned at the start of the secure mail path in the mail center. This position derives as a result of uniform mail regulations for the position of the address. Corresponding programs for the position of the address and of the other information exist in memories of the respective personal computers $PC_a$, $PC_b$ or $PC_c$ in the office 21 that drive a printer in common or separate printers according to the aforementioned areas to be printed. An additional line can be provided on the envelope or in the address field of the envelope as the area to be printed. A differently positioned further scanner 26.1 can be provided for different formats of the envelope. The scanners 26 and 26.1 together with a first mail sensor 16 are connected to a register unit 19 that intermediately stores data and implements a parallel-to-serial conversion. For serial data transmission, the register unit 19 is electronically connected via the data line 18 to an input/output control unit 4 of the postage meter machine.

In the postage meter machine housing, input and output units such as a keyboard 2, a display 3, the chip card write/read unit 20 and the modem 23 are connected via the input/output control unit 4 to a processor system having a postaloriented security region 50, by a direct connection or via a bus (not shown). The processor system is composed of at least one memory means having a non-volatile memory (NVM) 5*a*, with carrier specific memory areas $C_i$, $C_m$, and an EEPROM 5*b*, a clock/date module 8 and a processing unit (CPU) functioning as a control unit 6 and, possibly a specific circuit or program source 80 and/or 81 for automating the loading of data from a data central via modem or chip card, or some other suitable transmission means. The special circuit and/or program source 80 and 81 are preferably a component part of a battery-supported, non-volatile memory (CMOS-NV-RAM) in the clock/date module 8. Further supporting programs can be present in the program memory 11 and/or in a non-volatile EEPROM stored in the memory 5*b*. A print controller 14 is fashioned, for example, as an ASIC and is matched to the respective, preferably digital, printing process, and operates with a print register 15.

The input/output control unit 4 may include the print controller 14 and be connected in to the control unit 6 of the postage meter machine via a bus and, for example, can be fashioned as an ASIC. A printhead 1 is connected to the print controller 14.

The various memories are usually composed of a number of permanent and temporary, non-volatile memories. Together with the control unit 6, one part of the memories forms a postage calculator in a known way an another part forms a protected postal region within the processor system. Work is carried out with the non-volatile memories of the aforementioned, other part of the memories for accounting. It is particularly provided that the protected postal region 50 be equipped with a specific accounting unit that works in a completely counterfeit-proof way and relieves the control unit 6 of this task job. The protected postal region 50 of the processor system of the postage meter machine can be fashioned as a hardware-controlled accounting unit in the form of a special circuit module or, for example, as an ASIC, so that the executive sequence during accounting cannot be manipulated in an unauthorized way, as disclosed in German patent application 196 03 467.1, corresponding to co-pending U.S. application Ser. No. 08/788,188 now abandoned filed Jan. 24, 1997, entitled "Postage Meter Machine."

In addition, an area organized according to carrier and cost centers can be provided in a special cost center memory 9 in order to execute operations related to the cost center or cost centers. Additional cost centers can thus being established or deleted without the reliability against manipulation be diminished. The protected postal region 50 within the processor system can only be read, but not overwritten. During the service life of the postage meter machine, data such as the number of pieces franked and total amount used for franking with a postage value can always only be incremented but never decremented. In particular, the postage calculator can be formed of the control unit 6 and memory areas of the EEPROM 5*b* and/or other non-volatile memories. Some of the memory areas of the EEPROM 5*b* are intended for the acceptance of fee schedule tables of the individual carriers.

Differing therefrom, individual costs and their data (number of pieces, total amount used) in the cost center memory 9 can be reduced by a predetermined amount, or can be set to zero at the start of an accounting period. The correspondingly actuated keys of the keyboard 2 and/or other input means produce a connection to external memories in order to execute operations related to cost centers.

The program memory 11 of the memory means of the postage meter machine contains programs for initiating and conducting a communication via interfaces in the input/output control unit 4 with the scanner 26 and with input units 20 through 23 and with at least one of the personal computers $PC_a$, $PC_b$ and/or $PC_c$ at the office 21. In this context each of these personal computers with its connected keyboard and monitor can be considered as a peripheral input/output means for the postage meter machine FM for searching for and entering data. Other peripheral input/output means (not shown in detail) can be connected to the processor system of the postage meter machine. At least one parallel interface to the display unit 3 and, in conjunction with the print controller 14, at least one serial interface for print data control and data transmission to the drive electronics arranged on the printhead 1, can be provided in the input/output control unit 4. A further serial interface can be connected via the aforementioned register unit 19 to a number of scanners or sensors. At least one scanner 26 is a pixel sensor with a high resolution. Its data bits are output in parallel and are converted into serially fetchable data bits with a sensor shift register in the register unit 19 driven by the input/output control unit 4. The input/output control unit 4 is preferably fashioned such that a number of sensors or actuators with one or more connected sensors or actuator shift registers can be connected via a shared serial interface data line 18 to a single shared shift register in an actuator/sensor controller in the input/output control unit 4, as disclosed in greater detail in the German application No. P 44 45 053.2, corresponding to co-pending U.S. application Ser. No. 08/568,019 now U.S. Pat. No. 5,710,721 ("Internal Postage Meter Machine Interface Circuit" Rieckhoff et al) filed Dec. 6, 1995 and assigned to the same assignee as the present application.

The base (not shown in detail) of the postage meter machine is composed of the printhead 1 and a power electronic/sensor/actuator module 12 that contains an energy supply and control for the drives (paper transport, printer, tape, tape dispenser) and the required drive motor. The printhead and the module 12 and an encoder 13 for acquiring the transport speed of the piece of mail lie in the base and are coupled to the processor system directly and/or to the processor system and, possibly to other peripheral input/output means in the mail station or in the office 21 via the input/output control unit 4 via appropriate interfaces.

The postage meter machine has a reception means such as an external modem 23 and a modem interface in the postage meter machine for the external modem 23 or for an internal modem. A communication with the remote data central DC is enabled via modem. An electronically stored credit thus can not only be replenished in the postage meter machine, but also current fee schedule table data and other data can be communicated.

In another version, a telecommunication network is provided that externally contains a memory with the fetchable data and/or flags for reloading of auxiliary functions and information into the postage meter machine. The external memory is supplied with updating data from the public postal authority and/or private carriers, preferably via the aforementioned data central DC.

Alternatively, an external memory with required updating data can be provided in a mobile radiotelephone communication network and can be addressed by a corresponding communication connection and communication means. An intermediate storage in the transmission means ensues, and data packets are then transmitted under the control of the postage meter machine and an automatic transfer of the current fee schedule by the postage meter machine is thereby potentially assured. The storage of the fee schedules ensues according to various public mail carriers or private carriers in separate memory areas of the aforementioned postage calculator.

Specific inputs can be undertaken with an alternative input means, particularly a chip card. This is brought into contact with the chip card write/read unit 20 serving as an input means. The interface board of the chip card write/read unit 20 is connected to a serial interface of the postage meter machine. The contacting means in the write/read unit 20 comprises at least six contacts and the data exchange between the unprotected and/or the protected card memory area and a non-volatile memory of the program memory 11 of the postage meter machine is automatically serially undertaken in the framework of a communication protocol as soon as the chip card has been plugged into the plug-in slot of the write/read unit 20.

Such a special mail station chip card for the employees in the mail station can be advantageously utilized for entering location data. A correspondingly programmed chip card is delivered to the user after authorization of a new location or a change in location. Before the machines of the mail station are transported to a new location, it is necessary to turn them off. A location-specific initialization of the postage meter machine automatically ensues after turn-on. So that the postage meter machine need not be switched on or off often at the same location, a standby mode is provided.

With the same chip card delivered to the user, a corresponding postmark imprint text part for the modified name of the municipality and, if needed, for the modified postal zip code is loaded into the postage meter machine in addition to the setting in order to be able to modify the print image data already stored in conformity with the change in location, as is disclosed by European Application 566 225.

Every allocation of semi-variable print image data (window data) that fill up a specific window in the print format (frame data) is stored in specific memory areas of, for example, the EEPROM 5*b* and/or of another non-volatile memory of the postage meter machine FM.

In the franking mode a cost center-specific accounting of the automatically or manually set postage value ensues before the printout of the franking format, this being explained in greater detail in connection with FIGS. 7*a* through 7*d*. It is also provided that a printout can be produced for the cost center-specific accounting by the postage meter machine, as disclosed in German OS 42 24 955. In the first embodiment of inventive mail shipping system, a print requirement upon introduction of a sheet of paper into the printing region is recognized by a standard, mail sensor 16 and, as a reaction to a preceding, manual input including entry of the cost center number in conjunction with a function key, the postage meter machine then produces a printout. The postage values that have been used are listed individually and cumulatively related to various carriers. The cost center printout is regularly sent to the appertaining department in the office 21 or in response to a specific request.

The block circuit diagram of a further version of the franking system shown in FIG. 2*b* has a programmable processor system that is connected to at least one scanner 26 and a modem 23, a value card write/read unit 20 and/or other, corresponding reception means or, respectively, communication means for communication with the office 21. The scanner for the address is likewise positioned at the start of the secure mail path in the mail center. Of course, a plurality of personal computers $PC_a$, $PC_b$, . . . $PC_n$ through $PC_m$ in the office 21 can communicate with a single postage meter machine when these are successively requested, for example, to search their files stored under time data for a relevant letter recipient address and allocated cost center and/or shipping information. Files having the same recipient address in the address data area are not relevant when these were not stored on the same day. For example, the requested carrier and/or cost center information are then electronically communicated to the postage meter machine via a data line.

Similar to FIG. 2*a*, input and output units 2, 3, 20 through 23 in the block circuit diagram of FIG. 2*b* are connected via the input/output control unit 4 to a processor system that has a postal-oriented security area 50. A permanent memory PSP 11 of the memory means of the postage meter machine contains programs for a communication—via interfaces in the input/output control unit 4—with the scanner 26, the input unit 20 through 23 and—via a data line 24—with at least one personal computer in the office 21. A personal computer (PC) including picture screen and appertaining keyboard can be viewed as being a peripheral input/output means for searching and input of data. Moreover, a connection to an existing computer network can be enabled by a separate device 29. Further peripheral input/output means (not shown in detail) can also be connected to the processor system of the postage meter machine. Accounting information is communicated via the aforementioned data line 24 to the appertaining department in the office 21 either regularly or as a reaction to a message request. Documents about reloadings with credit, fee schedule, image and other data that have ensued are also printed out in a mail-carrier-related format in the mail station with the printhead 1 of the postage meter machine. As needed, a document (receipt) about the accomplished reloading after a reloading has been undertaken can be produced separately for each mail carrier when the postage meter machine is switched to an internal printing mode. A self-adhesive franking tape is then preferably printed. A listing concerning individual financial reloading data within a time span and other register or service data can be printed out as a document by the printhead of the postage meter machine when this is desirable. After an electronic communication, such a document can also be printed in the office 21. As needed, data for a carrier are also produced for whom the postage values of all cost centers serviced by this carrier are compiled. This is meaningful when the departments are fiscally independent units, i.e., when a number of small companies that use an office 21 and the mail station in common but must carry out separate accounting at the carriers.

In a further version for conducting a cost-center-specific accounting in the inventive mail processing system, an automatic entry of the cost center number into the postage meter machine is undertaken as a reaction to an inquiry from a personal computer in the office 21 via the data line 24, and, in conjunction with a specific program stored in the program memory PSP 11, a data communication to the personal computer in the office 21 can be undertaken for listing the cost-center-specific accounting. The cost center printout can then be undertaken by the appertaining department in the office 21 itself with a printer connected to the requesting personal computer. Moreover, the communicated listing can be compared to an internally stored listing in the personal computer of the office 21. If changes are made at the mail station in the setting of the carrier in order, for example, to use beneficial offers or discounts of other carriers, then this can be checked by means of such a comparison.

The arrangement for data entry into a postage meter machine includes input means and output means that are connected to a processor system. The postage meter machine has an input/output control unit 4, a register unit 19 for automatic entry of data and for controlling connected periphery devices, as well as a means 20 for communication via chip card or as well as a modem 23 for communication to a remote data central DC and a communication link 24 to a personal computer (PC) in the office 21. A processor system includes a control unit 6 such as a microprocessor that is programmed with a routine for interpreting the scanned data and that is programmed with a routine in order to find the data of a datafile of the personal computer (PC) in the office 21 from the quantity of interrogated datafiles respectively allocated to a letter contents. As a result, the postage value, the mail carrier number (CIN) and further shipping information as well as the cost center number are automatically entered into the postage meter machine and processed. The control unit 6 is also programmed with a routine for conducting an accounting on the basis of the scanned data.

At least one scanner 26 is connected to the register unit 19. At least one scanner 26.1 is arranged in the mail delivery stream so that different formats are also sensed. For other envelope formats, further scanners for address scanning can be arranged in the transport path of the postage meter machine FM.

Programs corresponding to the postal regulations for the position of the address and of the other information exist in memories of the respective personal computers $PC_a$, $PC_b$ or $PC_c$. A processing means for the scanned information is preferably integrated into the postage meter machine FM in order to determine address data.

The scanners together with a letter sensor 16 are connected to the register unit 19, that intermediately stores data and implements a parallel-to-serial conversion. The register unit 19 is electronically connected via the data line 18 to the input/output control unit 4 of the postage meter machine FM for serial data transmission.

The location of the optical recognition means as the scanner 26 need not necessarily be bound to the postage meter machine FM. For example, an integration of a scanner located in an automatic feeder or in an automatic separator, remote from the postage meter machine FM, is also possible. The latter separates the pieces of mail for automatic feed.

The invention is not limited to this embodiment since, of course, other peripheral input/output means can be connected to a shared, serial interface via the register unit 19 and the data line 18.

It is provided that the scanner 26 (and others, if present) can each contain an electronic circuit for image evaluation. A mark reader means with subsequent image evaluation can be realized as disclosed, for example, in the German Published Application 43 44 471.

It is also possible for the electronic circuit in the scanner to only support an image evaluation which ensues in the postage meter machine FM. Alternatively, a version is also provided wherein the electronic circuit in the scanner only supports (by providing data) an image evaluation which ensues in the postage meter machine. On the basis of the identified addresses, the carrier and/or the cost center is successfully identified in the postage meter machine FM.

As a result, carrier information that is required for a carrier-specific input of logo print data is automatically entered into the postage meter machine FM. The microprocessor of the control unit 6 is programed with a routine stored in a memory area 81 of the clock/date module 8 in order, as needed, to correspondingly load the data of the automatically set, new mail carrier in automatic routines.

Additionally, the microprocessor of the control unit 6 is programmed with a further routine in order, after turn-on, to initialize the postage meter machine in a location-specific manner and, as needed, to load further data into the postage meter machine FM. This may include necessary franking image data prescribed or required by the carrier, analogous to the sovereignty characters of the national, governmental mail carriers, as described in detail in German application 195 49 305.2.

This type of reloading is particularly provided for digital printing processes that allow a program-controlled embedding of variable or semi-variable window pixel field data in constant frame pixel field data. Such a method for controlling the column-by-column printing of a postage stamp character image in a postage meter machine is disclosed, for example, in European Application 578 042.

The arrangement for data entry into a postage meter machine has input and output means that are connected to a processor system. It is provided that the input means, such as the keyboard 2 includes first actuation means in order to set the postage meter machine to a different mail carrier. The input means also has second actuation means for the specific setting of a new mail carrier. The microprocessor of the control unit 6 is programmed with a routine in order to correspondingly load the data of the new mail carrier that has been set in automatic routines 1000 of the communication mode 300 and in order to generate a change in the print format. The generated change data are non-volatilely stored under a number and allocated to the respective mail carrier, or are non-volatilely stored allocated to a carrier identification number (CIN) corresponding to the selected mail carrier.

It is also provided that the communicated sub-image data files, allocated to a carrier identification number (CIN) corresponding to the selected mail carrier, are non-volatilely stored in the postage meter machine FM in order, given selection of a predetermined mail carrier number, or CIN, to generate specific print formats. The communicated sub-image data files, pixel image data files and the modify data generated by automatic or manual input are present stored in non-volatile memory areas of write/read memories 5*a* and/or 5*b*, and/or in a memory area of the clock/date module 8.

Figure 3A:
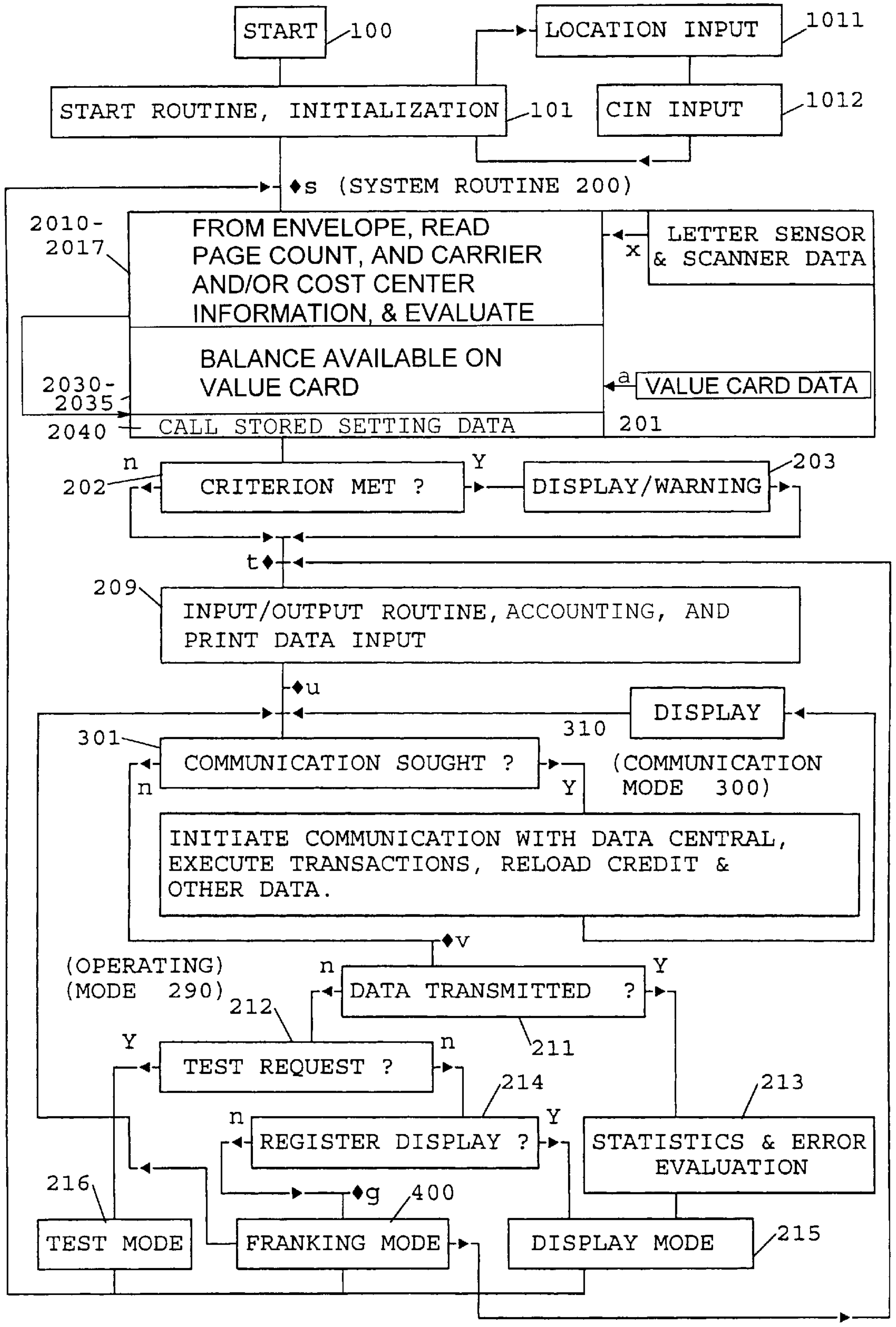
FIG. 3*a* is an overall flowchart of a postage meter machine with integrated postage calculation and with automatic data processing according to the first postage meter machine embodiment.
Figure 3B:
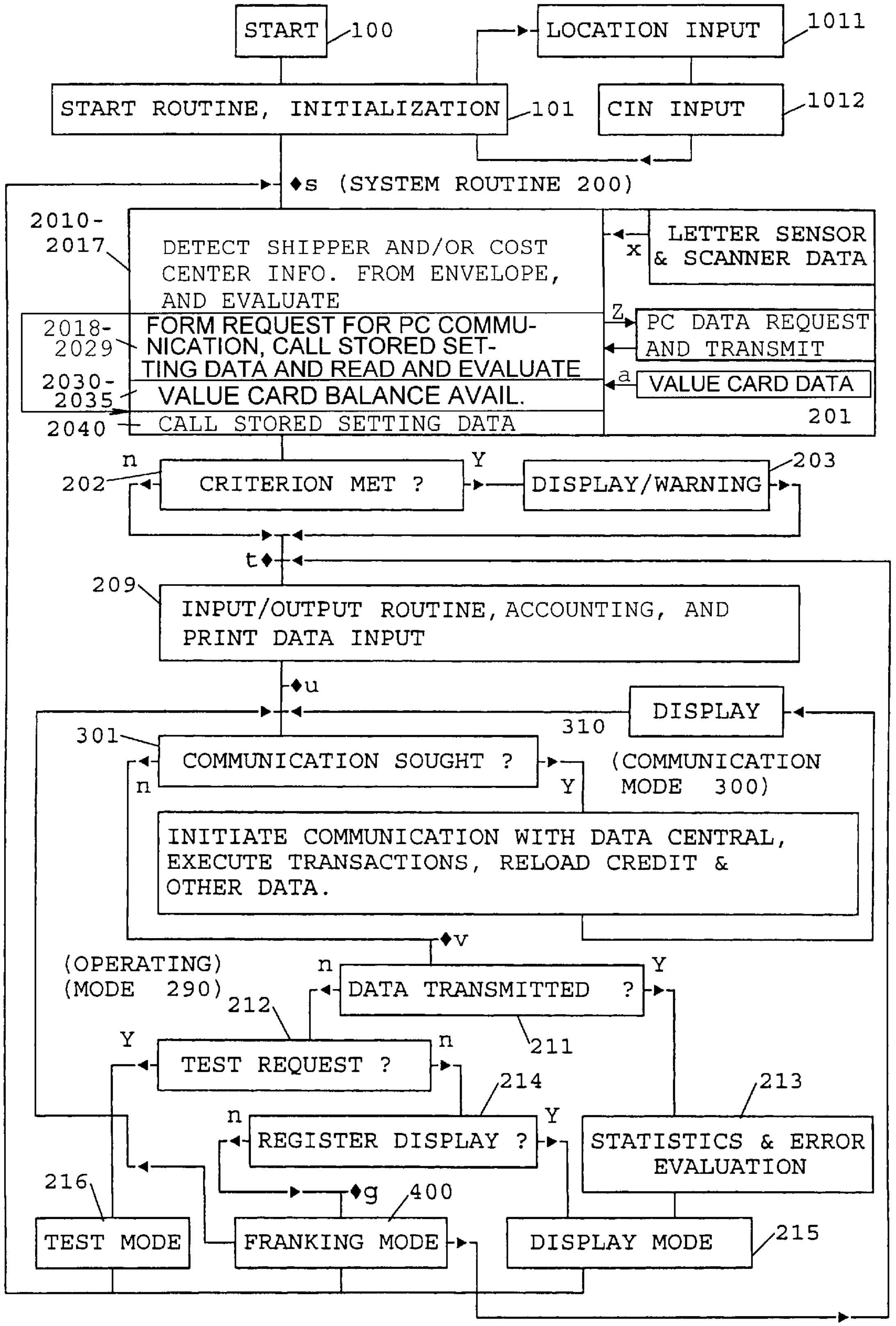
FIG. 3*b* is an overall flowchart of a postage meter machine with integrated postage calculation and with automatic data processing according to the second postage meter machine embodiment

The overall flowchart FIG. 3*b* for the postage meter machine of FIG. 2*a* is shown in FIG. 3*a*. After a start 100, a start and initialization routine 101 is executed which includes a sub-step 1011. After turn-on, a communication requirement is formed in the sub-step 1011 in order to initiate an automatic communication with the data center, for example, via modem 23, and in order to implement a corresponding data transmission wherein the municipality name in the date stamp is modified corresponding to the current location.

The location-specific offering of data ensues optionally or corresponding to the existing postage meter machine type with a card-like transmission means or with corresponding reception means, ensuing from an external memory via a communication network (modem, mobile radiotelephone).

Given a location input with a chip card via a chip card reader/write unit 20, authorization must be obtained in advance. This is in fact more time-consuming but allows a location registration for the respective mail processing system in the data center DC.

In another version, an entry of the location is undertaken, for example, by the keyboard 2 instead of with a remote data transmission or instead of chip card when the postage meter machine is turned on, for example, by a new user after a change in location. After the turn-on, such an input possibility is afforded in sub-step 1011 of step 101 of the initialization, namely by entering the postal zip code into the postage meter machine.

During the initialization routine 101, there is also the possibility in addition to the input of the location to change the previous carrier constellation by definition of a new set of mail carriers, for example with an input of a carrier identification number (CIN) corresponding to the name of the mail carrier in sub-step 1012.

When as a result of user selection or the execution of the cost-beneficial routine described above, one of the carriers has been selected for a letter (piece of mail) from the aforementioned set of mail carriers, only the carrier identification number (CIN) need be automatically communicated to the postage meter machine. The data stored in non-volatile fashion under the carrier identification number (CIN) in step 1012 can then be accessed, including carrier-specific fee schedules, routines for the data for the print image generation and carrier-specific print image generation.

After the initialization routine 101, the program branches to a first step 201 a system routine 200 in order to at least call non-volatilely stored settings for the postage meter machine in sub-step 2040 when no piece of mail is detected in the mail delivery path. Step 209 affords the possibility of modifying the aforementioned setting with a manual input.

A piece of mail possibly supplied in the meantime remains in a waiting period, preferably at the start of the delivery path until all manually required inputs have been actuated in the second step 209. The franking mode 400 is reached after further steps of the overall flowchart have been executed. It is recognized therein that the manual input has been terminated by a comparison of the loop traversals after the last input to a predetermined plurality of loop traversals, or a time duration is compared to a predetermined time duration after the last input. A switch is then first made into the standby mode before returning to the system routine 200 at s.

In the first and second embodiments, data scanned by the scanner 26 positioned in the mail delivery path to the postage meter machine FM can be entered into the postage meter machine during the activated operating or standby condition of the postage meter machine when a first postal matter sensor 16 has detected a piece of mail that is being transported to the printhead 1. A first flag is thereby set. If a second letter sensor (not shown) is used as well, a second flag is also set when the postal matter sensor 16 is actuated. When, however, only the second postal matter sensor by itself is actuated, or is actuated before the postal matter sensor 16, this can be determined in an interrogation step 211 which then in turn leads to a branch into the error interpretation mode 213. When, for example, the postage meter machine is in the standby condition and only the second postal matter sensor is activated, this does not lead to a franking however, an internal cost center printout or a printing of service data or of an advertising slogan can still be undertaken.

The interfaces in the input/output control unit 4 are selected in order to recognize the connected peripheral means and in order to switch the postage meter machine as warranted into a required, pre-programmed operating mode that enables the collaboration and communication with the aforementioned peripheral means. For example, a detection of the scanned data can trigger a conveying of the piece of mail in the direction of the printhead 1. The interface to the scanner 26 is selected in order to detect at least one cost center and/or carrier identifier in sub-steps 2010 through 2017 (explained in connection with FIG. 6*a*) in order to read valid data into the memory areas of the non-volatile memory of the postage meter machine provided for that purpose, so that a manipulation-proof, automatic setting can be achieved, which is also preserved in case of an outage of the operating voltage. In sub-steps 2030 through 2035 (also shown in FIG. 6*a*), the interface to the write/read unit 20 may then be selected, whereby a mode switching ensues if such a write/read unit 20 is connected for monetary value input. The postage meter machine FM is then in a slave condition in order to receive data from the peripheral means, i.e. the scanner 26 and the write/read unit 20. The new setting for the automatically entered monetary value is likewise non-volatilely stored, with the old setting data being overwritten.

In at least one following step 202, an interrogation is carried out to determine whether the scanned data yield meaningful information to determine at least one limit value is exceeded, i.e., whether a criterion was met that leads to a warning in a following step, for example a display that warns the user or displays an error. After a number of interrogations in further steps 202, 209, 301, 211, 212 and 214 have been executed in the program, the postage fee determined for a letter (piece of mail), according to the setting, is accounted for or debited in the franking mode 400. Print data for printing are now offered from the pixel memory 7*c* in the RAM 7.

Moreover, an automatic print data generation with protected data also already ensues in the initialization routine 101 for preparing for a printout, as disclosed in greater detail in co-pending U.S. application 08/525,923 ("Method For Improving The Security Of Postage Meter Machines," Windel et al filed Sep. 8, 1995 and assigned to the present application). Further security criteria can be interrogated at least in step 202 and can be displayed in the step 203 or can be edited for signaling. Even when no further inputs are undertaken, a stamp imprint can be generated and printed from the stored data protected against manipulation. The following, inventive, second step 209 is directed to a specific input and display routine. In the aforementioned step 209, the previously non-volatilely stored data can be overwritten or modified with the input means of the postage meter machine or other inputs can be manually actuated and displayed. A print data input is also provided for corresponding sub-images (window pixel data). The transport of the postal matter in the direction of the printhead 1 may then be interrupted so that the input can be completed. When, however, no manual intervention ensues, the mail processing and franking is executed fully automatically.

After the second step 209, the point u, i.e., the beginning of a communication mode 300, is reached and an interrogation is made in a third step 301 to determine whether a transaction request is present. This is the case when request data were formed or when an input was undertaken for the purpose of reloading credit. When this is not the case, the communication mode 300 is exited and point v, i.e., the actual operating mode 290 of the postage meter machine, is reached. When relevant data were communicated in the communication mode, then a branch is made to the step 213 for data interpretation. A statistics and error evaluation is implemented in step 213 in order to acquire further current data that, after branching to the system routine 200, can likewise be called in the sub-step 2040 of the first step 201. Or, when the non-communication of data was found in at least step 211 following the communication mode in the third step 300, a branch is made to the next interrogation in step 212. A check is made in step 212 to determine whether corresponding inputs had been actuated in order to proceed into the test mode 216 given a test request, otherwise to proceed into a display mode 215 when a check 214 of the register status is intended. When this is not the case, the point g, i.e., the franking mode 400, is automatically reached. In the franking mode 400, a number of security interrogations are provided and the cost center-related accounting only ensues shortly before the beginning of the printout of the franking format, with memory address data being employed that were already previously formed after their entry on the basis of a change in the cost center number. A higher security against manipulation is achieved with the aforementioned sequence of interrogations. With the program routine of the postage meter machine, the branch is then made from the franking mode 400 to point u when a number S of credit items has been used. A communication with the data central DC is automatically undertaken in order to be able to continue to frank. A branch is repeatedly made to point t from the franking mode 400 in order, in the second step 209, to enable a data input with the postage meter machine keyboard 2. In the first and second embodiments, such manual inputs ensue when a signal for a print output request was not yet generated, this being derived from a corresponding postal matter sensor signal. When, however, postal matter was recognized and the print output request was generated after a predetermined time delay, a cost-center-dependent accounting and a franking of a piece of mail are implemented by program and a branch is then made back to point s.

The overall flowchart for the postage meter machine of a system according to the second embodiment employs a start and initialization routine identical to that already described, including sub-step 1011 for updating the location information and the sub-step 1012 for updating the carrier constellation. The stored carrier constellations can be matched with one another via the data line 24 to the personal computers.

After the postage meter machine FM is turned on, a communication request is formed in the aforementioned sub-steps in order to initiate an automatic communication with the data center dc, for example via modem 23, and in order to implement a corresponding data transmission for the updating the database as needed.

After the initialization routine, a branch is made to step 201 in order to at least call (retrieve) non-volatilely stored settings (default settings) for the postage meter machine in sub-step 2040 when no piece of mail is detected in the mail delivery path. One of the aforementioned settings again relates to the average page weight. A piece of mail, if potentially supplied in the meantime, remains in a waiting position, preferably at the start of the delivery path, until all manually required inputs have been actuated in the step 209. After the last input, a switch is first made into the stand-by mode before a return is made to the system routine 200.

The interfaces in the input/output control unit 4 are selected in order to recognize the connected peripheral means and in order to switch the postage meter machine FM as warranted into a required, pre-programmed operating mode that enables collaboration and communication with the aforementioned peripheral means. For example, a detection of the scanned data can trigger conveying the piece of mail in the direction of the printhead 1. The interface to the scanner 26 is selected in order to detect cost center and/or carrier information for at least one cost center and/or carrier in steps 2010 through 2016 in order to read valid data into the memory areas of the non-volatile memory of the postage meter machine FM provided for that purpose, so that a manipulation-proof, automatic setting thus achieved is also preserved in case of an outage of the operating voltage. In the following sub-steps 2018 through 2029, a communication with one of the remote personal computers is implemented, this already having been explained in conjunction with the data line 24 in FIGS. 1*b* and 2*b*. This communication includes at least the transmission of request data to the personal computer in the office 21 and the calling of cost center and carrier data stored in the personal computer in the office 21.

In steps 2030 through 2035, an interface to the value card write/read unit 20 also may be selected. The new setting for the automatically entered, available monetary value is again non-volatilely stored, with the old setting data being overwritten. The further interrogations again ensue in the manner already described for FIG. 3*a*.

In the step 201, the overall flowchart shown in FIG. 3*b* for a postage meter machine with integrated postage calculation thus includes a number of sub-steps for an automatic data entry according to the second embodiment of the mail-processing system. The step 201 includes the sub-steps 2010 through 2017 for a scanner communication mode, as described in FIG. 6*a* in greater detail, sub-steps 2018 through 2029 for an office computer communication mode, as described in greater detail in FIG. 6*b*, and, optionally, sub-steps 2030 through 2035 for a value card communication mode, as described in greater detail in FIG. 6*a*, as well as the sub-step 2040 for an automatic data entry.

Figure 4:
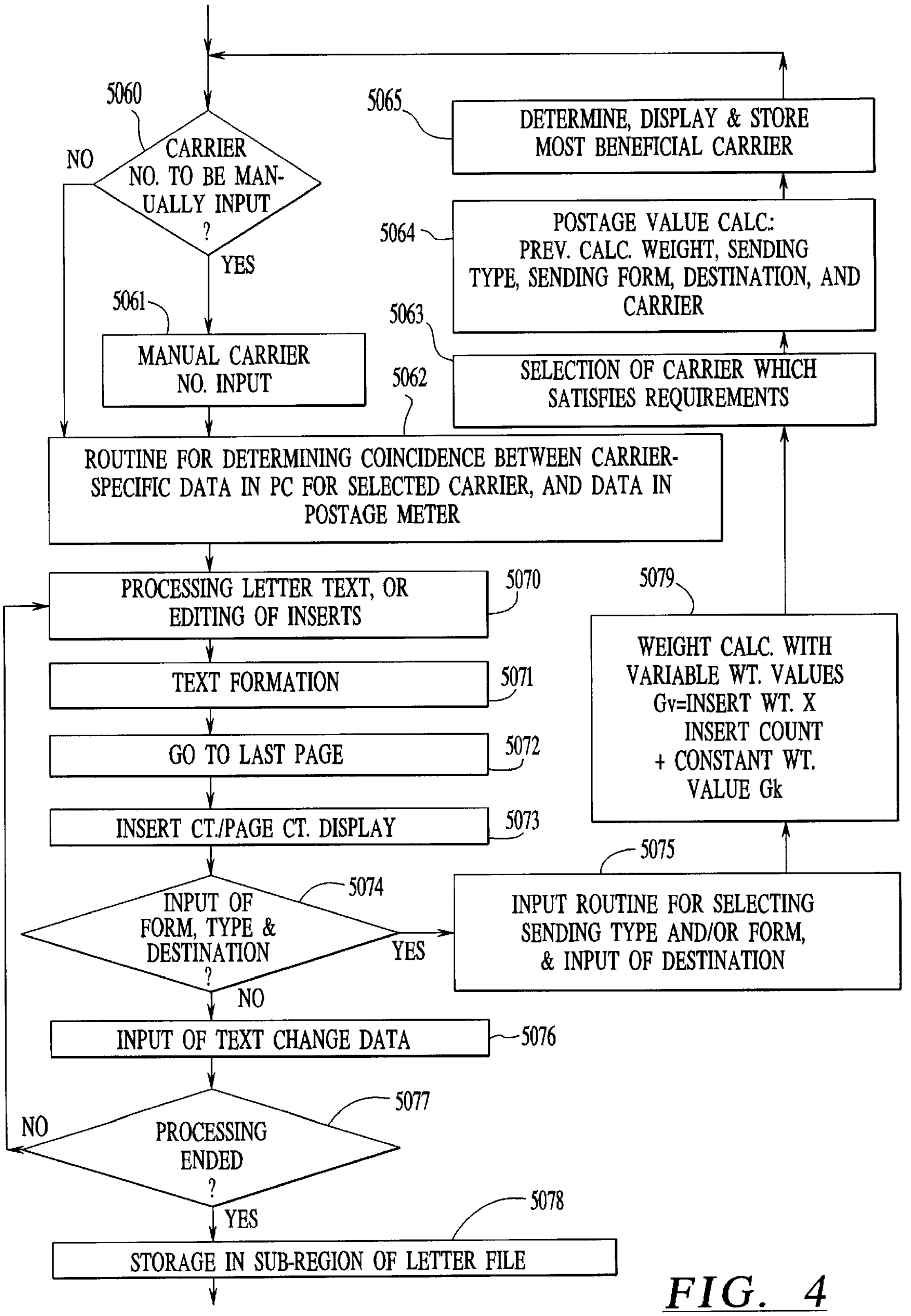
FIG. 4 is a computer routine for determining the most beneficial carrier in the inventive method and postage meter machine.

A personal computer communicates the postage value that was calculated in the personal computer for the most beneficial or selected mail carrier, as presented in greater detail in conjunction with FIG. 4.

The computer routine shown in FIG. 4 includes a step 506 for storing the carrier selection and a step 507 for entering and storing the letter content and the shipping data (shipping information). The step 506 includes an interrogation step 5060 for inquiring whether a carrier number is to be manually entered and includes a first sub-step 5061 for the manual entry of a carrier number.

A step 507 includes sub-steps 5070 through 5073 for determining the insert count or page count as the result of producing a letter, which precedes and input of shipping type, class and destination in the sub-step 5075 and a calculation of the weight of the letter or the mailing in the sub-step 5079. The number of inserts or the page count multiplied by the average insert weight or page weight forms a first variable weight part Gv1. Other insert counts or page counts for other types of inserts or pages form a second variable weight part Gv2. The weight calculation is based on the variable weight parts Gv and on a constant weight part Gk. The is the weight of the packaging or of the envelope. After the weight calculation, a sub-step 5063 of the step 506 is reached for the automatic selection of the mail carrier that meets the shipping demands. After the calculation of the postage value in the sub-step 5064 and the determination, display and storage of the most beneficial mail carrier in the sub-step 5065, finally, the interrogation step 5060 is again reached for inquiring whether a carrier number is to be manually entered. If the answer to this inquiry is no, the sub-step 5061 for manual entry of a carrier number is not executed; rather, the automatically identified carrier number for the most beneficial mail carrier is automatically entered.

The data such as format, number of pages and, possibly, shipping type, that define the postage were already determined in the production of the letter. To that end, the text processing program with which the letter is produced in a standard way on a personal computer in a step 507, for example WORD with WINDOWS, is supplemented by a special page counting program as component of step 507, that calculates the page count as letter-specific data.

In the inventively modified text processing program, a number of further sub-steps for preparation and determination of the page count are added in a sub-step 5070 of the aforementioned step 507 after the production of the letter text or editing of the mail inserts and before the printing in step 508. A first sub-step 5071 is implemented for formatting the text; the last page or last edited insert is then selected in the sub-step 5072; and the number of pages or inserts is displayed in a sub-step 5073. In a sub-step 5074, an inquiry possibility is made as to whether a manual input is to be made in order to undertake modifications with respect to shipping type, class and destination. If so, a branch is then made to a corresponding input routine in the fifth sub-step 5075. Otherwise, a branch is made to a sixth sub-step 5076. Sub-step 5076 affords the possibility of a manual input in order to undertake modifications of the content of the mailing and in order to continue the text editing or insert processing. A check is made in a sub-step 5077 to determine whether the processing has ended in order to branch to a sub-step 5078. Otherwise, a branch is made back to the start of the routine for producing the letter text or for processing the mail inserts in the sub-step 5070. In a sub-step 5079 following the sub-step 5075, the number of pages on the basis of the displayable page number of the last page, or the number of inserts, is utilized for calculating weight. The appertaining postage value for a number of carriers can thus be determined in the sub-steps 5064, of the step 506. In another version of the embodiment (not shown in FIG. 4), the weight calculation is additionally undertaken in the sub-step 5064 and the sub-step 5079 in the step 507 can be eliminated.

In the sub-step 5078, the identified shipping information, including the carrier number, and the calculated postage value are stored in a specific sub-area of the letter file that is not to be printed out with the letter content.

When printing in step 508, the page count or insert count is then automatically inserted into the printed format of the letter such that it is visible in the clear window of the envelope after envelope stuffing has been carried out. The number of pages or inserts displayed in the third sub-step 5073 can be additionally supplemented by displaying the type of insert. The additional shipping information relating to the insert type is stored, allocated to the number of inserts, in order to fetch (retrieve) this information.

A simplified embodiment (not shown in FIG. 4) executes without a counting program for the page count. To that end, the particulars that determine the postage must be manually entered. The page count is visible after the formatting in the text and the author of the letter can manually enter this into the address field that should appear under the clear window. As an alternative, a further input mask can be automatically called in order to support the manual entry. The program triggers the print instruction only after this entry.

The printing of the aforementioned page count information in the address field of the letter can ensue either in clear text or in the form of a one-dimensional or two-dimensional code. The latter have the advantage of better machine readability. After the manual or automatic input of the page count, conversion into, preferably, a bar code ensues with a special sub-program 5081 of the personal computer in step 508 for printing out the letter.

In the first and second embodiments, the postage meter machine is equipped with an optical recognition means, or is connected to such a means, that acquires the page count information printed in the address field. The content is identified with an OCR method. In the case of bar codes, standard software with recognition rates of nearly 100% can be utilized. The recognized postage information are forwarded to the calculating unit of the postage meter machine FM. This inventively implements the weight determination without scale and, subsequently, the postage calculation in a known way, and undertakes a corresponding franking imprint at the upper right corner of the envelope.

The weight of, for example, a letter is calculated by the postage meter machine on the basis of the standard (average) weight of a letter page that is stored in the postage meter machine. The letter weight is determined from the weight of a page and from the number of pages. Even though letter and a page weight or a page count are specifically discussed herein, the inventive concept can clearly apply as well to packages and standard (average) package insert weights and package insert counts. Mailings may also have CD-ROM or chip card inserts. Such inserts likewise have a typical insert weight. When shipping a number of such inserts, their number is required for determining the insert weight. Given mixed inserts such as paper and plastic, the type of insert and the number thereof must be unambiguously definable.

Given correspondingly connected auxiliary units, processing of chip cards, CD-ROMs and other card-shaped or disk-shaped information carriers for shipping thereof is also possible with a personal computer. Such information carriers of plastic and/or information carriers made of paper as well as package inserts generically constitute inserts whose number is automatically determined and communicated to the postage meter machine according to the two embodiments of the invention. In a version of each embodiment, the type of insert is automatically identified in addition to the number thereof and type information also is communicated to the postage meter machine. As an advantage compared to European Patent 498 955, the embodiment of the invention afford the possibility of supplying the mailings with a number of different inserts to the postage meter machine in unordered fashion, without again having to utilize a scale for identifying the weight.

Under normal conditions, the same paper grade is consistently employed by a given department (cost center) for printing the letter, so that the page weight only has to be identified and emitted once. The page weight can be easily identified by dividing the overall weight of a complete paper stack by the number of sheets. Both particulars can generally be taken from the packaging for the paper sheets. Otherwise, the page weight can also be learned by asking the paper manufacturer. A new entry of the page weight into the postage meter machine is possibly required only in those instances in which the paper grade is changed. The weight of a window envelope is likewise taken into consideration like an insert weight. The weight of a window envelope is practically independent of type and need only be entered once into the postage meter machine. Type and unit statistical scatters can be left out of consideration. The stored data for the fee calculation include the page count (or number and type of inserts), the average page weight (or insert weight) and further shipping information such as shipping class (letter, package, printed matter, etc.), shipping type (registered, express mail, air mail, etc.) and shipping destination (domestic, Europe, foreign).

The steps explained above in connection with FIG. 4 are also executed in the same way in the second embodiment of the invention. The second embodiment of the invention differs from the first embodiment in that the additional shipping information is no longer printed in the address field of the letter. This information is stored in the personal computer allocated to the letter file or the address thereof, supplemented according to time of production (or time of storage) data. After printing at the office 21, the address field of the letter is scanned in a station of the mail station in step 201 of the overall program for the postage meter machine. The address is identified as clear text or as code. The address identified in this way is transmitted from the postage meter machine to the personal computer currently connected thereto. The personal computer program identifies the stored, postage-relevant information under the indicated address and transmits this information to the postage meter machine. On the basis of the transmitted information, the postage meter machine undertakes an accounting and then a franking of the letter (piece of mail).

Figure 5A:
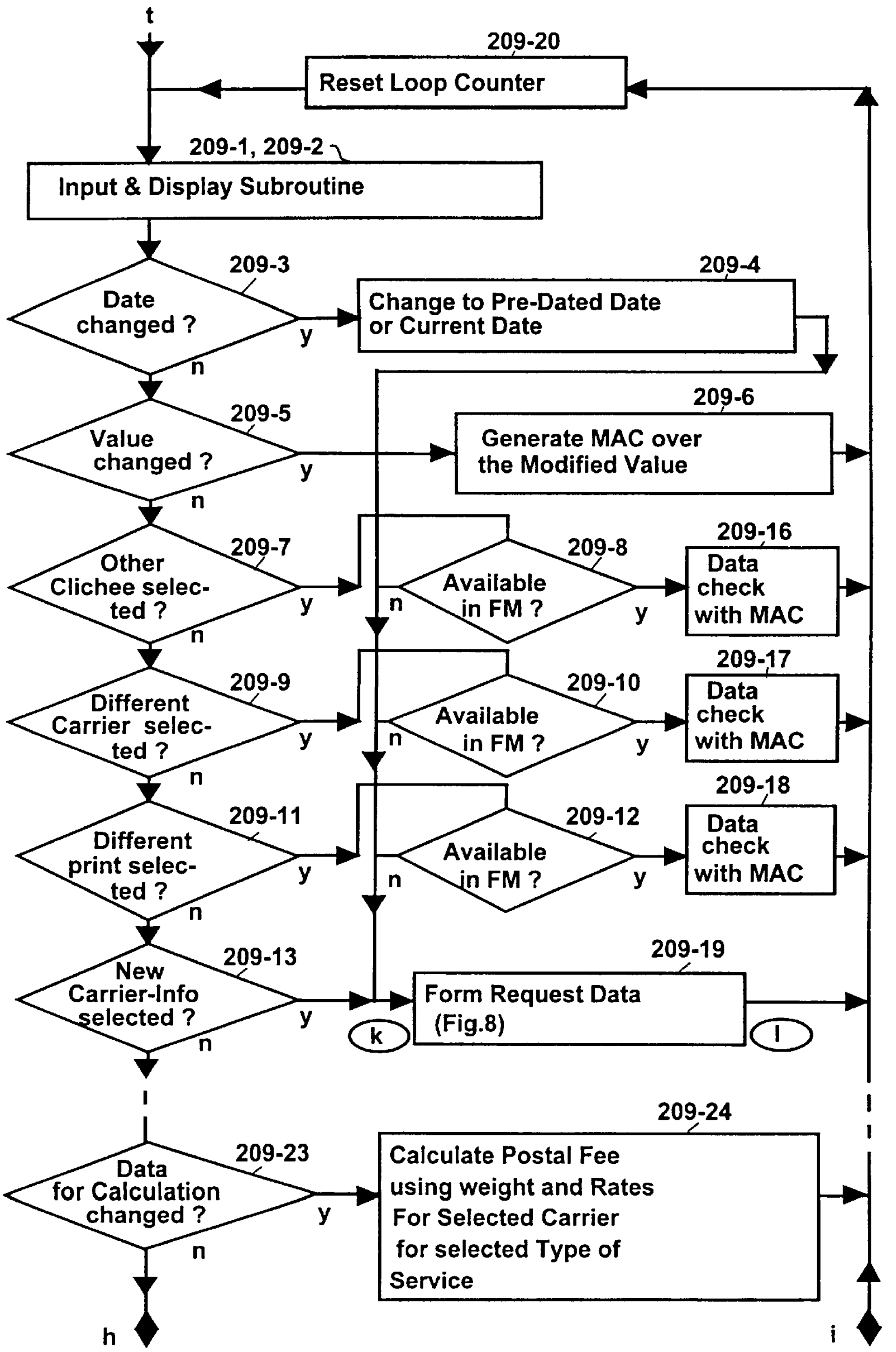
FIGS. 5*a*–5*c* together for a flowchart of evaluation of a data entry for the postage meter machine constructed and operating in accordance with the principles of the present invention in the framework of an input/display routine according to the first embodiment.

In FIG. 5*a*, an interrogation is made in sub-step 209-9 as to whether a carrier change has occurred, after a scanning of the piece of mail has ensued in the input routine (step 201 in FIGS. 3*a* and 3*b*). The carrier type is then communicated from the office 21 as a result of a request from the postage meter machine (also in the step 201 in FIG. 3*b*). Thus, modified information for accounting purposes is automatically entered into the postage meter machine.

A corresponding automatic input in the first step 201 (FIGS. 3*a* and 3*b*) or manual input in the sub-step 209-1 being assumed, a branch is made to sub-step 209-10 when the sub-step for checking for carrier input (209-9) is reached in order to check the availability of the data in the postage meter machine. The absence of a concordance with respect to the data sets stored in the personal computers $PC_a$, $PC_b$, . . . $PC_m$ in the office 21 relative to the individual carriers can be determined with this check in sub-step 200-10. The data of the missing carrier or of a new carrier, can be stored in the postage meter machine after they are communicated.

Correspondingly, a branch is made from the sub-step 209-7 for checking for slogan input, or from the sub-step 209-11 for checking for selected imprint input respectively to sub-step 209-8 or sub-step 209-10 for checking the availability of the data in the postage meter machine. Within the framework of an automatic entry in the first step 201 (FIGS. 3*a*, 3*b*) of a cost center number, an advertising slogan allocated to the cost center can likewise be automatically selected. It is still possible to modify the selected imprint when change data are transmitted to the postage meter machine via the data line 24, for example, according to the second embodiment disclosed herein.

Given available data, a branch is made from the sub-steps 209-8, 209-10 and 209-12 for slogan, carrier or selected imprint input checking respectively to the allocated security checking steps 209-16, 209-17, 209-18, whereby an automatic print data input is undertaken given validity. A data check on the basis of an encoded check sum (MAC) prevents a manipulation with fraudulent intent, as was disclosed in detail in German application Ser. No. 195 34 530.4, corresponding to co-pending U.S. application Ser. No. 08/525, 923, filed Sep. 8, 1995, entitled "Method for Improving the Security of Postage Meter Machines."

If, however, the necessary data are not available in the postage meter machine, a branch is made at a point k to the nineteenth sub-step 209-19 in order to form request data. If actuation means for a new input of a carrier were actuated during the input routine (sub-step 209-1), this is identified in an interrogation step (sub-step 209-13) and a branch is likewise made to point k of the sub-step 209-19 in order to form the request data. The aforementioned sub-step 209-19 shall be explained in greater detail below in conjunction with FIG. 8.

A number of interrogation steps that are not shown can lie between the interrogation step 209-13 and a point h in order to further interpret inputs such as, for example, those relating to service performances, shipping types, shipping forms or mail classes. The postage value modified on the basis of the postage calculation is again determined in the sub-step 209-5 and a branch is then made to the sub-step 209-6 for the purpose of generating an encoded check sum (MAC) over the modified postage value. This postage value secured in this way is now storable manipulation-proof together with the MAC and can be employed for accounting within the framework of the franking mode 400 that sequences chronologically later (FIG. 7*b*).

User-specific or department-specific accounting requires cost center information in order to properly assign these accounting data. The cost center information scanned from the piece of mail or communicated from the personal computer in the aforementioned way can be utilized for a cost-center-dependent, automatic allocation of the accounting data, as well as for a cost-center-dependent, automatic setting of an advertising slogan in the franking format, shown in FIG. 5*b*. The user-relevant settings of the cost center and the advertising slogan via the keyboard 2 of the postage meter machine that are otherwise respectively required are thus advantageously eliminated. A prerequisite for this is the capability for non-volatile storage of a number of advertising slogans in the postage meter machine. A fixed number of advertising slogans, for example, can have been already non-volatilely stored by the factory of the manufacturer in an internal user memory 10 (EEPROM). This is a non-volatile memory for storing a number of advertising slogans, with each advertising slogan being respectively allocated to a cost center of the department. Alternatively, a number of advertising slogans can be subsequently loaded. The value card (chip card) write/read unit 20 enables a more frequent slogan change, by card, for a number of inputs. A further possibility is, for example, a password-protected function for deleting predecessor data for parts of the print format, or the allocation thereof to the cost center. The postage meter machine is therefore equipped with a corresponding program as well as with input and display means. A corresponding executive sequence for loading data or for updating is stored in further circuit or an area in the program memory 11 and in the non-volatile memory areas of the clock/date module 8 and/or in the memories 5*a* and 5*b* in order to load successor data into these memory areas previously occupied by deleted predecessor data, as well as in order to redefine their allocation to the cost center, as shall be described in greater detail below in conjunction with FIG. 5*b*.

Figure 5B:
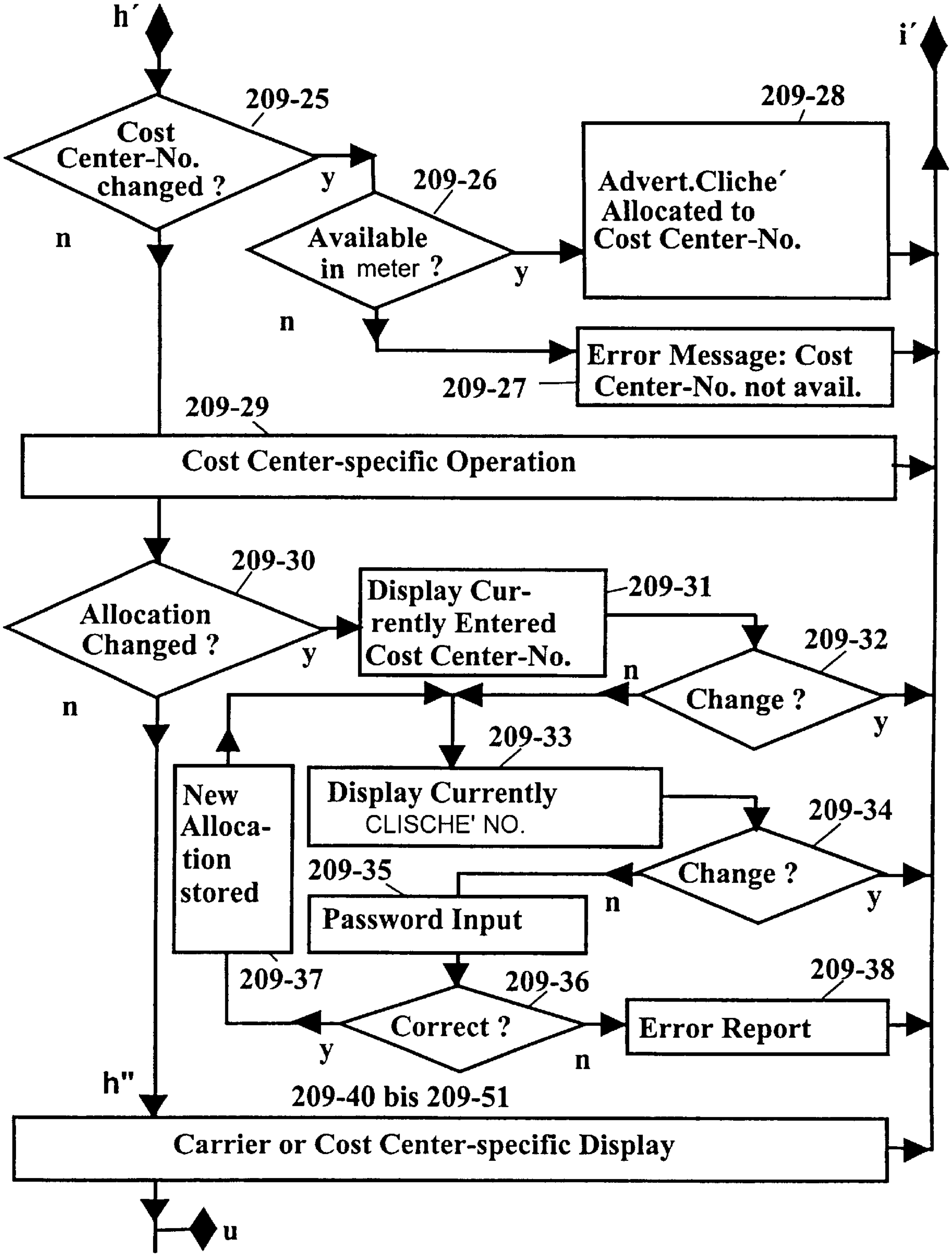

In FIG. 5*b*, an interrogation criterion about a change of cost center number is inventively satisfied in the sub-step 209-25 when a corresponding scanning of the mail within the framework of the input routine has ensued in order to directly enter cost center information (step 201 in FIG. 3*a*), or to indirectly enter cost center information via a PC, for calculating purposes automatically into the postage meter machine. As a result of the interrogation in the sub-step 209-25, a sub-step 209-26 is reached when the cost center was modified. The availability of the cost center number is checked here. It is possible that a cost center number was deleted. Then a corresponding error message ensues in a sub-step 209-27 and a branch is subsequently made back via the sub-step 209-20 to the point t. Otherwise, a branch is made from the 26th sub-step 209-26 to a sub-step 209-28 when the availability of the cost center number is established. An advertising slogan allocated to the cost center number is automatically set in the sub-step 209-28. Cost-center-specific operation 209-29 then is conducted. An interrogation about a requested change of the allocation between cliche' and cost center number ensues in a sub-step 209-30. If such a change has occurred, a branch is made to a sub-step 209-31 for displaying the currently input cost center number and, after the confirmation thereof, a branch is made to an interrogation step 209-32. If no confirmation previously ensued, then a branch is automatically made back via the sub-step 209-20 to the point t after a time lapse. There is then the possibility in the sub-step 209-7 of selecting a different imprint with the input of an imprint number before the aforementioned interrogation steps are run again up to the interrogation in the sub-step 209-30. Given confirmation with, for example, a specific acknowledgment key of the cost center number, a branch is made from the interrogation step 209-32 to the sub-step 209-33. The previously allocated cliche' number is displayed in the sub-step 209-33, which identifies the semi-variable window data for an advertising slogan to be embedded into carrier-dependent frame data. After confirmation, a sub-step 209-35 is reached if, in an interrogation step 209-34, it was not found that a change was not acknowledged, this in turn then again automatically leading to the branch back to the point t via the sub-step 209-20 after a time lapse. This makes it possible to again select another imprint in the sub-step 209-7 (FIG. 5*a*). After executing the sub-steps 209-8 and 209-16, 209-20 209-1 through 209-23 that leads to the point h or h' in FIG. 5*b*, and after the sub-step 209-25 with the interrogation criterion about a change in cost center number—which of course, is not met—the sub-step 209-30 is again reached for asking about a desired change of the allocation between imprint and cost center number. After executing the sub-steps 209-31, 209-32, 209-33 and 209-34, a sub-step 209-35 comprising a password input routine is reached when the imprint setting in the 33rd sub-step 209-33 was confirmed after the display of the imprint number.

If an incorrect password was entered in the aforementioned sub-step 209-35, this is determined in the interrogation step 209-36 and, after an error message, a branch is made back to the point t in an interrogation step 209-38. If, however, it is found in the interrogation step 209-36 that the password input was correct, then a sub-step 209-37 is reached in order to then store the new allocation and to then branch to the imprint number display in the sub-step 209-33 or to the imprint number display in a separate sub-step (not shown) in order to then branch back via the sub-step 209-20 for resetting the loop counter to the point t. The new allocation to the cost center number has thus been entered into the postage meter machine and now continues to be available.

A number of other interrogation steps that must be executed before the point u is reached are arranged between the interrogation sub-steps 209-25 and 209-30 shown in FIG. 5*b*; for reasons of space, however, these have been shown as only sub-step 209-29 in FIG. 5*b*. A program and memory regions for executing cost center-related operations is provided in an area of the special cost center memory 9. Thus, in addition to a basic cost center with the number zero allocated to the respective carrier, additional cost centers can also be setup or deleted under numbers other than zero. Values and piece numbers of individual cost centers other than that with the number zero can be edited or deleted without the security against manipulation being thereby affected. The carrier-related basic cost center with the number zero contains a sum of values of cost centers.

Figure 5C:
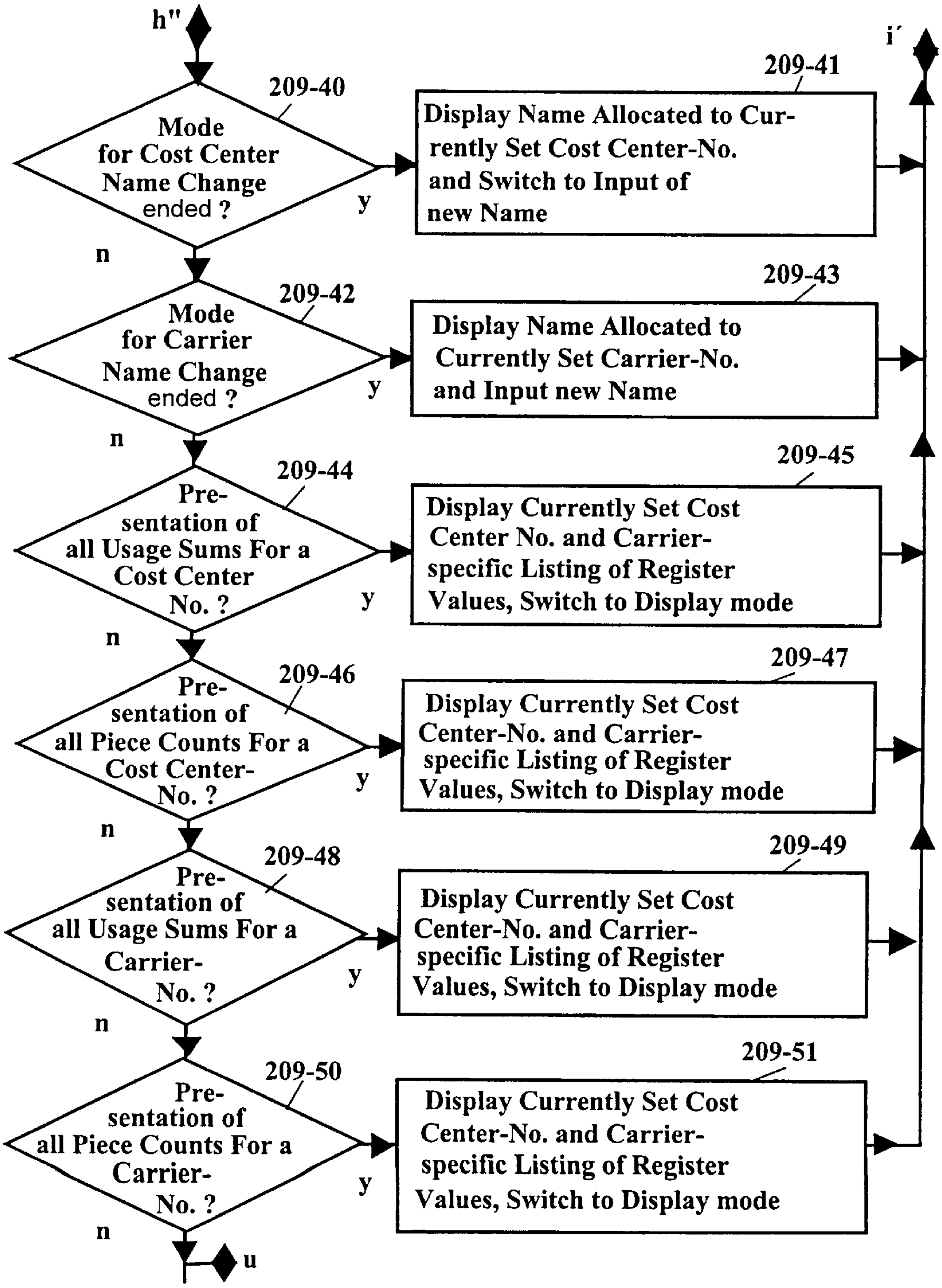

A number of further interrogation steps that must be executed but that were shown as sub-steps 209-40 through 209-51 in FIG. 5*c* for space reasons is arranged between the point h" of the interrogation step 209-30 shown in FIG. 5*b* and point u.

For simpler input, an allocation of numbers to the names of cost centers, or carriers ensues, as shown in FIG. 7*c*. Inventively, the name of the cost center which is standard among the departments of the office 21 can be modified if this should become necessary. When a corresponding input ensues, then this is recognized in the interrogation sub-step 209-40 and, after display of the allocated, currently set number, a switch is made to the input routine of the new name (sub-step 209-41). The carrier names which are standard among the carriers can also be modified if this should become necessary. When a corresponding input ensues, then this is recognized in the interrogation step 209-42 and, after display of the allocated, currently set number, a switch is made to the input routine of the new name (sub-step 209-43). The advantage is particularly useful given a large number of cost center names and/or carrier names.

Inputs in conjunction with operations related to cost centers can be interrogated in the aforementioned sub-step 209-29 in a way that is not shown in FIG. 5*b*. When a selective entry of cost center-related shipping information, including the average insert weights, ensues in the sub-step 209-1, a routine for interrogating and storing the change of the average insert weights according to the selective entry which has been undertaken is provided in sub-step 209-29.

An entry with respect to the cost center-related register operations can also be interrogated. After a register selection, a display of the stored values, or piece counts, ensues in the display mode 215 (FIGS. 3*a* and 3*b*).

Further, the display of all used sums for an individual cost center can be useful in order to allow an overview given a plurality of private carriers. A production of the listing ensues for preparation of the display in the display mode 215. The listing ensues on the basis of a corresponding input. The storage thereof in the pixel memory 7*c* ensues for an internal printout of the postage meter machine. The printout likewise ensues on the basis of a corresponding, other input that, however, need not be explained in detail here.

A presentation or display of all carrier-related used sums for the cost center number that has been set is preceded by a corresponding input. When a corresponding input ensues, then this is recognized in the interrogation sub-step 209-44, and, after display of the allocated, currently set cost center number, a switch is then made to the listing routine for the selected register (sub-step 209-45).

A presentation or display of all carrier-related piece numbers for the cost center number that has been set is again preceded by a different, corresponding input. When a corresponding input ensues, then this is recognized in the interrogation sub-step 209-46, and after display of the allocated, currently set cost center number, a switch is then made to the listing routine for the selected register (sub-step 209-47).

A presentation or display of all carrier-related used sums is likewise enabled for all available cost center numbers when an interrogation sub-step 209-48 and a sub-step 209-49 are executed or, a presentation or display of all carrier-related piece numbers is enabled when an interrogation step 209-50 and a sub-step 209-51 are executed.

When an interrogation criterion is satisfied, a branch is made back via the aforementioned sub-step 209-20 to the point t at the input of the second step 209. In the sub-step 209-2, a display with an input possibility in the first sub-step 209-1 subsequently ensues, whereby a user specific input set can be advantageously utilized in order to enable a number of different inputs. A suitable user specific input set is disclosed in the aforementioned European application 94 120 314.3.

Figure 6A:
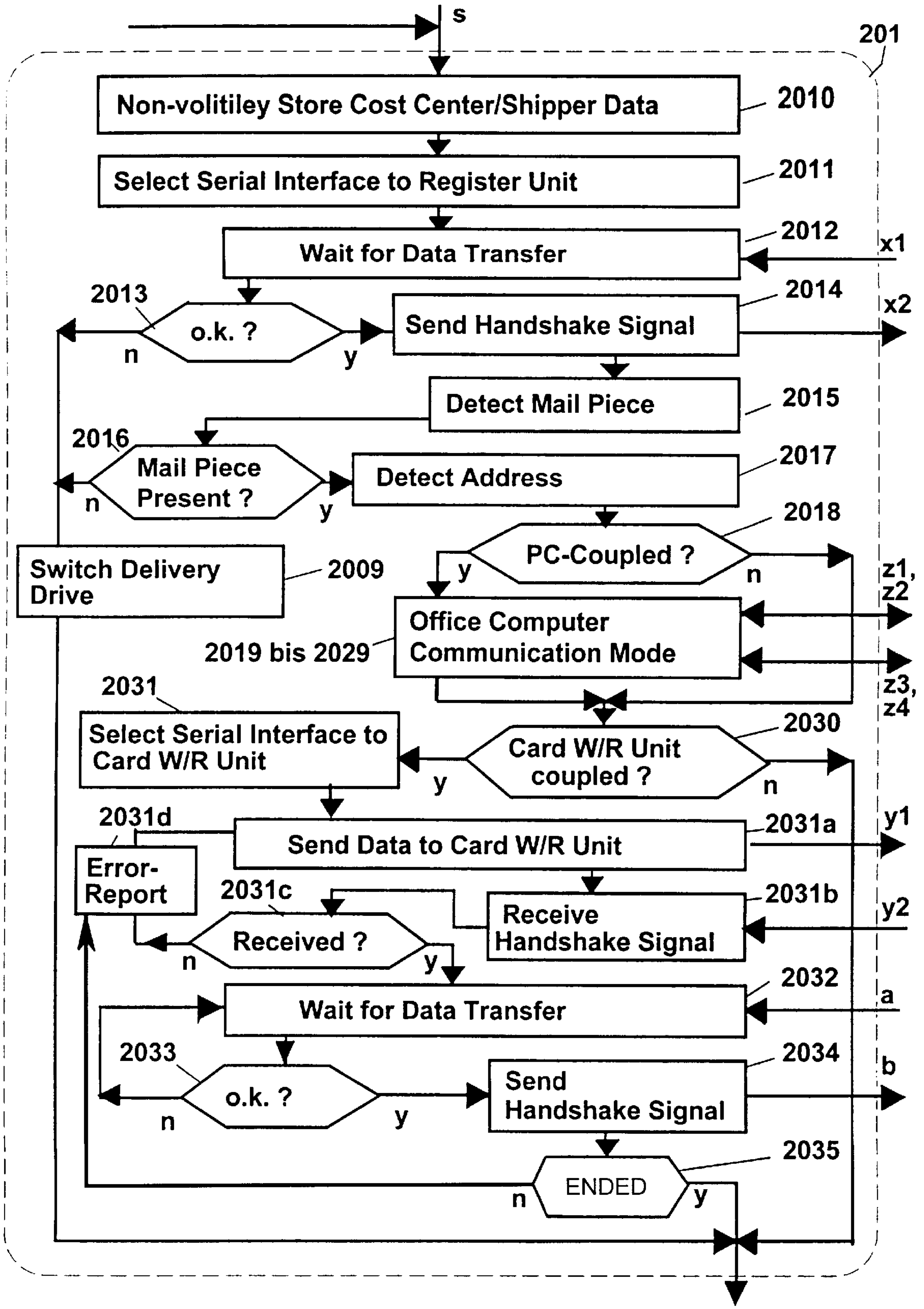
FIGS. 6*a* and 6*b* together from a flowchart for an automatic data entry in accordance with the invention on the basis of the scanned letter recipient address.
Figure 6B:
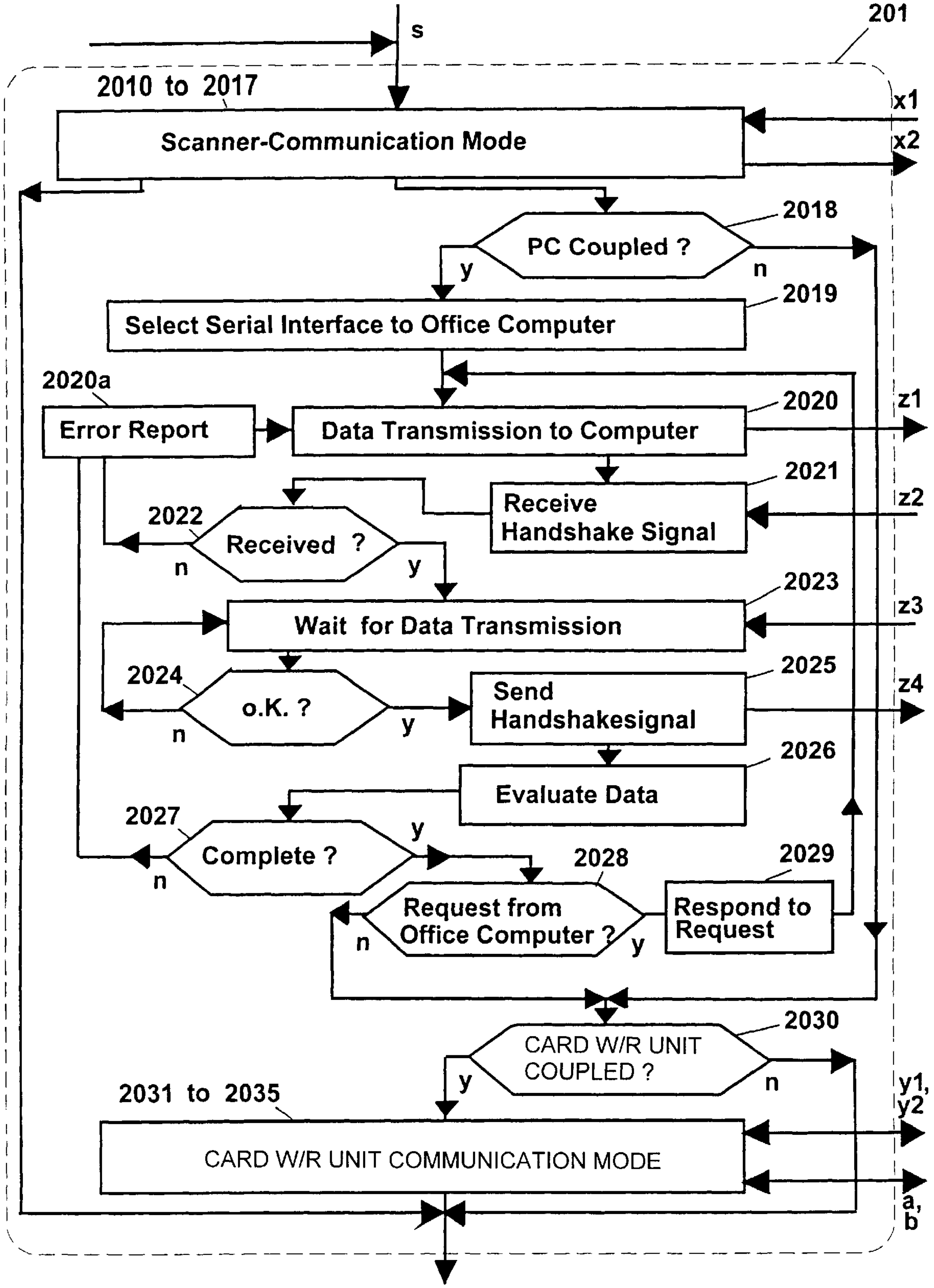

FIGS. 6*a* and 6*b* show a flowchart for an automatic data entry on the basis of the scanned letter recipient address. The first step 201 of the postage meter machine system routine 200 can be subdivided into a number of a communication modes. A chip card communication mode (sub-steps 2019 through 2027) that is not shown in detail in FIGS. 6*a* and 6*b* can also be included, whereby the chip card, for example, is employed as a key card. According to the version of the mail shipping system shown in FIGS. 2*a* and 3*b*, a communication connection exists (or can be set up) to each personal computer in the office 21. Sub-steps 2010 through 2016 for a scanner communication mode, sub-steps 2019 through 2029 for an office computer communication mode, and sub-steps 2031 through 2035 for a scale communication mode are executed in the first step 201.

First, a routine ensues in the sub-step 2010 that non-volatilely stores the cost center and/or shipping data, including carrier data, as prior data so that these data are available as comparison data when a decision is to be made whether a modification of individual data has ensued on the basis of an automatic data input. A deletion of the old, aforementioned data in the main memory of the postage meter machine takes place in connection therewith. In the following sub-step 2011, a serial interface is selected in order to then receive data x1 from one of the scanners (postal matter sensor 16) in the following sub-step 2012 before a branch is made to an interrogation sub-step 2013. In the interrogation step 2013, a branch is made to a sub-step 2014 when a data transmission has ensued in order to send a handshake signal to the aforementioned register unit 19 to which the aforementioned sensor together with other sensors is connected. From the interrogation step 2013, a branch is made via the sub-step 2009 to the sub-step 2040 when no sensor data were received. After sending the handshake signal to the aforementioned sensor, a detection of a piece of mail ensues in sub-step 2015. When the sensor 16 functions according to a mechanical working principle, the appertaining bit merely has to be stored in the simplest case. If the sensor 16 works according to an optical principle, this can ensue on the basis of a relatively simple image evaluation. When a recognition of a piece mail which is present in the delivery path has ensued, a branch is potentially made from the interrogation step 2016 to a sub-step 2017 for evaluating the other scanned data. It can be required, given a marking in the form of a bar code, to move the piece of mail further forward before an evaluation succeeds. Particularly given a version with a complete or partial image evaluation (bar code) in the postage meter machine, the completeness of the scanned data must be assured before an evaluation. If the data required for the detection, i.e., for finding and evaluating, are incomplete—this being determined in interrogation sub-step 2008—, a branch is made back to sub-step 2012 as a reaction thereto in order to wait for a further data transmission from the sensors via register unit 19 and data line 18. Otherwise, a branch is made directly to the next interrogation sub-step 2018.

In a preferred version, the evaluation in the sub-step 2017 includes the detection of the mail (letter) recipient address.

If a recognition has not ensued, i.e., given the lack of a piece of mail in the delivery path, a branch is made from the interrogation sub-step 2016 to the sub-step 2040 for the purpose of calling stored, current data. Neither a chip card communication mode nor a scale communication mode is then executed. Further, a sub-step 2009 is executed in order to switch the delivery drive (not shown) off, i.e., to control motors in the delivery means (not shown) such that these motors are shut off as warranted when a piece of mail to be transported is not found in the delivery path given another run of the system routine 200. Only the input/display routine with print data input is then active and this enables a manual input or presetting of the postage meter machine. At the beginning of the first step 201 of the system routine 200, a number of sub-steps 2001 through 2007 (not shown separately) is again provided so that the operation of the peripheral devices in the mail center and parts of the appertaining conveyor means in the base can sequence controlled by the postage meter machine.

As noted above, an office computer communication mode (sub-steps 2019 through 2027) is also executed. A corresponding interrogation sub-step 2018 proceeds this office computer communication mode.

In all of the aforementioned versions, sub-steps 2031 through 2035 are executed for a scale communication mode when a scale coupling is found in the leading interrogation step 2030.

A serial interface is selected in sub-step 2031 in order to then undertake a data transmission y1 from the postage meter machine FM to the scale 22' in the following sub-step 2031*a*. This data transmission y1 includes the transmission of the carrier identification number CIN. When a data transmission has ensued, a handshake signal y2 sent from the scale 22 is received in the following sub-step 2031*b* and a branch is then made to the sub-step 2031*c* in order to produce an error message in the following sub-step 2031*d* and to branch back to the sub-step 2031*a* if no handshake signal was received from the scale 22'. Otherwise, a wait takes place in the following sub-step 2032 for a data transmission a from the value card write/read unit 20 before a branch is made to an interrogation step 2033. This data transmission a contains at least the balance (available credit) in the value card.

When a data transmission has ensued, a branch is made in the interrogation step 2033 to a sub-step 2034 in order to send a handshake signal to the aforementioned value card write/read unit 20. Without the handshake signal, the unit 20 automatically repeats the data transmission. A branch is made back from the interrogation step 2033 to the sub-step 2032 to wait for the renewed data transmission. An evaluation of the scale data ensues in the sub-step 2035 after the transmission of the handshake signal to the aforementioned unit 20.

In the first step 201, the mail-shipping system according to the first and second embodiments, which contains a postage meter machine FM having a communication connection to at least one personal computer $PC_a$, $PC_b$, . . . , $PC_m$, $PC_n$ in the office 21, implements the automatic data input relating to the cost center and/or carrier information on-line via the aforementioned communication connection when corresponding request data were previously formed on the basis of the scanned letter recipient address. The flowchart shown in FIG. 6*b* for an automatic data input in step 201 illustrates the office computer communication mode. The sub-step 2018 leads to a sub-step 2019 in order to select a serial interface to the personal computer in the office. A data transmission to the computer in the office 21 subsequently ensues in the sub-step 2020. A wait for a handshake signal from the computer in the office 21 takes place in the sub-step 2021 and a branch is then made to the interrogation step 2022. If a handshake signal was not received from the computer in the office 21, a branch is made to the interrogation step 2030. Such a case can occur when an office computer is turned off. If a handshake signal is received, a branch is made to the sub-step 2023 in order to wait for a data transmission from the computer in the office 21. If and when this has ensued (sub-step 2024), a handshake signal is sent to the computer in the office 21 (sub-step 2025). Otherwise, a branch is made back to the sub-step 2023. An evaluation of the data ensues in the sub-step 2026 when the handshake signal was sent to the computer in the office 21 (sub-step 2025). If the data transmission was not terminated or was possibly, incomplete, then a branch is made back via the sub-step 202*a* for the error message to the sub-step 2020 for the data transmission of request data to the computer in the office 21. An interrogation as to whether the data transmission has been completed ensues in the sub-step 2027.

The sub-steps 2019 through 2027 for an office computer communication mode can also be expanded by further sub-steps 2028 and 2029 that implement the answering of an electronic message for a listing for a department-related accounting. A check is made in the sub-step 2028 to determine whether, in the evaluation of the data in the sub-step 2026, a corresponding request in the form of an electronic message was emitted by the personal computer in the office 21, before the request is processed in the sub-step 2029. A branch is then made back to the sub-step 2020 in order to implement a renewed communication until the message has been appropriately processed.

Figure 7A:
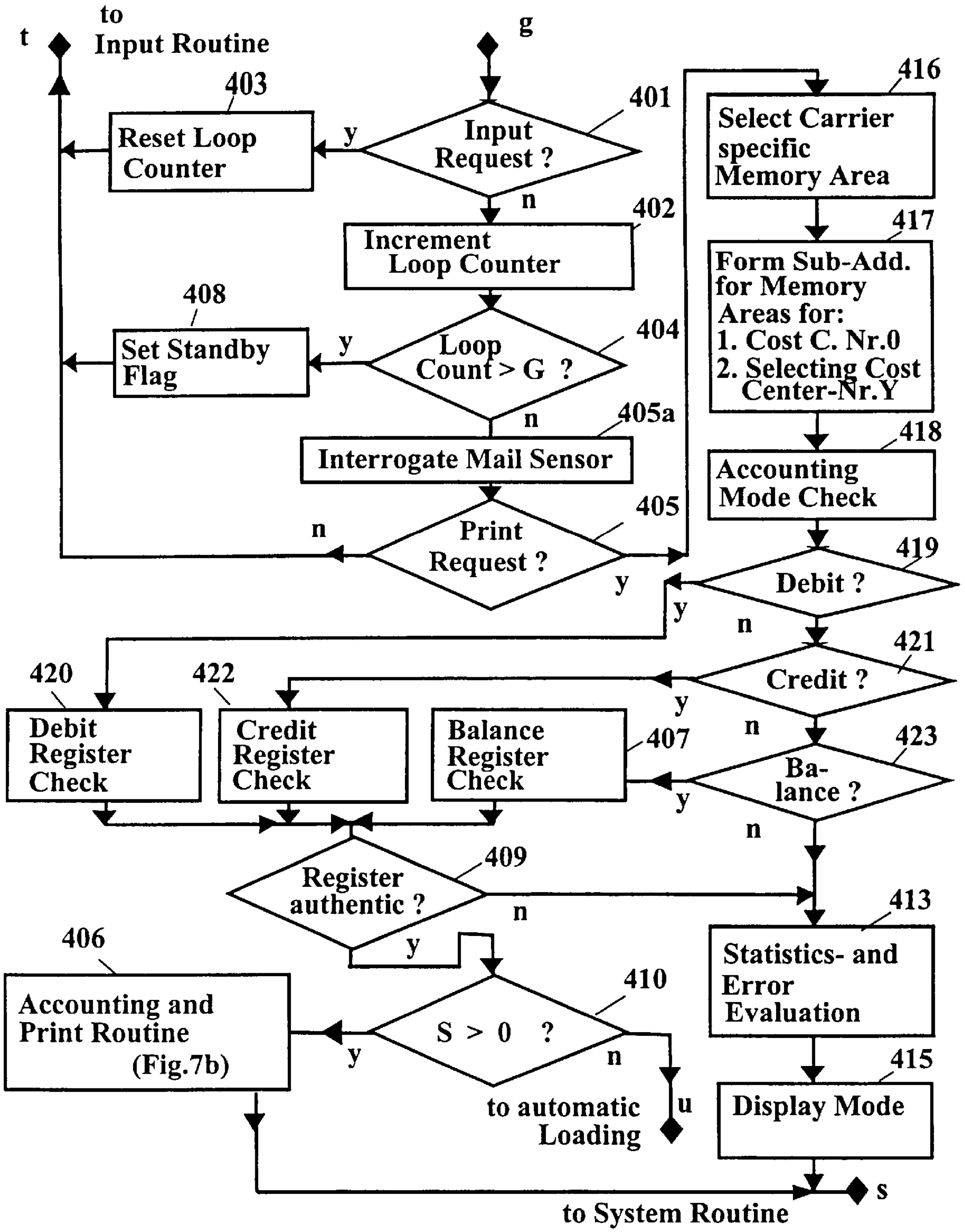
FIG. 7*a* is a flowchart for the franking mode with a carrier and cost center-related processing of accounting data in a postage meter machine constructed and operating in accordance with the principles of the present invention.
Figure 7B:
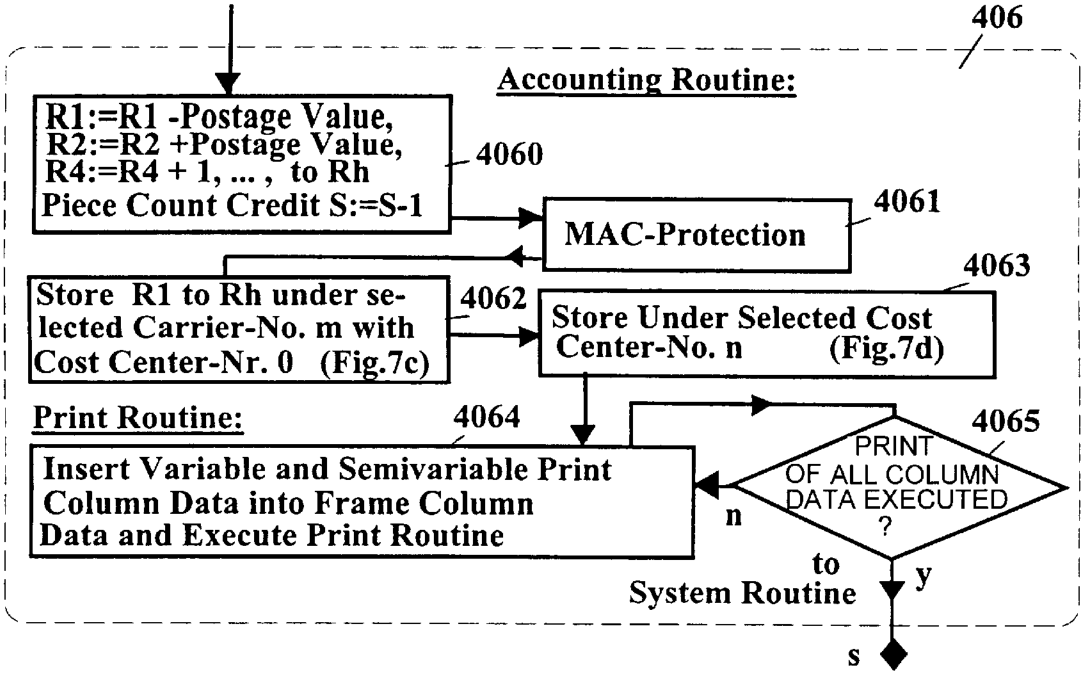
FIG. 7*b* is a flowchart for the accounting and printing routine in franking mode with carrier and cost center-related accounting in a postage meter machine constructed and operating in accordance with the principles of the present invention.

FIG. 7*a* shows a flowchart for the franking mode given carrier-related and cost center-related processing of accounting data. When no determination of a keyboard actuation or some other input request ensues in sub-step 401, a loop counter is incremented in sub-step 402 and an interrogation step 404 is reached. When a predetermined limit number G is reached by the loop counter, then a standby flag is set.

The standby mode is reached when no input or print request ensues over a predetermined time. The step 404 (shown in FIG. 7*a*) in the franking mode 400 therefore also includes a further interrogation for a time lapse that, when the time (based on a loop count) is exceeded, ultimately leads back to the point t, and thus to the input routine according to the step 209. When the interrogation criterion is satisfied, a standby flag is set as in step 408 and a branch is made back to the point t without running the accounting and printing routine in step 406. The standby flag is interrogated later in the step 211 (see, for example, FIG. 4*d*) and, after the check sum inspection in step 213, is reset if no manipulation attempt was recognized. The interrogation criterion in step 211 therefore is expanded by the question as to whether the standby flag is set, i.e., whether the standby mode has been reached. In this case, a branch is likewise made to step 213. The advantage of this procedure is that every attempt at manipulation is statistically acquired in step 213 before a branch is made back to the system routine at point s.

It is thus assured that the last input quantities are also preserved when the postage meter machine is shut off, so that, after it is again turned on, the postage value in the value stamp is automatically prescribed according to the last input before the postage meter machine was shut off and the date is automatically prescribed in the postmark according to the current date.

A check is then made in step 401 to determine whether an input is present. Given a renewed input request in step 401, a branch is made back to step 209. Otherwise, a branch is made via the steps 402 and 404 for incrementing a loop counter and for checking the number of runs through steps 405*a* and 405 in order to interrogate the print output request that is recognized by a standard mail sensor 16.1 upon introduction of a sheet of paper into the printing region upon a printer request. This mail sensor 16.1, for example, is connected to the register unit 19, just like the sensor 16, but is mechanically arranged in the proximity of the printing area and is also interrogated later in the sequence of method steps than the sensor 16. The letter to be franked is detected with the mail sensor 16 and a print request is triggered after a time lapse. A branch can thus be made to the accounting and printing routine in step 406. When no print output request (step 405) is present, a branch is made back via the steps that lie at the start of the system routine, i.e., the between the point s and the point t, to the step 201 lying after the point t.

A communication request can be made or some other input according to the steps for data modification 209, test request 212, register check 214 as well as input request 401 at any time before the step 301 is reached. As shown in the version of FIG. 7*a*, steps 401 through 404 are again run. Given a predetermined number of runs, a branch is made from the step 404 to the step 408. The alternative interrogation criterion can be interrogated in the step 405 in order to set a standby flag in the step 408 if a print output request is not yet present after a predetermined time. As already explained above, the standby flag can be interrogated in the step 211 following the communication mode 300. A branch is thus not made to the franking mode 400 before the check sum review has yielded the completeness of all or of at least selected programs.

When a print output request is recognized in the step 405, further interrogations are actuated in the following steps 401 through 420 as well as in step 406. For example, the presence of authentic register values is interrogated in step 409, and reaching a further piece number S criterion is interrogated in step 410, and the registered data involved in a known way for accounting are interrogated in the step 406. As already explained with reference to FIG. 5*a*, moreover, a securing of selected registers in the NVRAM of the postage meter machine is implemented by MAC formation. When the number of items predetermined for franking was used in the preceding franking, i.e., the number of pieces S is equal to 0, a branch is automatically made from step 410 to the point u in order to enter into the communication mode 300 so that a new, predetermined piece number S can be credited from the data center. When, however, the predetermined number of pieces was not yet used, a branch is made from the step 410 to the accounting and printing routine in step 406. A special sleeping mode counter is initiated to count one counting step more in step 406, i.e., during the accounting routine ensuing immediately before printing. The number of printed letters and current values in the postal registers are likewise registered in non-volatile memories 5*a* and 5*b* of the postage meter machine according to entered cost center in the accounting routine 406, and are available for a later interpretation.

The register values can be interrogated as needed in the display mode 215. It is likewise provided that the register values or other service data can be printed out with the printer head 1 of the postage meter machine for accounting or monitoring purposes. This, for example, can likewise ensue like the normal printing of the postage stamp, with, however, a different frame for fixed image data being selected at the start. The variable data according to the register values stored in the non-volatile memories 5*a* or 5*b* in the cost center memory 9 being inserted into this frame.

The carrier and cost center information are employed for accounting in the franking mode 400 shown in FIG. 7*a*. When a print output request is recognized in step 405, the carrier-specific memory area is selected (step 416), and step 417 is then reached in order to form sub-addresses for the memory areas of, first, a cost center number 0 and, second, the selected cost center number that was set different from 0 (such as cost center No. Y) for the department-related accounting. An accounting without being split into individual cost centers or departments ensues under the cost center number 0 for the sum of all cost centers for the respectively selected, individual carrier m (with m=1 through l).

The step 417 for forming sub-addresses is required for selecting the memory areas during the accounting. An MAC protection is placed over all postal registers to be updated in each accounting, this being required in order to decide in the interrogation step 409 run later whether the register values are authentic. Since such a check is extremely time-consuming, particularly when the DES algorithm is employed for encoding the check sum, the only purpose for which this check is always implemented is for the accounting of the postal registers to be updated. This check therefore ensues in the aforementioned interrogation step 409 parallel to proceeding steps, the step 420 for a debit register check, the step 422 for a credit register check or the step 407 for a balance register check. Such a balance register check is disclosed in German application No. 195 34 530.4, corresponding to the aforementioned co-pending U.S. application Ser. No. 08/525,923 noe U.S. Pat. No. 5,805,711. A further step (not shown) for checking the value card register can likewise possibly be included among the aforementioned, parallel preceding steps.

The debiting on a special chip card (similar to a telephone card or credit card) brought into contact with the postage meter machine FM via the unit 20 and edited by a number of carriers takes place in another accounting version. Here, a prepaid amount is maintained as an electronic balance in the balance account of the chip card and is reduced by the postage value to be franked in the case of an intended franking. At the same time, a transfer of the debited postage value ensues into the accounting unit of the postage meter machine. The debiting with such a value card, which functions as an electronic purse, can ensue until the electronic purse is empty. The refilling of the value card ensues in special bank terminals in a remote credit institute up to a predetermined amount. When the refilled value card is brought into contact with the write/read unit of the postage meter machine, a communication with a special program module of the postage meter machine ensues. Both program module and value card generate crypto codes that are exchanged. The crypto codes are communicated from the postage meter machine to a data center of the postage meter machine manufacturer by modem. At the end of the day, preferably during the night, both of the aforementioned crypto codes and the data sets for every individual entry are communicated for checking to an inspection group of the remote credit institute.

The accounting mode is checked in a step 418 in order to form sub-addresses following the aforementioned step 417. If an accounting on the basis of a debit balance is present, then a branch is made from interrogation step 419 to a step 420 for debit register checking. When an accounting on the basis of a credit balance is present, then a branch is made from the interrogation step 421 to a step 422 for credit register checking. When, however, a standard crediting on the basis of a prepaid balance is present, then a branch is made from the interrogation step 423 to the step 407 for balance register checking. When, alternatively, an accounting on the basis of a prepaid balance in a value card is present, then a branch is correspondingly made from an interrogation step 425 to a corresponding step 426 for balance register checking in a value card. A check preferably ensues on the basis of the co-stored MAC. Interrogation step 409 is then reached and a branch is made if necessary to error interpretation step 413. A manipulation with fraudulent intent can only be precluded given authentic register data. Via step 410, the step 406 with the accounting and printing routine is then reached.

The sub-flowchart for the accounting and printing routine in franking mode with carrier-related and cost center-related accounting is shown in greater detail in FIG. 7*b*. A MAC protected postage value can be checked on the basis of the appertaining MAC in franking mode 400 at the beginning of the accounting routine (FIG. 7*a*). A check sum formation over the postage value and the encoding thereof then ensues. When the result is identical to the MAC value, one can assume the validity of the postage value and the actual accounting procedure can then be started. With an accounting unit that cannot be manipulated, a register R2 is incremented by the postage value in sub-step 4060 and another register R1 is reduced by the postage value. A comparable accounting ensues with the piece number data. An attachment of the MAC protection in sub-step 4061 also ensues after the accounting. In sub-step 4062 a storing then ensues under the selected carrier number and the cost center number 0. The storing under the department-related, selected cost center number n (with n=1 through k) additionally ensues in the cost center memory 9 in sub-step 4063. Only then is the printing routine with the sub-steps 4064 and 4065 reached.

FIG. 7*c* shows the result of the carrier-related accounting in the postal registers implemented in the manipulation-proof accounting module. In FIG. 7*c* (and in FIG. 7*d* as well) the designation "KST" stands for "cost center." A listing of postal register values Ri (with i=1 through h) for each carrier m (with m=1 through l) which is present in the memory area. When, for example, the postage meter machine operator has selected an accounting version with value card, an amount is first transferred from the value card into one of the registers R80 and the piece number for the bookings is counted in one of the registers R81 proceeding from 0. Independently of the selected cost center number, a booking in the registers R80 and R81 is undertaken in a carrier-specific manner in addition to the value card registers, whereby the amount from the value card is correspondingly reduced. When, however, the standard accounting from the balance loaded via the data center DC, for example by modem, is selected, then, independently of a selected cost center number, an accounting first ensues in the registers R1 through R8, correspondingly accumulated and related to a selected carrier.

The carriers have a name to which a number is allocated in order to call or set this more easily by pressing a key. The carriers may also be identifiable by the carrier identification number (CIN) that is a multi-placed number for exact, automatic identification of the carriers, particularly during a communication with a data center of the postage meter machine manufacturer. This CIN makes it possible to load a set of carrier data into the postage meter machine. Further, a number for each cost center is likewise provided in order to call or set this independently of its name by pressing a key.

FIG. 7*d* shows a two-dimensional cost center/carrier matrix for the used sum amount (postage consumption p) respectively allocated to the cost centers in the ascending register R2 and for the used piece number z respectively allocated to the cost centers in the piece count register R4. A resetting to 0 both for the postage use p as well as for the piece count z ensues periodically or at freely selectable time spans after an accounting and output of a listing for a cost center. The output of such a listing can, for example, ensue as a cost center printout or as a carrier-related printout on a tape by the postage meter machine.

Figure 8:
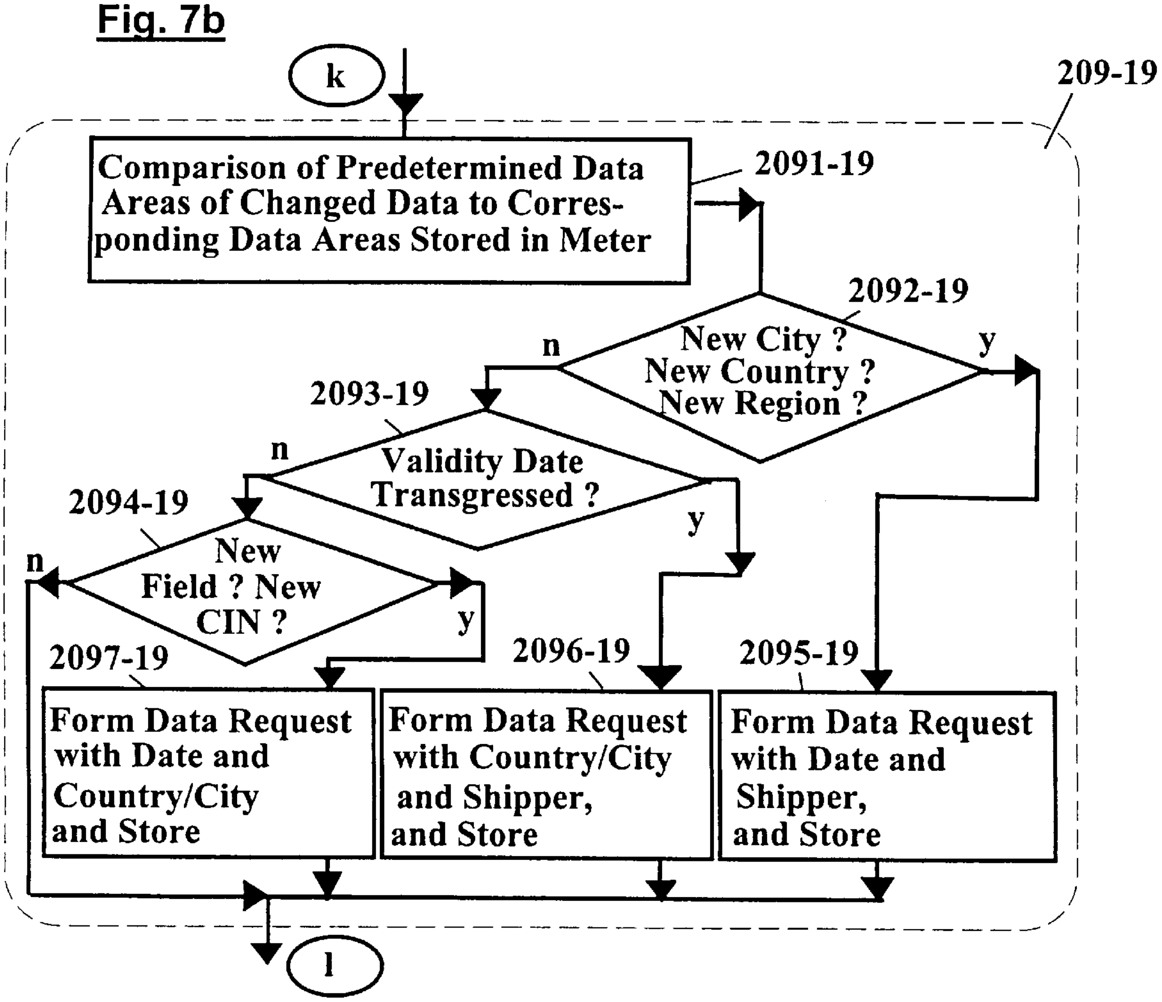
FIG. 8 is a flowchart for forming request data for a data transmission from a data center in accordance with the invention.

The routine 209-19 (shown in FIG. 5*a*) for checking stored data and for forming request data for a data transmission of fee schedule tables and auxiliary data from the data center DC to the postage meter machine is explained in greater detail with reference to FIG. 8. A comparison of predetermined data areas for checking data on the basis of predetermined, corresponding comparison data stored non-volatilely ensues in sub-step 1262 of FIG. 8 in order to be able to identify modifications that have occurred, or have been entered. Specific interrogations ensue in the following sub-steps 2092-19, 2093-19 and 2094-19 in order to form specific request data in the appertaining sub-steps 2093-13 through 2097-13. If the location was changed, whereby the country, the region and/or locality were newly entered, a branch is made from sub-step 2092-13 to the sub-step 2095-13 in order to form and store request data together with the current date and carrier. Transgression of the validity date that is allocated to every carrier-specific table is checked in sub-step 2093-19 in order to then form request data together with the current location and carrier and to store these items. A new entry of a field name is evaluated in sub-step 2094-19, where with tables and information are specifically identified before a branch is made to sub-step 2097-19 in order to specifically form and store request data. A branch is made directly to point I only when no changes were detected in the interrogations 2092-19 through 2094-19.

Such request data can be automatically formed in a constantly run step 209 (FIGS. 3 or 4*b*, 4*d* or, respectively 5) in front of point t and the request data are interpreted in step 301 according to FIGS. 3, 4*b* or 4*d* as communication requests in order to enter into a communication mode.

Figure 9:
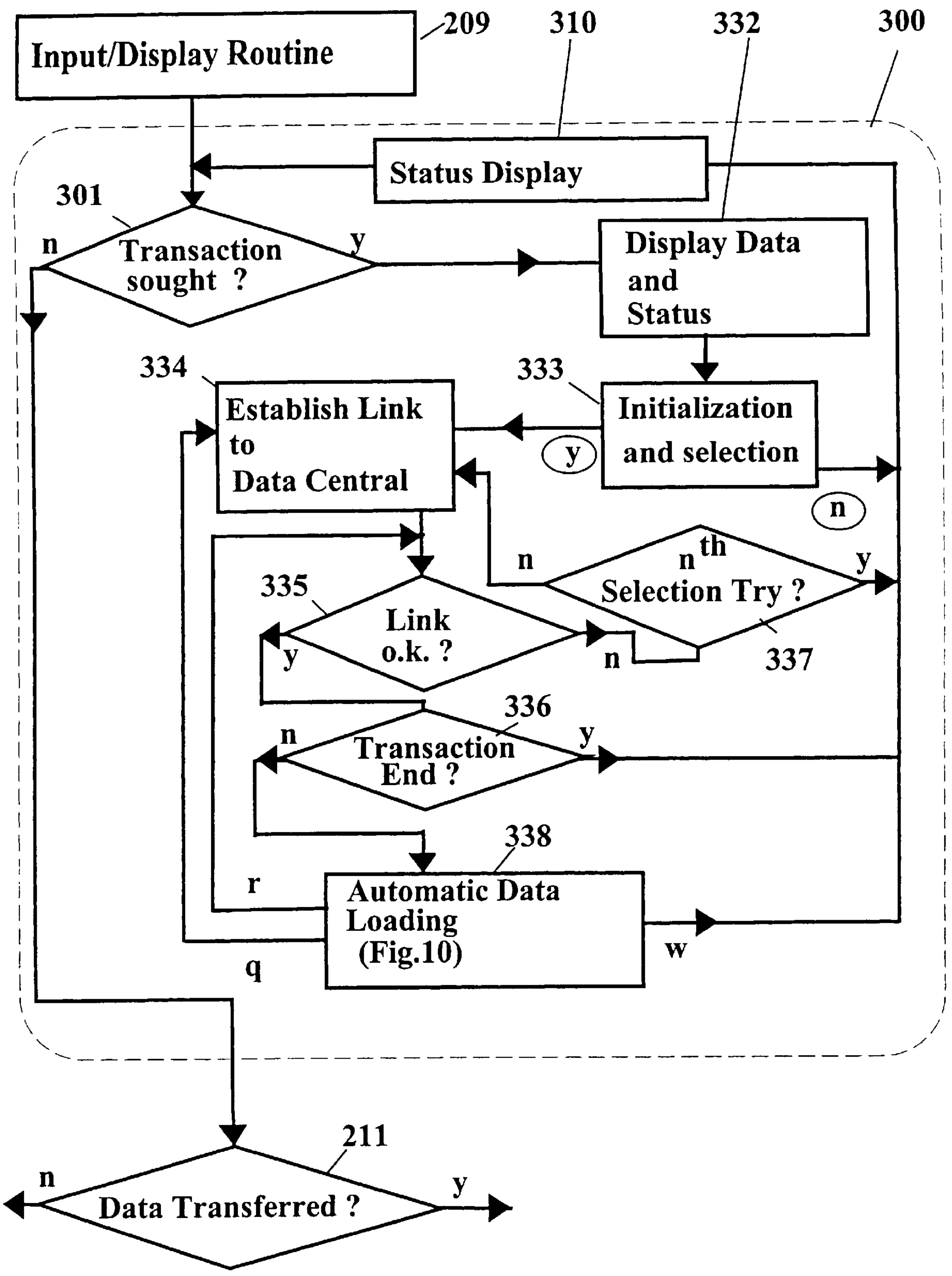
FIG. 9 is a flowchart for the communication mode for a postage meter machine constructed and operating in accordance with the principles of the present invention in order to implement a data transmission.

FIG. 9 shows the communication mode for the postage meter machine that is required in order to implement a data transmission that sequences largely automatically by modem. A recognized transaction request in sub-step 301 of step 300 leads to the display of data and of the status in the sub-step 332 in order, after an initialization of the modem and a selection of the data center (telephone number), to subsequently branch in the sub-step 333 to a sub-step 334 for setting up the connection to the data center. When an initialization of the modem and selection in sub-step 333 cannot be successfully implemented, a branch is made back via sub-step 310 for displaying the status to sub-step 301. A branch is likewise made back to sub-step 301 if it is found in a sub-step 335, after the sub-step 334, that the connection step up did not ensue properly and a determination is made in sub-step 337 that the connection subsequently still can not be setup after the nth redialing.

When, however, the call setup ensues properly and it is found in sub-step 336 that one of the transactions has not yet been terminated, an automatic reloading with data ensues in sub-step 338. Corresponding to the modification of the CIN that is stored in the postage meter machine, a reloading now ensues. If the CIN was not modified by the minimum validity duration for the fee schedules stored in the postage meter machine is transgressed or when a different set of mail carriers was defined, the data center is likewise automatically selected and an updating is accomplished.

A determination is made in sub-step 338 as to whether an error status has occurred that can be eliminated by a renewed connection setup to the data center in order to branch back via point q to the sub-step 334. A further determination is made in sub-step 338 as to whether an error status has occurred that cannot be eliminated in order to branch back via point w to the sub-step 310 for the purpose of a status display. If a transaction has been implemented, subsequent transactions then can be implemented, whereby a branch is made back via point r to the sub-step 335. When the connection is still intact, a check is made in sub-step 336 to determine whether all transactions have been implemented, or to determine whether the last transaction was ended in order to then branch back via the sub-step 310 to the sub-step 301. The flag for a transaction request is reset in sub-step 338 at the end of the last transaction. A branch is thus made from sub-step 301 to step 211 in order now to store and interpret the selected data communicated to the postage meter machine. The value of the transmitted CIN can be automatically classified (according to frequency or priority) in a predetermined way in the interpretation. The type of classification can be set. At least one actuation means is provided in order to set the type of classification. The automatic reloading with data in sub-step 338 includes at least one handling routine that is explained in greater detail in conjunction with FIG. 10.

Figure 10:
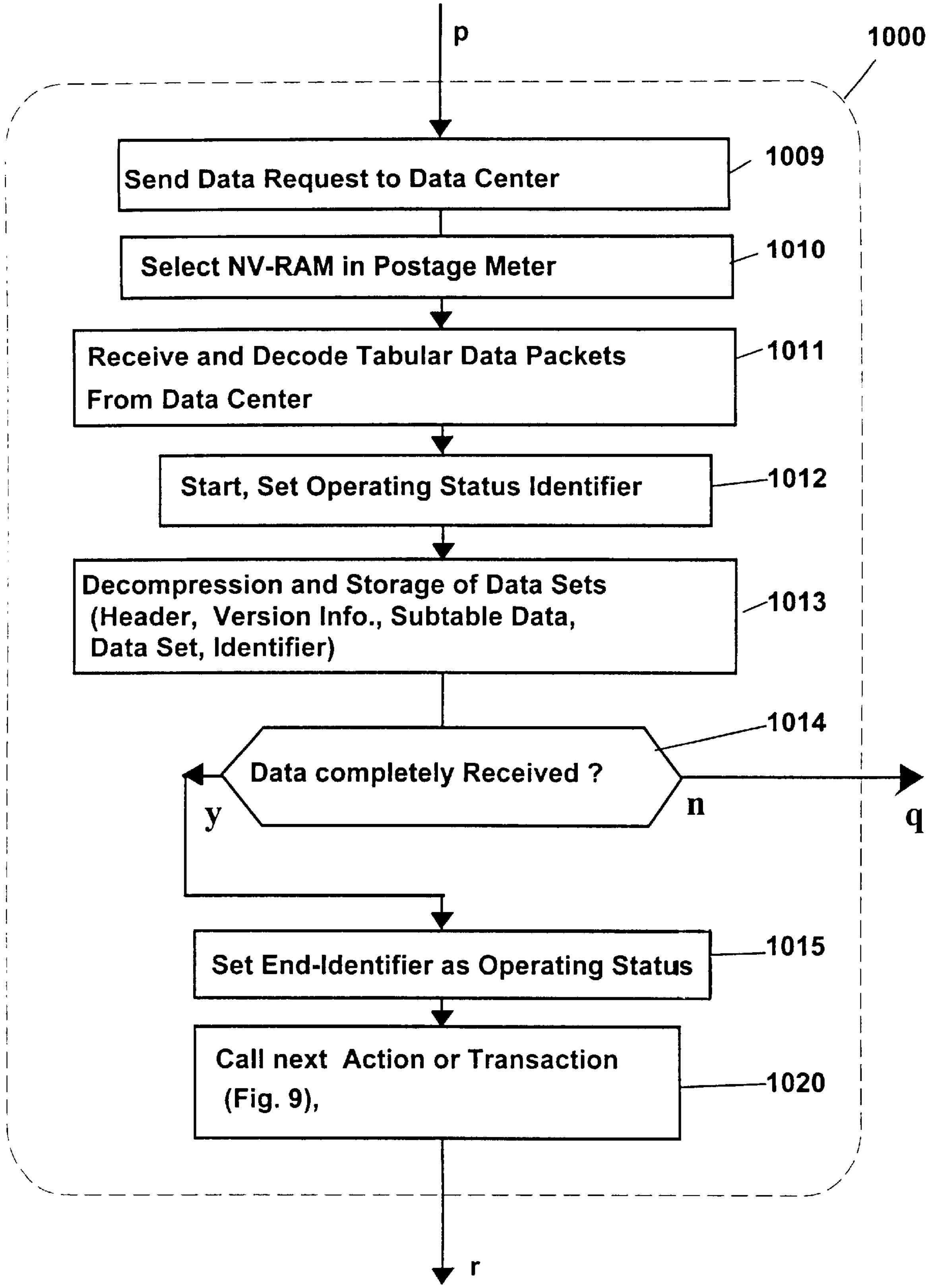
FIG. 10 is a flowchart for a routine for receiving and handling communicated service performance data in a postage meter machine constructed and operating in accordance with the principles of the present invention.

The routine 1000 shown in FIG. 10 for handling communicated table data in the postage meter machine includes a sub-step 1009 for sending request data to the data center. A sub-step 1010 is then implemented in order to select a non-volatile memory area in the postage meter machine in which the requested data can be intermediately stored later. After the sub-step 1010, a branch is made via the sub-step 1011 for receiving and decoding the data packet communicated from the data center to a sub-step 1012 in which a start processing status is set for a data processing. A first processing of the data then ensues in the sub-step 1013. The intermediate storage of the data is advantageous when data are communicated in a number of transactions or when a transaction must be repeated. After departing the communication mode 300, a determination is made in the interrogation step 211—shown in FIG. 3*a* and 3*b*—that data were communicated and a branch is then made to the statistics and error evaluation mode 213. Given freedom from error and validity of the communicated data, a non-volatile storage in the postage meter machine ensues in the aforementioned evaluation mode. After intermediate storage and, if necessary, after a following decompression given packed data in the sub-step 1013 and after executing further sub-steps 1014, 1015 and 1020, a storage of the data set that belongs to a complete postage fee set of a mail carrier ensues. Such a data set includes a header, version information, sub-table data and an end data set identifier.

In the sub-step 1014 for checking for complete reception of the communicated data packet, a branch is made to a sub-step 1015 given completeness in order to set an end identifier as the processing status. Such identifiers are required in order, even given a program abort, for example due to an interruption of operating voltage, to continue the program at this point after the voltage returns. In the following sub-step 1020, the next transaction or action is called, and thus a branch is made to the further execution of the executive sequence shown in FIG. 9 in order to non-volatilely store the intermediately stored updating data in a step 213 that follows later.

Given an improper execution, which is determined in sub-step 1014, the point q is reached. By branching to the sub-step 334 according to FIG. 9, a further attempt can be started in order to transmit the required sub-table data. The sub-steps 335 through 336 are thereby run and the point p according to FIG. 10 is reached.

Automatic reloading with data in the sub-step 338 includes specific handling routines that go beyond those explained in greater detail in conjunction with FIG. 10. This method disclosed in the aforementioned German application Serial No. 195 49 305.2 and corresponding U.S. application Ser. No. 08/770,525 now U.S. Pat. No. 5,852,813, supplies a location-specific offering of window data for the postage stamp or of auxiliary functions for the postage meter machine, as well as offering current information for permanent and/or temporary configuration of the postage meter machine on the basis of a communication network that contains a memory with the callable data blocks for reloading auxiliary functions and information into the postage meter machine, as well as updating data.

Figure 11:
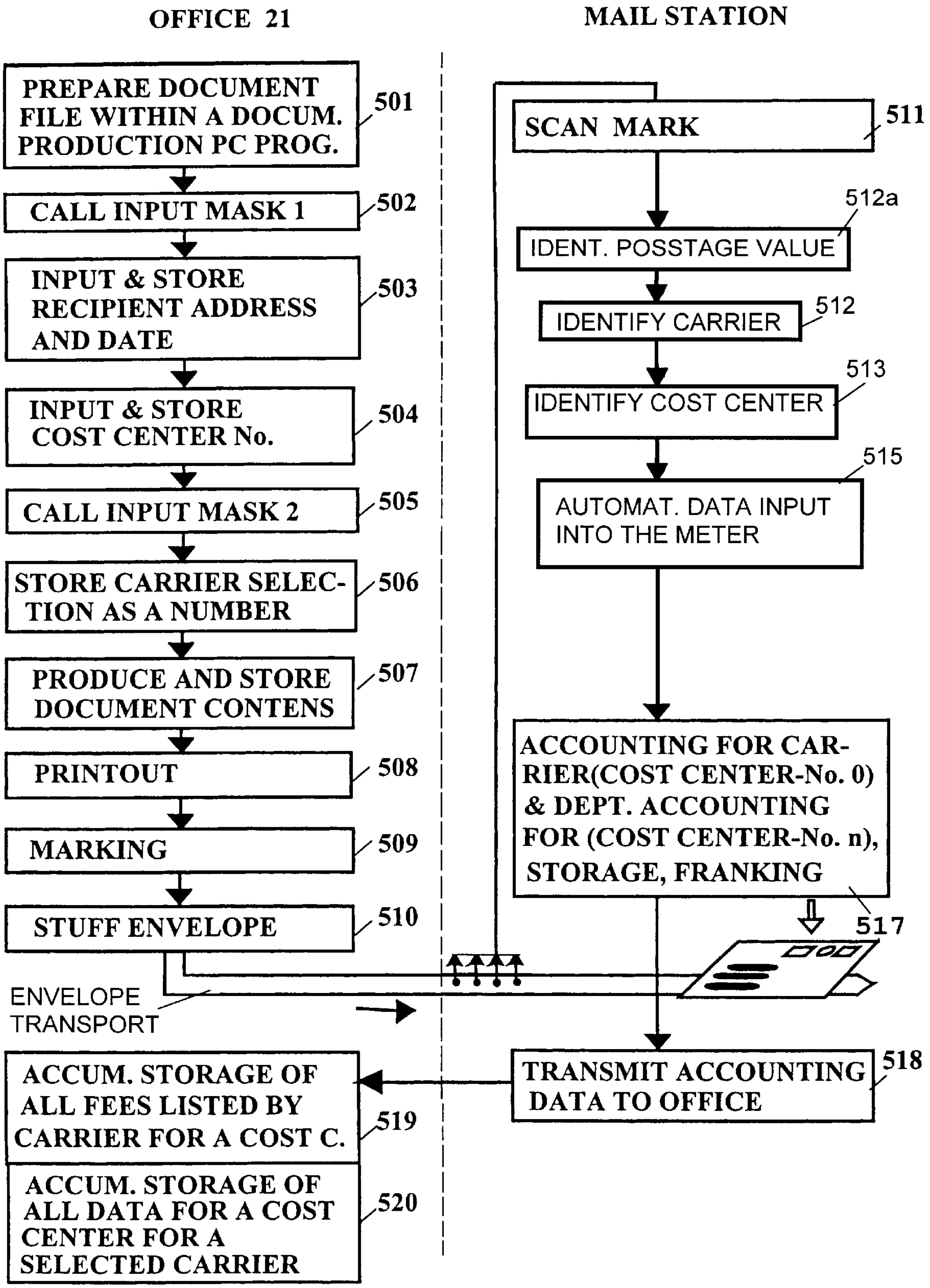
FIG. 11 is a flowchart for a method for operating a mail processing system employing the first embodiment of the inventive postage meter machine, with scanning of the mark or recipient address.

FIG. 11 shows a method according to a first embodiment of the inventive mail processing system. The method for data processing in a mail shipping system includes a number of steps that are implemented on a personal computer in the office 21 for preparing the printout of a letter together with address field and mark. These steps are as follows:

Step 501: creating a letter file within the framework of a letter production program;

Step 502: call first input mask;

Step 503: input and storing of the recipient address and of the date;

Step 505: call second input mask;

Step 506: store carrier selection as number;

Step 507: enter and store shipping data together with the a letter content;

Step 508: printout of the letter with some of the shipping information including the postage value, a carrier and/or cost center number, and the address of the recipient of the letter on the envelope; and/or Step 509: marking the letter or container (envelope) with a mark identifying at least certain shipping information (optional).

In a version of this embodiment an optional step 504 for executing a program routine for automatic entry of the cost center number can be inserted, using the first input mask between step 503 and 505. In another version, step 504 is entirely eliminated. Only the carrier selection is then stored as number and applied on the document, label, letter or envelope. In all of these versions, however, printout of the calculated postage value takes place.

After, or as an alternative to, printing out the letter recipient address on the letter or container (envelope) in step 508, step 509 can be executed for marking the letter or envelope with a mark identifying at least some of the shipping information. The addressing ensues either on the letter given printout of the letter in step 508, or in the following step 509. The marking in step 509 includes the calling of programs for the position of the address and/or information corresponding to the postal regulations for the position of the address and/or other information. Such a postal regulation may, for example, prescribe that a bar code be used as a mark identifying the address or the associated postal zip code be applied to a piece of mail (i.e., a letter if visible through a window envelope, or the envelope itself) in the form of a separate mark.

Also, a further step 510 can be added for placing (stuffing) the letter in the container (envelope). In the above, "letter" is used generically and the above method is applicable to any type of mailing or documents.

Corresponding programs are loaded in the memories of the respective personal computer $PC_a$, $PC_b$ or $PC_c$ that are located in the office 21. In steps 508 and 509, a printer that is shared or separate printers, are correspondingly operated to print the aforementioned areas.

In another version alternative editing steps are implemented in order to enable the employment of stickers or of pre-printed letter envelopes.

The following steps are executed when scanning the mark in a mail center and when processing the data as well as when franking with a postage meter machine.

Step 511: scanning the mark;

Step 512*a*: identify page counter or insert count;

Step 512: identify carrier number;

Step 513: identify cost center number; Step 515: automatic data input for processing in the postage meter machine, comprising cost center and carrier information as well as the page count or insert count;

Step 517 first accounting according to a selected carrier m among a number of carriers under the cost center number 0 and department-by-department accounting classified according to selected cost center number n.

Optionally, the mark contains only a part of the shipping information, whereas another part is permanently set in the postage meter machine. Alternatively, the step 512*a* for identifying the insert count, the step 512 for identifying the carrier number or the step 513 for identifying the cost center number are executed. Likewise alternatively, the automatic data input ensues correspondingly in step 515.

A step 518 is optionally provided in order to send accounting data to the office 21 as a reaction to a request.

Figure 12:
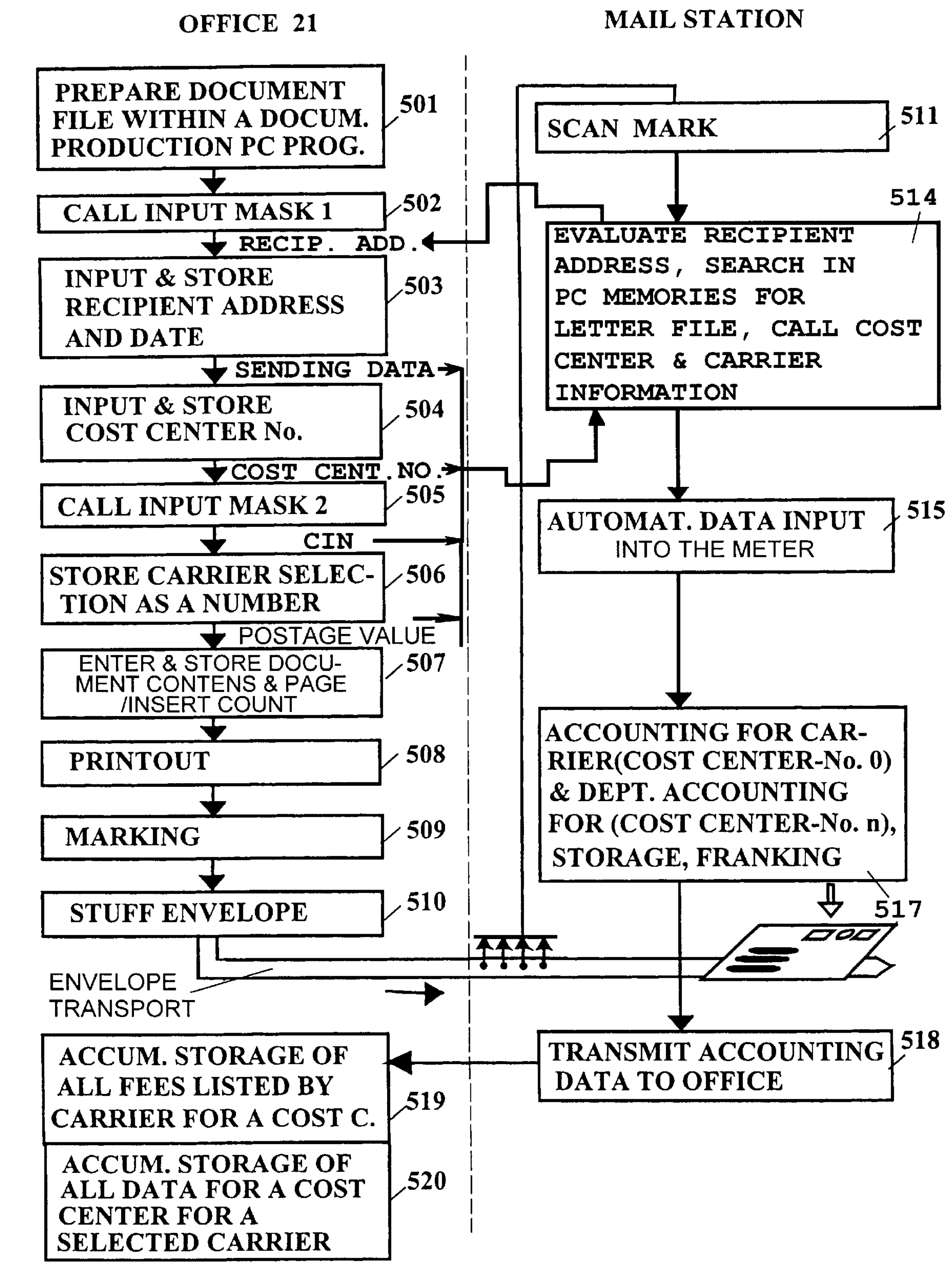
FIG. 12 is a flowchart for a method for operating a mail processing system employing the second embodiment of the inventive postage meter machine, with scanning of the mark or recipient address .

FIG. 12 shows a version with internal postage calculation according to the second embodiment of the invention. The method for data input in a mail shipping system includes a number of steps that are implemented on the personal computer in the office 21 for preparing the printout of a letter together with address field and mark, including a step for producing and storing a letter content before the printout of the letter.

Step 501: creating a letter file within the framework of a letter production program;

Step 502: call first input mask;

Step 503: input and store the recipient address and of the date;

Step 505: call second input mask;

Step 506: store carrier selection as number;

Step 507: produce and store shipping data in conjunction with the letter content;

Step 508: printout of the letter, and possibly the address of the recipient of the letter, on the container (envelope); and/or Step 509: marking the letter or container (envelope) with a mark identifying at least the recipient address.

An optional step 504 in the automatic execution or by user prompting in order to input and store the cost center number is preferably inserted after the step 503 for entering and storing the recipient address and the date, and before the step 505 for calling the second input mask. In a variant version a program routine for the automatic entry of the cost center number is executed in the optional step 504 in conjunction with the first input mask.

Again, a step 510 for placing the letter in the container (envelope) can be added at the end.

The addressing ensues either on the letter given printout of the letter in step 508 or in the form of a mark or marking in the following optional step 509 before the letter is placed in the envelope (in step 510). The marking in the optional step 509 includes calling programs for positioning the address and/or the other shipping information corresponding to postal regulations for the position of the address and/or of the other shipping information. The postal regulation can, for example, prescribe a marking with a bar code for the address or the appertaining postal zip code that is to be applied to the piece of mail (or letter or envelope) in the form of a separate mark.

Corresponding programs are loaded in the memories of the respective personal computers $PC_a$, $PC_b$ or $PC_c$ that are located in the office 21. In steps 508 and 509, a printer that is shared, or separate printers is/are correspondingly driven for the aforementioned areas to be printed.

The aforementioned steps 503, 504 and 506 according to the second embodiment are inventively executed such that, during storage, an allocation of the data to the recipient address and to the date automatically ensues with a program routine in conjunction with the first and second input masks. Differing from the first version, no selected cost center number, no insert count and no selected carrier information need be printed on the letter or on the envelope. The mark on the letter or envelope to be subsequently interpreted in the mail center contains only the recipient address. A program routine in conjunction with the first input mask for the automatic input of the cost center number can still be executed in the optional step 504 when it is assured that the personal computer in the office is always used only by the same department.

The following steps are run when scanning the mark in a mail center and when processing the data as well as when franking with a postage meter machine:

Step 511: scanning the mark;

Step 514: identify recipient address and interpret date as well as access to the memory of the personal computer in order to identify the letter file and in order to fetch the cost center and/or carrier information as well as the;

Step 515: automatic data input for processing in the postage meter machine, including cost center and/or carrier information as well as the postage value;

Step 517: first accounting according to a selected carrier m from among a number of carriers under the cost center number 0, and/or department-by-department accounting classified according to selected cost center number n.

The step 514 is modified in a variant version in order to identify the recipient address and to interpret the date as well as to enable access to the memory of the personal computer in order to identify the letter file and interrogate at least a part of the shipping information, with the remainder of the shipping information being permanently set in the postage meter machine. Alternatively, the automatic data input then ensues correspondingly in the step 515.

Optionally, a step 518 is provided in order to send accounting data to the office 21 as a reaction to a request, after the step 517 for the two-dimensional accounting according to carrier and cost centers.

The method for data input in a mail shipping system further includes a number of optional steps that are implemented on the personal computer in the office 21 at the end of a predetermined period, or as needed, after the franking of a letter. These steps are:

Step 519: accumulative storage of the overall fees, listed according to carriers for a selected cost center;

Step 520: accumulative storage of the cost center-related accounting data for a selected carrier.

The communication sequences via the communication means, preferably the data line 24 via which the access to the memories of the personal computer is also undertaken in step 514 in order to identify the letter file. Of course, a wireless communication can be alternatively used as the communication means. In a further version, the personal computer containing the relevant letter file is determined via the communication means itself, thereby shortening the search for letter files in the data bank distributed among a number of hard disks of the respective personal computer.

Another variant of the invention contains a combination with scanning of the return address and the recipient address within the framework of the second embodiment. A program routine for the automatic entry of the cost center number is executed in a preparatory step 504 in conjunction with a first input mask that is automatically called in the step 502 following the first preparatory step 501. A PC number for the identification can be advantageously stored allocated to a separate return address, or to a cost center number. The appertaining personal computer with the relevant letter file can then be determined via the return address, or with the PC number.

When scanning the mark with respect to the return address in the detection of a piece of mail of supplied pieces of mail in the transport path to the printhead of the postage meter machine, the appertaining personal computer in the office 21 can be indirectly determined via the department or firm designation of the sender.

A further variant contains a combination of the first and second embodiments. The determination of the appertaining personal computer with the relevant letter file ensues directly, with the contents of the mark including an identifier (PC No.) for that personal computer in the office 21 that contains the relevant letter file in its memories.

Figure 13:
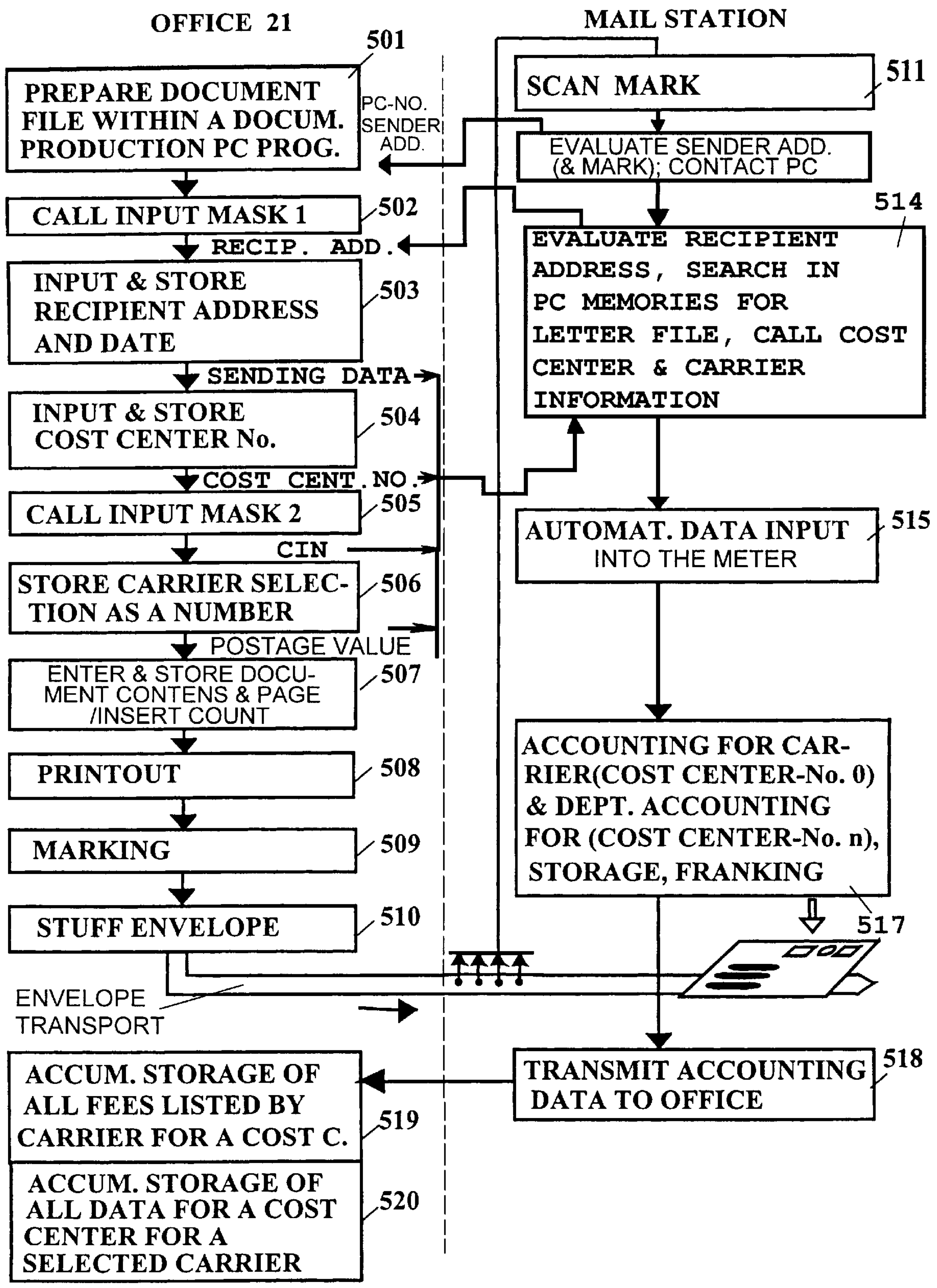
FIG. 13 is a flowchart for a method for operating a mail processing system employing a third embodiment of the inventive postage meter machine, with scanning of the return address and the recipient address.

The following steps are conducted in another version of the second embodiment the inventive method for data processing in a mail shipping system, shown in FIG. 13.

In a first step 201, a detection of a piece of mail in the transport path to the printhead 1 of the postage meter machine (such as by the sensor 16) takes place with scanning of the return address and/or of the mark for the return address (such as with the scanner 26) in step 511, An interrogation of the personal computer in the office 21 ensues in step 513 via the communication means from the postage meter machine FM for determining the personal computer on which the letter was produced, on the basis of scanned return address. The appropriate letter file is then searched for shipping or accounting information in step 514. As a result of the search, shipping information including at least the pate or insert count and/or the cost center number is automatically entered into the postage meter machine FM, and at least non-volatilely stored setting data are called in the step 515 for an automatic print data input into the postage meter machine FM.

A processing routine is executed in a second step 209, including at least one routine allowing for automatic modification of non-volatilely stored setting data, plus a routine for generating a carrier-specific print format.

The data are then processed in the franking mode with a cost-center-specified accounting ensuing before the franking.

Further, a routine is provided for the formation of request data for the reloading of selected carrier data and/or current carrier fee schedules of the selected carrier as a result of the selection of a predetermined mail carrier number (CIN), for automatic print data input and inspection as well as for display, for automatic or manual input. The routine may also contain a sub-routine for the allocation of a cost center number to a slogan number for the automatic input of the slogan number given input of the cost center number. The processing the data in the franking mode preferably ensues with a cost center-related and carrier-specific accounting before the franking.

The marking on the letter in the address field or on the envelope is generated in preparatory steps with the personal computer, whereby, following a first preparatory step 501 for creating a letter file in the framework of a letter production program, the further preparatory steps 502 through 507 are executed, and an allocation of the data of the printable letter, required for the marking, to the aforementioned address is fetchably stored in the personal computer.

The scanning of the return address as well as of the letter recipient address and/or of the corresponding mark for the return address is implemented with a single scanner 26 or with separate scanners that are connected in common with the letter sensor 16 to the register unit 19. It is thereby provided that at least one scanner is arranged in the mail delivery stream so that marks on different formats of postal matter can be scanned.

Variants of both the first and second embodiments of the invention are conceivable, whereby only a part of the information, i.e. cost center or shipping information, is communicated to the postage meter machine and another part of the information necessary for franking is permanently set in the postage meter machine, or is non-volatilely stored therein. Combinations are also possible whereby a cost center number, an insert count or selected carrier information are not printed on the letter or on the envelopes but can be interrogated from the distributed data bank via the data line 24.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for determining a most beneficial carrier for a piece of mail in a franking system including a first printer at a first location and a second printer at a second location, remote from said first location, comprising the steps of:

(a) initializing a franking system by storing a group of carriers, at said first location, from which a carrier for a piece of mail can be subsequently selected;

(b) for said piece of mail, entering service requirements at said first location for shipping said piece of mail and automatically selecting, from said group of carriers, a sub-group of carriers which satisfies said service requirements;

(c) storing, at said first location, respective fees of all carriers in said group of carriers and, for each carrier in said sub-group, automatically calculating at said first location a fee for shipping said piece of mail with said service requirements;

(d) at said first location, comparing the respective fees calculated in step (c) for each carrier in said sub-group and identifying, as a selected carrier, a carrier in said sub-group having the lowest fee and printing an indication on said piece of mail using said first printer identifying said selected carrier; and (e) transporting said piece of mail to said second location and scanning said piece of mail at said second location to identify said selected carrier from said indicator, and printing a franking imprint on said piece of mail, using said second printer, incorporating said lowest fee of said selected carrier.

2. A method as claimed in claim 1 wherein step (a) comprises storing current carrier-related data in said franking system and identifying coincidences with said current carrier-related data in initializing said franking system.

3. A method as claimed in claim 1 comprising the additional step of providing a display in said franking system for displaying information, and displaying said selected carrier and said fee on said display.

4. A method as claimed in claim 1 wherein step (b) further comprises manually metering additional shipping instructional data into said franking system for incorporation in calculating said fee in step (c).

5. A method as claimed in claim 1 wherein step (b) further comprises automatically entering additional shipping instructional data into said franking system for incorporation in calculating said fee in step (c).

6. A method as claimed in claim 1 wherein step (b) comprises manually entering cost center information into said franking system identifying a cost center to be charged for said fee for shipping said piece of mail using said selected carrier.

7. A method as claimed in claim 1 wherein step (b) comprises automatically entering cost center information into said franking system identifying a cost center to be charged for said fee for shipping said piece of mail using said selected carrier.

8. A method as claimed in claim 1 comprising the additional steps of:

non-volatilely storing current fee schedules respectively for said carriers in said group; and repeatedly executing a check routine for ensuring the fee schedule used in step (c) is a current fee schedule.

9. A shipping system for pieces of mail, each piece of mail having information printed thereon in an address field, said shipping system comprising:

a postage meter machine having a transport path by which pieces of mail are transported to said postage meter machine;

means for detecting a piece of mail, as a detected piece of mail, in said transport path;

means for scanning an address field of the detected piece of mail in said transport path;

means in said postage meter machine, supplied with the information in the address field of the detected piece of mail obtained by said means for scanning, for identifying a most beneficial carrier, among a plurality of available carriers, for the detected piece of mail, and for identifying a fee for shipping said detected piece of mail using said most beneficial carrier;

means in said postage meter machine for conducting an accounting for charging said fee; and means for franking said detected piece of mail in said postage meter machine including printer means for printing a franking imprint on said detected piece of mail incorporating the printed representation of said fee.

10. A shipping system as claimed in claim 9 wherein said shipping system is used by a plurality of independent cost centers, and wherein a cost center identifier, identifying a cost center to be charged said fee for shipping said detected piece of mail, is contained in said information in said address field, and wherein said means for conducting an accounting comprises means for conducting a cost center-specific accounting in said postage meter machine and charging said fee to the cost center identified by said cost center identifier.

11. A shipping system as claimed in claim 9 wherein said shipping system is used with a data center remote from said shipping system, and said shipping system further comprising:

means in said postage meter machine for, if sufficient data are not available in said postage meter machine for generating said franking imprint, forming a data request to said remote data center for data needed to complete generation of said franking imprint;

means in said postage meter machine for establishing a communication between said postage meter machine and said remote data center and for transmitting said data request from said postage meter machine to said remote data center; and means in said postage meter machine for receiving said data needed to complete said franking imprint from said remote data center and for supplying said data needed to complete said franking imprint to said printing means.

12. A shipping system as claimed in claim 9 further comprising:

memory means in said postage meter machine for storing a plurality of carrier-specific print formats respectively allocated to said available carrier;

means for retrieving the print format for said most beneficial carrier from said memory; and said printer means comprising means for printing said franking imprint on said detected piece of mail incorporating said printed representation of said fee and said print format for said most beneficial carrier.

13. A shipping system as claimed in claim 9 wherein said shipping system is used with a data center remote from said shipping system, and said shipping system further comprising:

at least one personal computer, having a memory, remote from said postage meter machine for producing pieces of mail, each having mail contents;

a memory containing a plurality of data files in said personal computer, said data files respectively allocated to instructional data including said most beneficial carrier;

communication means for bidirectional communication between said personal computer and said postage meter machine; and wherein said postage meter machine comprises processor means for executing an office computer communication routine in said postage meter machine between said postage meter machine and said personal computer via said communication means, including means for searching said memory of said personal computer, using said information in the address field of the detected piece of mail, for locating the data file in said personal computer containing the mail contents of said detected piece of mail and for interrogating said data file containing the mail contents of said detected piece of mail to identify said most beneficial carrier, and for supplying said most beneficial carrier for said detected piece of mail from said personal computer to said postage meter machine via said communication means and for automatically entering said most beneficial carrier into said postage meter machine;

means in said postage meter machine for, if sufficient data are not available in said postage meter machine for generating said franking imprint, forming a data request to said remote data center for data needed to complete generation of said franking imprint;

means in said postage meter machine for establishing a communication between said postage meter machine and said remote data center and for transmitting said data request from said postage meter machine to said remote data center;

means in said postage meter machine for receiving said data needed to complete said franking imprint from said remote data center and for suppling said data needed to complete said franking imprint to said printing means; and means in said postage meter machine for supplying said data needed to complete said franking imprint to said personal computer as updating data.

14. A shipping system as claimed in claim 13 comprising a plurality of personal computers, and further comprising a personal computer network interconnecting said personal computers for data exchange among all of said personal computers, means in each personal computer, upon receipt of updating data from said postage meter machine, for supplying said updating data to all of the other personal computers via said personal computer network.

15. A shipping system as claimed in claim 14 wherein each of said personal computers comprises means for establishing communication with said postage meter machine for ensuring coincidence of data stored in that personal computer with data stored in said postage meter machine.

16. A mail shipping system as claimed in claim 15 wherein each of said personal computers comprises memory means for storing fee schedules respectively allocated to said available carriers, means for conducting a routine for identifying said most beneficial carrier using said fee schedules for making a cost comparison of the respective costs, for each of said carriers, for shipping said piece of mail, and means in each personal computer for executing a routine for ensuring that said fee schedules are current.

17. A shipping system for pieces of mail comprising:

a postage meter machine;

at least one personal computer, having a memory, remote from said postage meter machine for producing pieces of mail, each having mail contents;

a memory containing a plurality of data files in said personal computer, said data files respectively allocated to instructional data including said most beneficial carrier;

communication means for bidirectional communication between said personal computer and said postage meter machine; and in said postage meter machine processor means for executing an office computer communication routine in said postage meter machine between said postage meter machine and said personal computer via said communication means, including means for searching said memory of said personal computer, using said information in an address field of a detected piece of mail, for locating the data file in said personal computer containing the mail contents of said detected piece of mail and for interrogating said data file containing the mail contents of said detected piece of mail to identify said most beneficial carrier, and for supplying said most beneficial carrier for said detected piece of mail from said personal computer to said postage meter machine via said communication means and for automatically entering said most beneficial carrier into said postage meter machine.

18. A shipping system as claimed in claim 17 wherein said personal computer comprises means for storing the mail contents of the respective pieces of mail in respective data files of said memory of said personal computer allocated to instructional information including at least said most beneficial carrier and time data, and wherein said means for searching said memory of said personal computer comprises means for searching said memory of said personal computer using said information in the address field of the detected piece of mail and said time data for locating the data file containing the mail contents of said detected piece of mail.

19. A method for data processing in a franking system comprising the steps of:

(a) creating a document in a document producing program in a personal computer;

(b) calling a first input mask in said personal computer;

(c) entering and storing in said personal computer an address of a recipient of said document and a data of said document using said first input mask;

(d) calling a second input mask in said personal computer including a group of carriers available for shipping said document, each carrier having a carrier number uniquely identifying that carrier;

(e) executing a routine in said personal computer for identifying a most beneficial carrier among said group of carriers and storing said most beneficial carrier, identified by its carrier number, together with said document in said personal computer; and (f) printing out said document including printing said recipient address thereon and printing information identifying at least said most beneficial carrier.

20. A method as claimed in claim 19 wherein step (f) comprises printing out said information on said document as a mark on said document.

21. A method as claimed in claim 19 wherein step (f) comprises printing out information on said document identifying a cost center, to be charged a fee for shipping said document, at which said personal computer is located.

22. A method as claimed in claim 19 comprising the additional steps of:

providing a postage meter machine having a transport path by which said document is transported to said postage meter machine;

detecting said document, as a detected document, in said transport path;

scanning said information on said detected document in said transport path;

using said information scanned from said detected document, identifying in said postage meter machine the most beneficial carrier for said detected piece of mail and identifying a fee for shipping said detected document using said most beneficial carrier;

conducting an accounting in said postage meter machine for charging said fee; and franking said detected document in said postage meter machine including a printing a franking imprint on said detected document incorporating a printed representation of said fee.

23. A method as claimed in claim 22 wherein the step of franking said detected document comprises printing information on said document identifying a cost center, at which said personal computer is located, to be charged said fee for shipping said detected document, and said method comprising the additional step of identifying said cost center at said postage meter machine from the scanning of said information on said detected document, and wherein the step of conducting an accounting comprises conducting a cost center-specific accounting in said postage meter machine and charging said fee to said cost center.

24. A method as claimed in claim 22 comprising the additional steps of:

providing communication means for bidirectional communication between said personal computer and said postage meter machine; and executing an office computer communication routine in said postage meter machine between said postage meter machine and said personal computer via said communication means, including searching a memory in said personal computer, using said information on said detected document, for locating in said memory said document and interrogating said memory to identify said most beneficial carrier, and supplying said most beneficial carrier for said detected document from said personal computer to said postage meter machine via said communication means and automatically entering said most beneficial carrier into said postage meter machine.

25. A method as claimed in claim 24 wherein step (f) includes printing out said document with a date thereon and wherein the step of searching said memory of said personal computer comprises searching said memory of said personal computer for locating said document using said address of said recipient and the date of said document.

26. A method for data processing in a mail shipping system used by a plurality of independent cost centers for respectively shipping documents using a selected one of a plurality of carriers, said mail shipping system having a postage meter machine with a transport path leading thereto, comprising the steps of:

producing a document using a text production program at a personal computer, said personal computer being disposed remote from said postage meter machine;

printing out said document from said personal computer with an address field containing at least one identifier identifying a carrier and a cost center to be charged a fee for shipping said document;

causing said document to enter into said transport path of said postage meter machine and detecting a presence of said document in said transport path;

upon detection of said document in said transport path, scanning said address field and automatically entering information corresponding to the most beneficial carrier and the cost center identified in said address field into said postage meter machine;

conducting an accounting in said postage meter machine by modifying an account, accessible by said postage meter machine, uniquely related to the cost center identified in said address field by an amount corresponding to said fee for shipping said document using said most beneficial carrier identified in said address field; and producing a franking imprint after said accounting using a print format for the carrier identified in said address field and incorporating a printed representation of said fee.

27. A method as claimed in claim 26 comprising the additional steps of:

calling one of a plurality of settings when no document is detected in said transport path, said one of said settings comprising old data; and when the presence of said document is detected overwriting said old data with new data comprising the print format for the carrier and cost center identified by said scanning.

28. A method as claimed in claim 26 wherein said mail shipping system includes a scanner for conducting said scanning of said address field, a chip card reader, each of which can communicate with said postage meter machine, and said method comprising the steps of executing a scanner communication routine, a chip card communication routine and a personal computer communication routine in said postage meter machine to determine which of said scanner, said chip card reader and said personal computer will interface with said postage meter machine.

29. A method as claimed in claim 26 wherein the step of printing said address field and said mark using said personal computer comprises printing said address field and said mark on a label adhesively attachable to said document.

30. A method as claimed in claim 26 wherein the step of printing said address field and said mark using said personal computer comprises printing said address field and said mark on a pre-printed letter envelope comprising said document.

31. A method as claimed in claim 26 comprising the additional step of:

in said accounting, debiting an account of said cost center, accessible by said postage meter machine, which produced said document by said fee.

32. A method as claimed in claim 26 comprising the additional step of checking data in said print format for said carrier and cost center identified in said address field with an encoded check sum when said setting data for said print format are called in said postage meter machine.

33. A method as claimed in claim 26 wherein said mail shipping system is used with a data center remote from said mail shipping system, and said method comprising the additional steps of:

if sufficient data are not available in said postage meter machine for generating said print format for said carrier identified in said address field, forming a data request to said remote data center for data needed to complete generation of said print format;

establishing a communication between said postage meter machine and said remote data center and transmitting said data request from said postage meter machine to said remote data center; and transmitting said data needed to complete said print format from said remote data center to said postage meter machine, and generating said print format using said data needed to complete said print format in said postage meter machine.

34. A method as claimed in claim 32 wherein said print format includes frame data and pixel data, and wherein the step of generating said print format using said data transmitted from said remote data center to complete said print format comprises modifying at least one of said frame data and said pixel data.

35. A method as claimed in claim 26 comprising the additional steps of:

respectively allocating a designated number to each of a plurality of available changes to said print format;

providing an input unit in communication with said postage meter machine by which a selected allocated number can be entered into said postage meter machine; and upon entry of an allocated number through said input unit into said postage meter machine, making a change in said print format allocated to that number.

36. A method as claimed in claim 26 wherein said postage meter machine includes a clock/date module which emits signals identifying a current time and date, and wherein said method includes the step of including said current time and date in said print format supplied by said clock/date module.

37. A method as claimed in claim 26 comprising the additional steps of:

respectively allocating a cliche number to each cost center;

respectively allocating a cost center number to each cost center;

providing an input unit in communication with said postage meter machine by which a cost center number can be entered into said postage meter machine; and entering a cost center number into said postage meter machine via said input unit and automatically, in said postage meter machine, entering the cliché number associated with the entered cost center number.

38. A method as claimed in claim 37 wherein each cost center has a name associated therewith, and said method comprising the additional step of allowing, via said input unit, for modification of a name of a cost center allocated to a cost center number.

39. A method as claimed in claim 37 wherein each of said carriers has a name associated therewith, and said method comprising the additional steps of:

providing an input unit in communication with said postage meter machine; and allowing for modification of a name of a carrier via said input unit.

40. A method as claimed in claim 26 comprising the additional steps of:

allocating carrier identification numbers respectively to said carriers;

non-volatilely storing each carrier identification number in said postage meter machine;

providing an input unit in communication with said postage meter machine via which a selected carrier identification number can be entered;

entering a selected carrier identification number via said input unit into said postage meter machine and thereby causing, in said postage meter machine, selection of the print format associated with the carrier corresponding to the entered carrier identification number; and allowing for modification of said carrier identification number and the carrier-specific print format corresponding to the carrier to which said carrier identification number is respectively allocated.

41. A method as claimed in claim 26 comprising the additional steps of:

respectively allocating a cost center number to each cost center;

providing an input unit in communication with said postage meter machine via which a selected cost center number can be entered into said postage meter machine; and upon entry of a cost center number into said postage meter machine via said input unit, displaying at said postage meter machine all shipping costs respectively associated with each carrier used by said cost center.

42. A method as claimed in claim 41 comprising the additional step of:

allowing for display of all shipping fees for all cost centers, with each shipping cost displayed matched to a cost center number for the cost center which incurred the shipping fee.

43. A method as claimed in claim 26 comprising the additional steps of:

respectively allocating a cost center number to each cost center;

providing an input unit in communication with said postage meter machine via which a selected cost center number can be entered into said postage meter machine; and upon entry of a cost center number into said postage meter machine via said input unit, displaying at said postage meter machine a number of shipped documents respectively shipped by each carrier used by said cost center.

44. A method as claimed in claim 43 comprising the additional step of displaying all numbers of shipped documents by all of said cost centers, with each number of shipped documents matched to a cost center number for the cost center which produced the shipped documents.

45. A method as claimed in claim 26 comprising the additional steps of:

storing a matrix in said postage meter machine identifying, for each cost center, a running total of the shipping fees incurred by the cost center for each carrier, and a running total of a number of documents shipped by the cost center using each carrier.

46. A method as claimed in claim 45 comprising the additional steps of:

printing out said matrix after said accounting for each cost center; and after printing out said matrix, resetting each of the running total of the shipping costs and the running total of the number of shipped documents, for the cost center which the accounting was conducted, to zero.

47. A method as claimed in claim 46 further comprising periodically conducting an accounting for a cost center and printing out said matrix.

48. A method as claimed in claim 46 comprising conducting an accounting for a cost center and printing said matrix at a freely selectable time.

49. A method as claimed in claim 46 comprising the additional steps of:

for each cost center, storing any financial reloading data; and printing out said financial reloading data for a cost center together with the matrix for that cost center.

50. A method as claimed in claim 46 wherein each cost center has a personal computer and a connected computer printer associated therewith, and comprising the additional step of producing, at the personal computer for a cost center, a request for a printout of said matrix for the cost center associated with the personal computer, and wherein the step of printing out said matrix comprises printing out said matrix at the computer printer associated with the personal computer which produced said request.

51. A method as claimed in claim 46 wherein the step of printing out said matrix comprises printing out said matrix at a printhead of said postage meter machine.

52. A shipping system including printing means wherein said shipping system is used with a data center remote from said shipping system, and said shipping system further comprising:

means for, if data for a new shipping carrier are not available for generating a franking imprint for the new carrier, forming a data request to said remote data center for data needed to complete generation of said franking imprint for the new carrier;

means for establishing a communication between said shipping system and said remote data center and for transmitting said data request from said shipping system to said remote data center; and means in said shipping system for receiving said data needed to complete said franking imprint for the new carrier from said remote data center and for suppling said data needed to complete said franking imprint for the new carrier to said printing means.

53. A method for franking a document comprising the steps of:

providing a security module in a personal computer;

storing a credit amount available for franking in said security module;

creating a document in a document producing program in said personal computer;

calling a first input mask in said personal computer;

entering and storing in said personal computer an address of a recipient of said document and a data of said document using said first input mask;

calling a second input mask in said personal computer including a group of carriers available for shipping said document;

executing a routine in said personal computer for identifying a most beneficial carrier among said group of carriers and storing said most beneficial carrier, allocated to said document, in said personal computer;

calculating in said personal computer a fee for shipping said document using said most beneficial carrier;

debiting said credit amount in said security module by an amount equal to said fee;

providing a printer in communication with said personal computer; and printing out said document at said printer including printing said recipient address thereon and printing a franking imprint on said document at said printer incorporating a representation of said fee.

* * * * *

UNITED STATES PATENT AND TRADEMARK OFFICE

CERTIFICATE OF CORRECTION

PATENT NO. : 6,035,291 
DATED : March 7, 2000
INVENTOR(S) : Wolfgang Thiel

It is certified that error appears in the above-identified patent and that said Letters Patent is hereby corrected as shown below:

Title page,
Item [73], Assignee, should read as follows -- Francotyp Postalia AG & Co., Berlin, Germany --.

Signed and Sealed this

Twentieth Day of January, 2004

JON W. DUDAS
*Acting Director of the United States Patent and Trademark Office*